US011752801B2

(12) United States Patent
Koyama

(10) Patent No.: US 11,752,801 B2

(45) Date of Patent: Sep. 12, 2023

(54) PNEUMATIC TIRE AND METHOD OF MANUFACTURING PNEUMATIC TIRE

(71) Applicant: The Yokohama Rubber Co., LTD., Tokyo (JP)

(72) Inventor: Noriyoshi Koyama, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 17/272,568

(22) PCT Filed: Jun. 13, 2019

(86) PCT No.: PCT/JP2019/023550

§ 371 (c)(1), (2) Date: Mar. 1, 2021

(87) PCT Pub. No.: WO2020/049822

PCT Pub. Date: Mar. 12, 2020

(65) Prior Publication Data

US 2021/0323355 A1 Oct. 21, 2021

(30) Foreign Application Priority Data

Sep. 6, 2018 (JP) ................................ 2018-166819

(51) Int. Cl.
*B60C 9/22* (2006.01)
*B29D 30/30* (2006.01)

(52) U.S. Cl.
CPC ............ *B60C 9/22* (2013.01); *B29D 30/3021* (2013.01); *B29D 30/3028* (2013.01)

(58) Field of Classification Search
CPC ...... B60C 9/2204; B60C 9/22; B29D 30/3021
USPC ........................................................ 152/526
See application file for complete search history.

(56) References Cited

U.S. PATENT DOCUMENTS 5,885,384 A * 3/1999 Himuro ............... B60C 11/0302 152/209.18
2011/0198006 A1* 8/2011 Asayama ............. B60C 9/2204 152/209.18
2014/0332130 A1 11/2014 Maehara
2015/0336345 A1 11/2015 Maehara
(Continued)

FOREIGN PATENT DOCUMENTS

CN 104139671 A 11/2014
CN 105682942 A 6/2016
(Continued)

*Primary Examiner* — Katelyn W Smith
*Assistant Examiner* — Alexander D Booth
(74) *Attorney, Agent, or Firm* — Thorpe North & Western

(57) ABSTRACT

In order to improve shock burst resistance performance while suppressing a decrease in separation resistance performance, a pneumatic tire includes a tread portion, a belt layer, and a belt cover layer. The belt layer is disposed in the tread portion. The belt cover layer is disposed on an outer side in a tire radial direction of the belt layer. The belt cover layer includes: two layers of full covers disposed between shoulder regions on both sides in a tire width direction and layered in the tire radial direction; and a narrow cover formed with a width in the tire width direction narrower than widths of the full covers. The narrow cover is disposed at a position between the two layers of the full covers and on an inner side in the tire width direction than the shoulder regions.

9 Claims, 9 Drawing Sheets

Specification includes a Sequence Listing.

TIRE WIDTH DIRECTION
1
CL
23(20) 22(20) 21(20) 22(20) 23(20)
2 32(30) 4 31(30) 45 31(30) 15 32(30) 3
42(40) 5
5 41(40)
OUTER SIDE
18 142 141,143 14
13 16
8 8
TIRE RADIAL DIRECTION
INNER SIDE
12 17 10 11
12 17 10 11

TIRE WIDTH DIRECTION
2 CL
OUTER SIDE 22(20) 31(30) 3 21(20) 31(30) 22(20)
TIRE RADIAL DIRECTION
W 45 15
45a 45a
42 40 41
INNER SIDE
18 13 142 141,143 14

(56) References Cited

U.S. PATENT DOCUMENTS

| | | | | |
|---|---|---|---|---|
| 2016/0257169 | A1* | 9/2016 | Kuwayama | ......... B60C 11/0306 |
| 2019/0329591 | A1* | 10/2019 | Hashimoto | ............. B60C 11/03 |

FOREIGN PATENT DOCUMENTS

| | | | |
|---|---|---|---|
| EP | 2801486 | A1 | 11/2014 |
| EP | 3064374 | A1 | 7/2016 |
| EP | 3064374 | A1 | 9/2016 |
| JP | 2005-225493 | A | 8/2005 |
| JP | 2009-35030 | A | 2/2009 |
| JP | 2010-064644 | A | 3/2010 |
| JP | 4635366 | B2 | 2/2011 |
| JP | 4687201 | B | 5/2011 |
| JP | 4865259 | B2 | 2/2012 |
| JP | 2014-218216 | A | 11/2014 |
| JP | 2015-85754 | A | 5/2015 |
| JP | 2015-85754 | A | 7/2015 |
| JP | 2017-137032 | A | 8/2017 |
| WO | WO 2014/181705 | A1 | 11/2014 |
| WO | 2015/063972 | A1 | 5/2015 |
| WO | WO 2015/063972 | A1 | 5/2015 |

* cited by examiner

| | CONVENTIONAL EXAMPLE 1 | CONVENTIONAL EXAMPLE 2 | EXAMPLE 1 | EXAMPLE 2 | EXAMPLE 3 | EXAMPLE 4 | EXAMPLE 5 |
|---|---|---|---|---|---|---|---|
| PRESENCE OF NARROW COVER | NO | YES | YES | YES | YES | YES | YES |
| PRESENCE OF TWO LAYERS OF FULL COVERS BETWEEN WHICH NARROW COVER IS SANDWICHED | - | NO | YES | YES | YES | YES | YES |
| WIDTH OF NARROW COVER | - | 24 mm | 4 mm | 5 mm | 10 mm | 24 mm | 30 mm |
| WIDTH OF NARROW COVER TO WIDTH OF BELT COVER LAYER | - | 15% | 15% | 15% | 15% | 15% | 15% |
| PLUNGER TEST (J) | 580 | 598 | 611 | 624 | 630 | 636 | 639 |
| SEPARATION RESISTANCE PERFORMANCE | 95 | 100 | 102 | 104 | 108 | 112 | 113 |

FIG. 8A

| | EXAMPLE 6 | EXAMPLE 7 | EXAMPLE 8 | EXAMPLE 9 | EXAMPLE 10 | EXAMPLE 11 |
|---|---|---|---|---|---|---|
| PRESENCE OF NARROW COVER | YES | YES | YES | YES | YES | YES |
| PRESENCE OF TWO LAYERS OF FULL COVERS BETWEEN WHICH NARROW COVER IS SANDWICHED | YES | YES | YES | YES | YES | YES |
| WIDTH OF NARROW COVER | 40 mm | 41 mm | 24 mm | 24 mm | 24 mm | 24 mm |
| WIDTH OF NARROW COVER TO WIDTH OF BELT COVER LAYER | 15% | 15% | 4% | 5% | 30% | 31% |
| PLUNGER TEST (J) | 648 | 660 | 660 | 660 | 660 | 660 |
| SEPARATION RESISTANCE PERFORMANCE | 114 | 115 | 113 | 113 | 113 | 113 |

FIG. 8B

PNEUMATIC TIRE AND METHOD OF MANUFACTURING PNEUMATIC TIRE

TECHNICAL FIELD

The present technology relates to a pneumatic tire, and a method for manufacturing a pneumatic tire.

BACKGROUND ART

Some pneumatic tires in the related art have met expectations for performance by devising a member disposed on an outer side in a tire radial direction of a belt layer. For example, a pneumatic tire described in Japan Patent No. 4865259 improves projection resistance in such a way that two belt protecting layers are disposed on an outer side in a tire radial direction of a belt layer, and the belt protecting layer on the outer side in the tire radial direction has a narrower width than a width of the belt protecting layer on an inner side in the tire radial direction. In a pneumatic tire described in Japan Unexamined Patent Publication No. 2010-064644, a belt reinforcing layer is disposed between a tread portion and a belt layer, and the belt reinforcing layer is configured to be three layers on a tire equatorial portion to ensure breaking energy while suppressing an increase in weight.

A pneumatic tire described in Japan Unexamined Patent Publication No. 2017-137032 includes a band-like sound absorbing member adhered to a tire inner surface in a tread portion, a full cover layer disposed on an outer circumferential side of a belt layer, and a center cover layer disposed on an outer circumferential side of the full cover layer and locally covering a tire width central region. Defining the respective width of the band-like sound absorbing member and the belt layer, and the center cover layer and the band-like sound absorbing member reduces the decrease in high-speed durability due to accumulation of heat in the band-like sound absorbing member while obtaining sufficient quietness by the band-like sound absorbing member.

In a pneumatic tire described in Japan Patent No. 4635366, a belt cover layer constituted by an end portion belt cover layer and a central portion belt cover layer is disposed outside a belt layer, and a tensile strength of organic fiber cords forming the end portion belt cover layer and the central portion belt cover layer and a sum of the end portion belt cover layer and the central portion belt cover layer are defined to ensure a decrease in road noise in a high frequency band and weight reduction. Additionally, a pneumatic tire described in Japan Patent No. 4687201 includes a belt cover formed by spirally winding a strip material on an outer circumferential side of a belt layer. In the belt cover, lap winding of the strip material at a position covering an end portion in a tire width direction in the belt layer and a position covering a central portion in the tire width direction in the belt layer improves steering stability and durability.

Here, among pneumatic tires, for example, there are pneumatic tires that can accommodate a high load, such as a pneumatic tire with EXTRA LOAD standard. Such pneumatic tires can be used at relatively high air pressures for accommodating high loads. Meanwhile, when the air pressure of the pneumatic tire is increased, rigidity of a tread portion increases. As a result, the tread portion is less likely to deform when a foreign material is trodden, and a shock burst, which occurs caused by the tread of the foreign material, is likely to occur. That is, the use of the pneumatic tire at high air pressure is likely to reduce shock burst resistance performance, which is a resistance against a shock burst.

A shock burst is likely to occur by treading a foreign material on a road surface in a region at or near a tire equatorial plane on a ground contact surface of the tread portion. Accordingly, to improve shock burst resistance performance, reinforcement in the vicinity of the tire equatorial plane in the tread portion is effective. However, when a member for reinforcement is newly added in the vicinity of the tire equatorial plane, an edge portion, which is a portion becoming an end portion of the member, increases at a position at or near the tire equatorial plane, and thus so-called edge separation in which overlapped members separate starting from edge portion is likely to occur. Accordingly, it has become very difficult to improve shock burst resistance performance without a decrease in separation resistance performance, which is a resistance against edge separation.

SUMMARY

The present technology provides a pneumatic tire that allows improving shock burst resistance performance while suppressing a decrease in separation resistance performance and a method for manufacturing the pneumatic tire.

A pneumatic tire according to an embodiment of the present technology includes a tread portion, a belt layer, and a belt cover layer. The belt layer is disposed in the tread portion. The belt cover layer is disposed on an outer side in a tire radial direction of the belt layer. The belt cover layer includes: two layers of full covers disposed between shoulder regions on both sides in a tire width direction and layered in the tire radial direction; and a narrow cover formed with a width in the tire width direction narrower than widths of the full covers. The narrow cover is disposed at a position between the two layers of the full covers and on an inner side in the tire width direction than the shoulder regions.

In the pneumatic tire, the narrow cover preferably has the width in the tire width direction in a range from not less than 5 mm to not greater than 40 mm.

In the pneumatic tire, the narrow cover preferably has the width in the tire width direction in a range from not less than 5% to not greater than 30% of a width of the belt cover layer in the tire width direction.

In the pneumatic tire, the full covers and the narrow cover are preferably formed by spirally winding each of band-like belt cover materials around a tire rotation axis. The belt cover materials that form the full covers and each of the belt cover materials that form the narrow cover are preferably an identical type.

In the pneumatic tire, the narrow cover is preferably disposed across a tire equatorial plane in the tire width direction.

In the pneumatic tire, main grooves extending in a tire circumferential direction are preferably formed in the tread portion. A plurality of land portions are preferably defined by the main grooves. At least a part of the narrow cover is preferably positioned on an inner side in the tire radial direction of the land portion closest to a tire equatorial plane among the plurality of land portions.

A method for manufacturing a pneumatic tire according to an embodiment of the present technology spirally winds band-like belt cover materials on an outer side in a tire radial direction of a belt layer around a tire rotation axis to dispose a belt cover layer. The belt cover layer is formed by layering an inner full cover, a narrow cover, and an outer full cover from inside to outside in the tire radial direction. The method includes: spirally winding each of the belt cover materials on an outer side in the tire radial direction of the belt layer between shoulder regions on both sides in a tire width direction to form the inner full cover between the shoulder regions; spirally winding each of the belt cover materials at a position on the outer side in the tire radial direction of the inner full cover and on an area further inside in the tire width direction than the shoulder regions to form the narrow cover with a width in the tire width direction narrower than a width of the inner full cover in the tire width direction; and spirally winding each of the belt cover materials on the outer side in the tire radial direction of the narrow cover and the inner full cover between the shoulder regions on both the sides in the tire width direction to form the outer full cover between the shoulder regions.

The pneumatic tire and the method for manufacturing the pneumatic tire according to the embodiment of the present technology provide an effect that allows improving shock burst resistance performance while suppressing a decrease in separation resistance performance.

BRIEF DESCRIPTION OF DRAWINGS

FIG. 8A is a table showing results of performance evaluation tests of pneumatic tires.

FIG. 8B is a table showing results of performance evaluation tests of pneumatic tires.

DETAILED DESCRIPTION

Embodiments of a pneumatic tire and a method for manufacturing a pneumatic tire according to embodiments of the present technology will be described in detail below with reference to the drawings. However, the present technology is not limited by the embodiment. Constituents of the following embodiments include elements that are essentially identical or that can be substituted or easily conceived of by a person skilled in the art.

EMBODIMENTS

Pneumatic Tire

Herein, "tire radial direction" refers to the direction orthogonal to the rotation axis (not illustrated) of a pneumatic tire 1. "Inner side in the tire radial direction" refers to the direction toward the rotation axis in the tire radial direction. "Outer side in the tire radial direction" refers to the direction away from the rotation axis in the tire radial direction. Additionally, "Tire circumferential direction" refers to the circumferential direction with the rotation axis as the center axis. Additionally, "tire width direction" refers to a direction parallel with the rotation axis. "Inner side in the tire width direction" refers to a side toward a tire equatorial plane (tire equator line) CL in the tire width direction. "Outer side in the tire width direction" refers to a side away from the tire equatorial plane CL in the tire width direction. "Tire equatorial plane CL" refers to a plane orthogonal to the tire rotation axis and extending through the center of the tire width of the pneumatic tire 1. The tire equatorial plane CL is aligned, in the tire width direction, with a tire width direction center line corresponding to the center position of the pneumatic tire 1 in the tire width direction. "Tire width" is the width in the tire width direction between portions located on the outermost in the tire width direction, or in other words, the distance between the portions that are the most distant from the tire equatorial plane CL in the tire width direction. "Tire equator line" refers to the line in the tire circumferential direction of the pneumatic tire 1 that lies on the tire equatorial plane CL.

Figure 1:
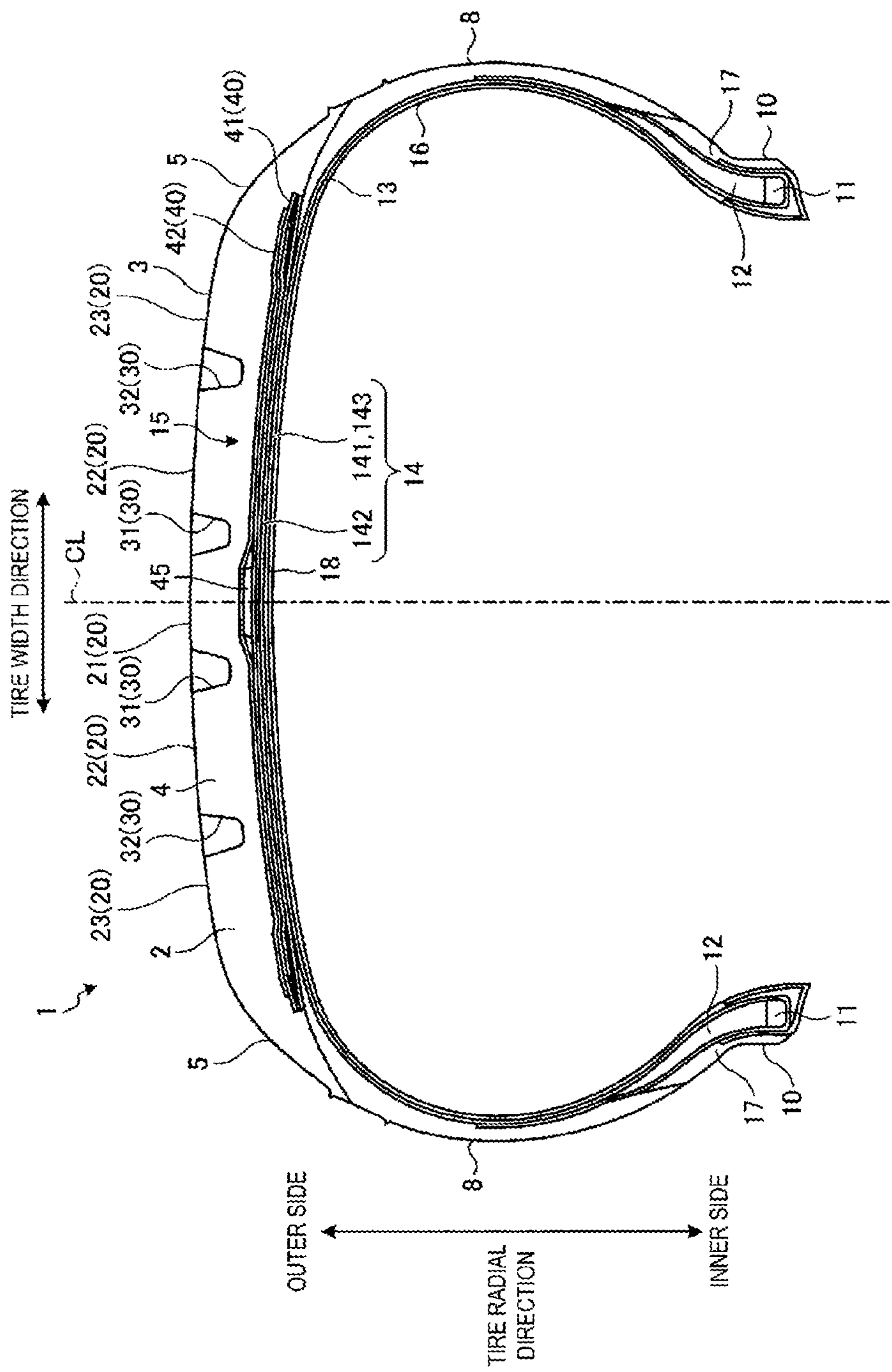
FIG. 1 is a meridian cross-sectional view illustrating a main portion of a pneumatic tire according to an embodiment.

FIG. 1 is a meridian cross-sectional view illustrating a main portion of the pneumatic tire 1 according to the embodiment. The pneumatic tire 1 according to the present embodiment is the pneumatic tire 1 that can accommodate use at high loads, for example, the pneumatic tire 1 with EXTRA LOAD standard. In the pneumatic tire 1 according to the present embodiment, a tread portion 2 is disposed on a portion on the outermost side in the tire radial direction when viewed in a meridian cross-section, and the tread portion 2 includes a tread rubber layer 4 made of a rubber composition. A surface of the tread portion 2, that is, a portion in contact with a road surface during traveling of a vehicle (not illustrated) having the pneumatic tires 1 mounted thereon is formed as a ground contact surface 3, and the ground contact surface 3 forms a part of a contour of the pneumatic tire 1. A plurality of main grooves 30 extending in the tire circumferential direction are formed in the ground contact surface 3 in the tread portion 2, and a plurality of land portions 20 are defined by the plurality of main grooves 30 on the surface of the tread portion 2. In the present embodiment, four main grooves 30 are formed side by side in the tire width direction, and each two of the four main grooves 30 are disposed on both sides in the tire width direction of the tire equatorial plane CL. In other words, the four main grooves 30 in total are formed in the tread portion 2, including: two center main grooves 31 disposed on both sides of the tire equatorial plane CL; and two shoulder main grooves 32 disposed on an outer side in the tire width direction of each of the two center main grooves 31.

Note that "main groove 30" refers to a vertical groove in which at least a part is extending in the tire circumferential direction. In general, the main groove 30 has a groove width of not less than 3 mm and a groove depth of not greater than 6 mm and has a tread wear indicator (slip sign) therein, indicating terminal stages of wear. In the present embodiment, the main groove 30 has a groove width of from not less than 6 mm to not greater than 25 mm and a groove depth of from not less than 6 mm to not greater than 9 mm and is substantially parallel to a tire equator line (centerline) where the tire equatorial plane CL and the ground contact surface 3 intersect. The main grooves 30 may extend linearly in the tire circumferential direction or may be provided in a wave shape or a zigzag shape.

Among the land portions 20 defined by the main grooves 30, the land portion 20 positioned between the two center main grooves 31 and positioned on the tire equatorial plane CL is a center land portion 21. Moreover, the land portions 20 positioned between the adjacent center main grooves 31 and shoulder main grooves 32 and disposed on the outer side in the tire width direction of the center land portion 21 are second land portions 22. Moreover, the land portions 20 positioned on the outer side in the tire width direction of the second land portions 22 and adjacent to the second land portions 22 with the shoulder main grooves 32 disposed therebetween are shoulder land portions 23.

Note that the land portions 20 may be formed in a rib shape across one circumference in the tire circumferential direction, and a plurality of lug grooves (not illustrated) extending in the tire width direction may be formed in the tread portion 2. Thus, the land portions 20 may be defined by the main grooves 30 and the lug grooves, and each of the land portions 20 may be formed in a block shape. In the present embodiment, the land portion 20 is formed as the rib-shaped land portion 20 formed across one circumference in the tire circumferential direction.

Shoulder portions 5 are positioned at both ends on outer sides of the tread portion 2 in the tire width direction, and sidewall portions 8 are disposed on inner sides in the tire radial direction of the shoulder portions 5. In other words, the sidewall portions 8 are disposed on both sides in the tire width direction of the tread portion 2. In other words, the sidewall portions 8 are disposed at two sections on both sides in the tire width direction of the pneumatic tire 1 and form portions exposed to the outermost sides in the tire width direction of the pneumatic tire 1.

A bead portion 10 is located on an inner side in the tire radial direction of each of the sidewall portions 8 located on both sides in the tire width direction. Similarly, to the sidewall portions 8, the bead portions 10 are disposed at two sections on both sides of the tire equatorial plane CL. That is, a pair of the bead portions 10 is disposed on both sides in the tire width direction of the tire equatorial plane CL. Each bead portion 10 is provided with a bead core 11, and a bead filler 12 is provided on an outer side in the tire radial direction of the bead core 11. The bead core 11 is an annular member formed in an annular shape by bundling bead wires, which are steel wires, and the bead filler 12 is a rubber member disposed on the outer side in the tire radial direction of the bead core 11.

A belt layer 14 is disposed in the tread portion 2. The belt layer 14 is formed by a multilayer structure in which a plurality of belts 141, 142 are layered, and the two layers of the belts 141, 142 are layered in the present embodiment. The belts 141, 142 constituting the belt layer 14 are formed by rolling and covering, with coating rubber, a plurality of belt cords made of steel or an organic fiber material, such as polyester, rayon, or nylon, and a belt angle defined as an inclination angle of the belt cords with respect to the tire circumferential direction is within a predetermined range (for example, from not less than 20° to not greater than 55°). Furthermore, the belt angles of the two layers of the belts 141, 142 differ from one another. Accordingly, the belt layer 14 is configured as a so-called crossply structure in which the two layers of the belts 141, 142 are layered with the inclination directions of the belt cords intersecting with one another. In other words, the two layers of the belts 141, 142 are provided as so-called cross belts in which the belt cords provided with the respective belts 141, 142 are disposed in mutually intersecting orientations.

A belt cover layer 15 is disposed on the outer side in the tire radial direction of the belt layer 14. The belt cover layer 15 is disposed on the outer side in the tire radial direction of the belt layer 14, covers the belt layer 14 in the tire circumferential direction, and is provided as a reinforcing layer that reinforces the belt layer 14. The belt cover layer 15 is formed by covering, with coating rubber, a plurality of cords (not illustrated) disposed side by side in the tire width direction substantially parallel to the tire circumferential direction. The cords provided with the belt cover layer 15 are made of, for example, steel or an organic fiber, such as polyester, polyethylene terephthalate, rayon, nylon, and a hybrid of a polyamide composite+$\alpha$, and a cord angle is within a range of ±5° with respect to the tire circumferential direction. Moreover, in the cords provided with the belt cover layer 15, a wire diameter, which is a diameter of the cord, is within a range from not less than 0.5 mm to not greater than 1.8 mm, and a cord count per 50 mm in an arrangement direction of the cords is within a range from not less than 30 to not greater than 80. In the present embodiment, the belt cover layer 15 is disposed across the entire region of the range in the tire width direction in which the belt layer 14 is disposed and covers end portions in the tire width direction of the belt layer 14. The tread rubber layer 4 provided with the tread portion 2 is disposed on the outer side in the tire radial direction of the belt cover layer 15 in the tread portion 2.

A carcass layer 13 containing the cords of radial plies is continuously provided on an inner side in the tire radial direction of the belt layer 14 and on a side of the sidewall portion 8 close to the tire equatorial plane CL. Accordingly, the pneumatic tire 1 according to the present embodiment is configured as a so-called radial tire. The carcass layer 13 has a single layer structure made of one carcass ply or a multilayer structure made of a plurality of carcass plies, and spans between the pair of bead portions 10 disposed on both sides in the tire width direction in a toroidal shape to form the framework of the tire.

Specifically, the carcass layer 13 is disposed to span from one bead portion 10 to the other bead portion 10 among the pair of bead portions 10 located on both sides in the tire width direction and turns back toward the outer side in the tire width direction along the bead cores 11 at the bead portions 10 so as to wrap around the bead cores 11 and the bead fillers 12. The bead filler 12 is a rubber member disposed in a space formed on the outer side in the tire radial direction of the bead core 11 when the carcass layer 13 is folded back at the bead portion 10. Moreover, the belt layer 14 is disposed on the outer side in the tire radial direction of a portion, located in the tread portion 2, of the carcass layer 13 spanning between the pair of bead portions 10. Moreover, the carcass ply of the carcass layer 13 is made by rolling and covering, with coating rubber, a plurality of carcass cords made from steel or an organic fiber material such as aramid, nylon, polyester, or rayon. The plurality of carcass cords that form the carcass ply are disposed side by side with an angle in the tire circumferential direction, the angle with respect to the tire circumferential direction following a tire meridian direction.

At the bead portion 10, a rim cushion rubber 17 is disposed on an inner side in the tire radial direction and an outer side in the tire width direction of the bead core 11 and a turned back portion of the carcass layer 13, the rim cushion rubber 17 forming a contact surface of the bead portion 10 against the rim flange. Additionally, an innerliner 16 is formed along the carcass layer 13 on the inner side of the carcass layer 13 or on the inner side of the carcass layer 13 in the pneumatic tire 1. The innerliner 16 forms a tire inner surface 18 that is a surface on the inner side of the pneumatic tire 1.

Figure 2:
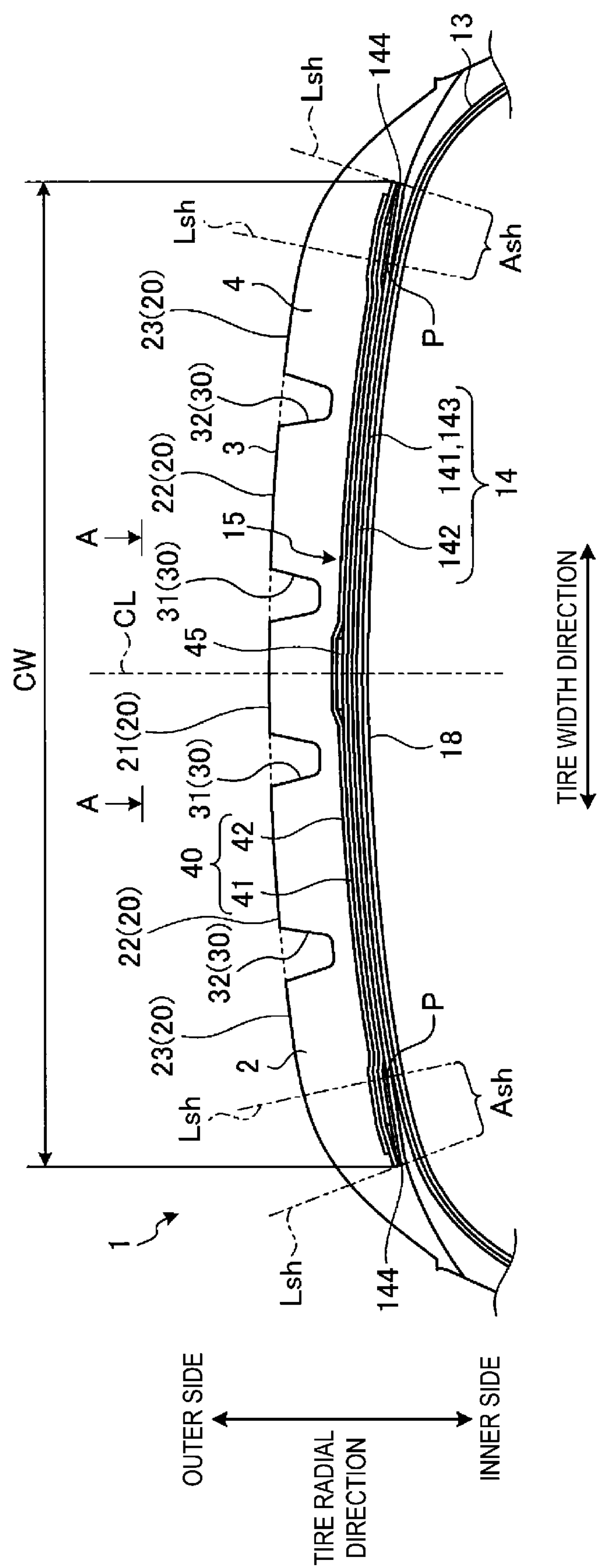
FIG. 2 is a detailed view of a tread portion illustrated in FIG. 1.
Figure 3:
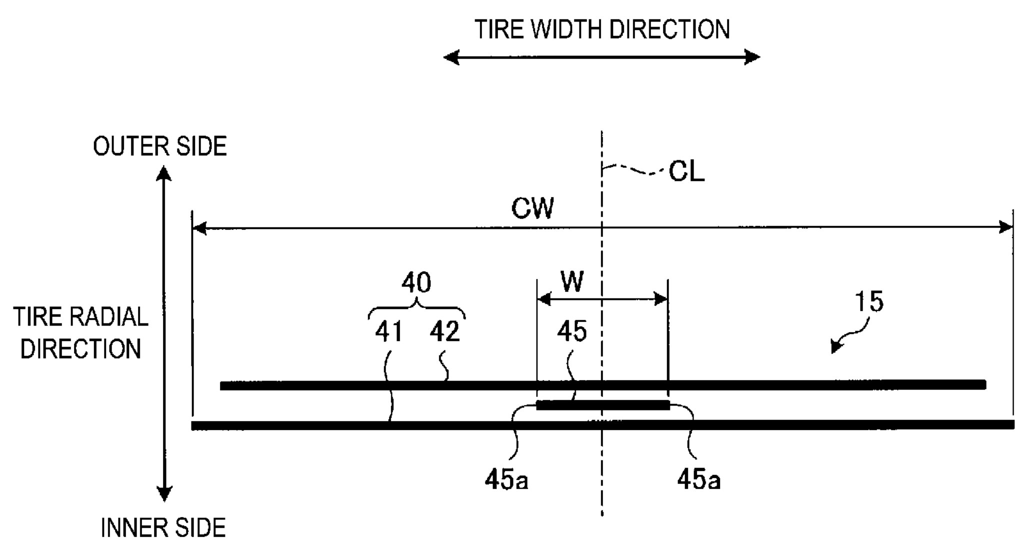
FIG. 3 is a schematic diagram of a belt cover layer illustrated in FIG. 2.

FIG. 2 is a detailed view of the tread portion 2 illustrated in FIG. 1. FIG. 3 is a schematic diagram of the belt cover layer 15 illustrated in FIG. 2. The belt cover layer 15 disposed on the outer side in the tire radial direction of the belt layer 14 includes two layers of full covers 40 layered in the tire radial direction, and a narrow cover 45 disposed between the two layers of the full covers 40. Of these, the two layers of the full covers 40 include an inner full cover 41 disposed on the outer side in the tire radial direction of the belt layer 14, and an outer full cover 42 disposed on the outer side in the tire radial direction of the inner full cover 41. In these inner full cover 41 and outer full cover 42, the inner full cover 41 has a width in the tire width direction wider than that of the outer full cover 42. The inner full cover 41 and the outer full cover 42 are both disposed between shoulder regions Ash on both sides in the tire width direction.

The narrow cover 45 is formed with a width in the tire width direction narrower than the width of the full cover 40, and is disposed at a position on the inner side in the tire width direction than the shoulder regions Ash. The belt cover layer 15 including these inner full cover 41, outer full cover 42, and narrow cover 45 is formed by layering the inner full cover 41, the narrow cover 45, and the outer full cover 42 in this order from the inner side to the outer side in the tire radial direction. Accordingly, the narrow cover 45, which has the narrowest width in the tire width direction, is completely covered in the tire width direction from the outer side in the tire radial direction with the outer full cover 42.

Note that the shoulder region Ash in this case is a region between a position P at 85% of the width of the belt layer 14 in the tire width direction and an end portion 144 of the belt layer 14 in the tire width direction. Specifically, in a tire meridian cross-section, the shoulder region Ash is a region positioned between two shoulder region boundary lines Lsh. The shoulder region boundary lines Lsh are respective lines perpendicularly extending from the position Pat 85% of the width of a widest belt 143 in the tire width direction, which has the widest width in the tire width direction among the plurality of belts 141, 142 provided with the belt layer 14, and the end portion 144 of the widest belt 143 to the tire inner surface 18. The shoulder regions Ash thus defined are defined on both sides of the tire equatorial plane CL in the tire width direction, and are positioned on respective both sides of the tire equatorial plane CL in the tire width direction.

In the present embodiment, of the two layers of the belts 141, 142 included in the belt layer 14, a width of the belt 141 in the tire width direction positioned on the inner side in the tire radial direction is wider than a width of the other belt 142 in the tire width direction, and the belt 141 positioned on the inner side in the tire radial direction is the widest belt 143.

Also, the positions P at 85% of the width of the widest belt 143 in the tire width direction are positions of end portions of a 85% region when a region of 85% of the width of the widest belt 143 in the tire width direction is evenly distributed on both sides in the tire width direction with the center of the widest belt 143 in the tire width direction or the position of the tire equatorial plane CL as the center. Accordingly, intervals between the positions P at 85% of the width of the widest belt 143 in the tire width direction and the end portions 144 of the widest belt 143 are identical sizes between both sides of the tire equatorial plane CL in the tire width direction.

The shoulder region Ash defined in this manner is defined by a shape in a state in which the pneumatic tire 1 is mounted on a regular rim and is inflated to the regular internal pressure. Here, "regular rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Moreover, a regular internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

Figure 4:
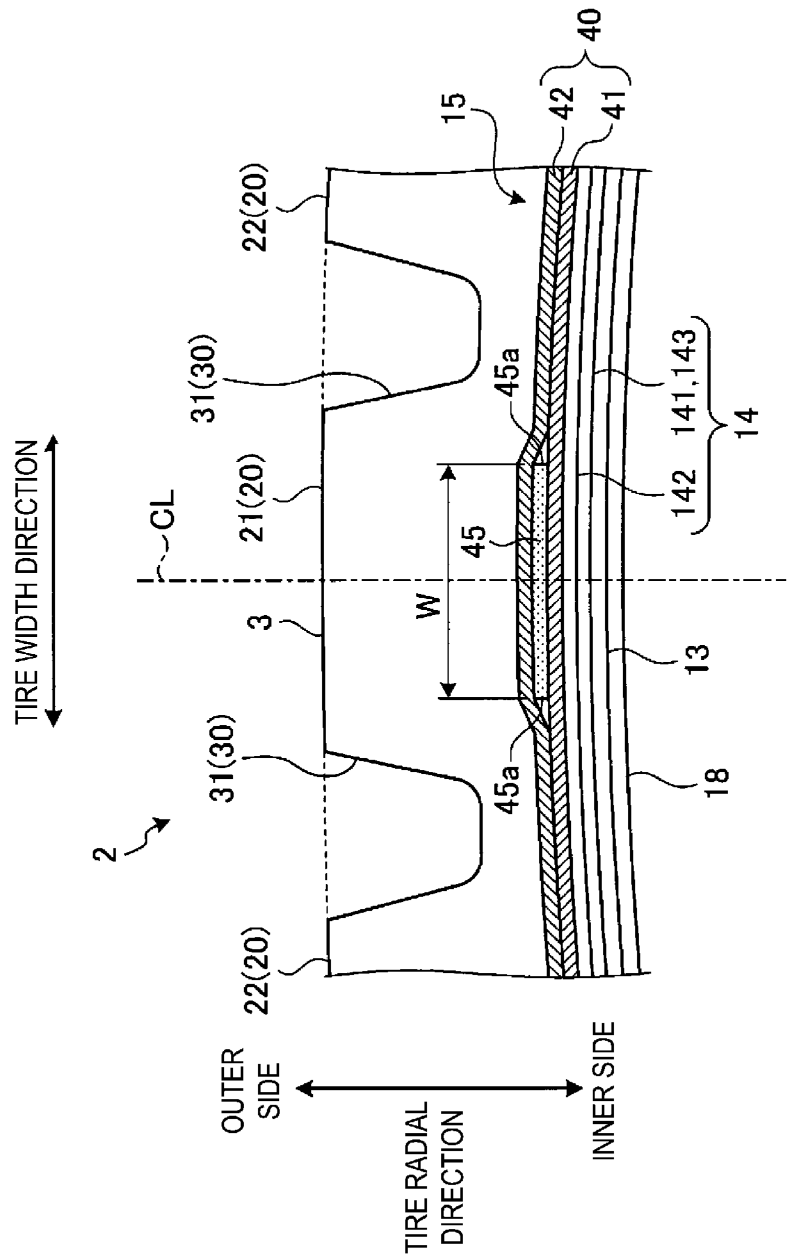
FIG. 4 is a detailed view of a center land portion illustrated in FIG. 2.

FIG. 4 is a detailed view of the center land portion 21 illustrated in FIG. 2. The narrow cover 45 sandwiched between the inner full cover 41 and the outer full cover 42 from both sides in the tire radial direction has a width W in the tire width direction within a range from not less than 5 mm to not greater than 40 mm. The width W of the narrow cover 45 in the tire width direction is within a range from not less than 5% to not greater than 30% of a width CW (see FIG. 2) of the belt cover layer 15 in the tire width direction. As such, the narrow cover 45 has end portions 45*a* on both sides in the tire width direction covered with the two layers of the full covers 40, that is, the end portions 45*a* on both sides of the narrow cover 45 in the tire width direction are covered with the outer full cover 42 with respect to the tread rubber layer 4. In the present embodiment, since the inner full cover 41 has the width in the tire width direction wider than that of the outer full cover 42, the width CW of the belt cover layer 15 in the tire width direction is the width CW of the inner full cover 41 in the tire width direction.

Additionally, the narrow cover 45 is disposed so as to go across the tire equatorial plane CL in the tire width direction. Furthermore, at least a part of the narrow cover 45 is positioned on the inner side of the center land portion 21 in the tire radial direction.

Figure 5:
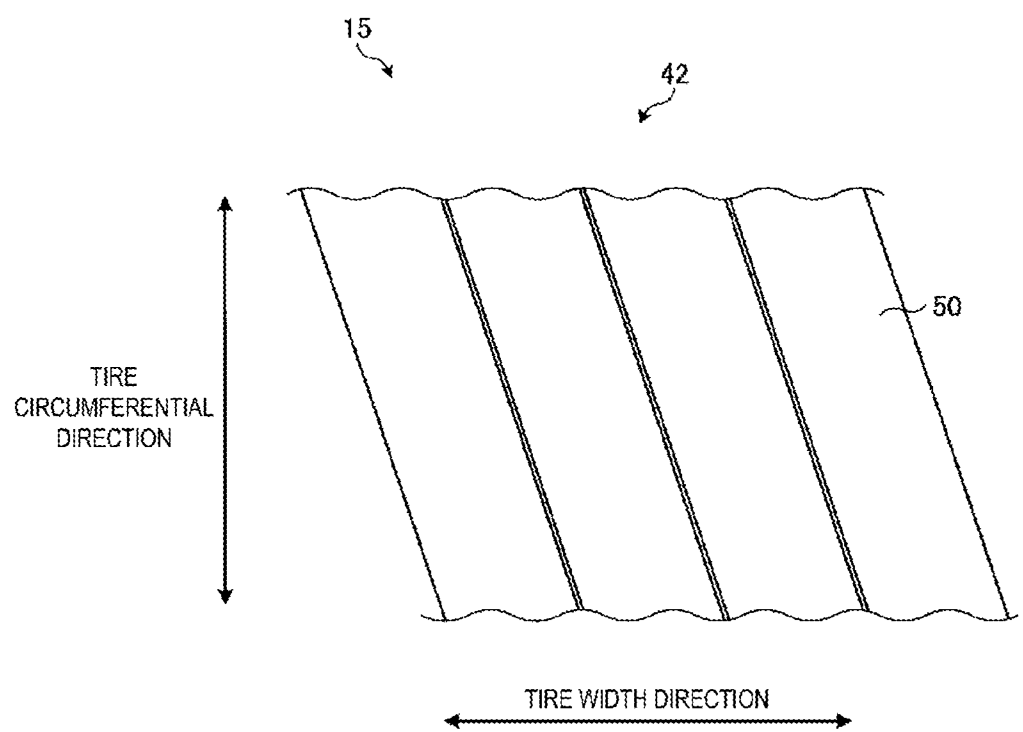
FIG. 5 is a schematic diagram of a belt cover material in a direction of the arrow A-A in FIG. 2.

FIG. 5 is a schematic diagram of a belt cover material 50 in a direction of the arrow A-A in FIG. 2. The full cover 40 and the narrow cover 45 are formed by spirally winding the respective band-like belt cover materials 50 around the tire rotation axis. Note that, to describe an aspect of disposing the belt cover material 50, while FIG. 5 representatively describes the belt cover material 50 forming the outer full cover 42 among the narrow cover 45 and the two layers of the full covers 40, the belt cover materials 50 that form the narrow cover 45 and the inner full cover 41 are also disposed in a similar aspect.

The belt cover material 50, which is a band-like member, has a width in a range from not less than 5 mm to not greater than 15 mm. The belt cover materials 50 are reinforcing layer constituent members constituting the belt cover layer 15, and a cord constituting the belt cover layer 15 is formed by being coated with a coating rubber.

The inner full cover 41 is formed by spirally winding the belt cover materials 50 thus formed on the outer side of the belt layer 14 in the tire radial direction around the tire rotation axis. In addition, the narrow cover 45 is formed by spirally winding the belt cover material 50 on the outer side of the inner full cover 41 in the tire radial direction around the tire rotation axis. Additionally, the outer full cover 42 is formed by spirally winding the belt cover material 50 on the outer side of the narrow cover 45 and the inner full cover 41 in the tire radial direction around the tire rotation axis.

The belt cover materials 50 forming the full covers 40, that is, the belt cover material 50 forming the inner full cover 41, the belt cover material 50 forming the outer full cover 42, and the belt cover material 50 forming the narrow cover 45 are members of an identical type, and the respective belt cover materials 50 are formed by coating the cords constituting the belt cover layer 15 with coating rubbers. In other words, all of these belt cover materials 50 have a configuration in which, for example, widths and thicknesses, wire diameters of the cords and intervals of the cords, and materials of the cords and the coating rubbers can be regarded as being identical.

Method for Manufacturing Pneumatic Tire

Next, the manufacturing method for the pneumatic tire 1 according to the embodiment will be described. To manufacture the pneumatic tire 1, first, processing is performed on each of the members constituting the pneumatic tire 1, and the processed members are assembled. That is, the rubber members, such as the tread rubber layer 4, and the respective members, such as the bead core 11, the carcass layer 13, the belt layer 14, and the belt cover layer 15 are each processed and the processed members are assembled. Of these, the belt cover layer 15 is disposed on the outer side in the tire radial direction of the belt layer 14 by spirally winding the band-like belt cover materials 50 on the outer side of the belt layer 14 in the tire radial direction around the tire rotation axis.

The belt cover layer 15 is formed by layering the inner full cover 41, the narrow cover 45, and the outer full cover 42 from the inside to the outside in the tire radial direction. A step of forming the belt cover layer 15 includes a step of forming the inner full cover 41, a step of forming the narrow cover 45, and a step of forming the outer full cover 42, and the step of forming the inner full cover 41 is performed first. In the step of forming the inner full cover 41, the belt cover material 50 is spirally wound on the outer side of the belt layer 14 in the tire radial direction between the shoulder regions Ash on both sides in the tire width direction to form the inner full cover 41 between the shoulder regions Ash.

Next, the step of forming the narrow cover 45 is performed. In the step of forming the narrow cover 45, the belt cover material 50 is spirally wound at a position on the inner side in the tire width direction than the shoulder regions Ash on the outer side of the inner full cover 41 in the tire radial direction to form the narrow cover 45 having a width in the tire width direction narrower than the width of the inner full cover 41 in the tire width direction.

Next, the step of forming the outer full cover 42 is performed. In the step of forming the outer full cover 42, the belt cover material 50 is spirally wound between the shoulder regions Ash on both sides in the tire width direction on the outer side of the narrow cover 45 and the inner full cover 41 in the tire radial direction to form the outer full cover 42 between the shoulder regions Ash.

As a result, the belt cover layer 15 is formed by layering the narrow cover 45 and the inner full cover 41 and the outer full cover 42, which are the full covers 40, from the inside to the outside in the tire radial direction on the outside of the belt layer 14 in the tire radial direction in the order of the inner full cover 41, the narrow cover 45, and the outer full cover 42. Also, by disposing the outer full cover 42 on the outer side of the narrow cover 45 in the tire radial direction between the shoulder regions Ash on both sides in the tire width direction, the narrow cover 45 is completely covered with the outer full cover 42 from the outer side in the tire radial direction of the narrow cover 45.

Functions and Effects

To mount the pneumatic tire 1 according to the present embodiment on a vehicle, a rim wheel R (see FIG. 6) is fitted to the bead portion 10 to mount the pneumatic tire 1 on the rim wheel R, and then the inner portion is filled with air, and the rim wheel R is mounted on the vehicle with the pneumatic tire 1 in an inflated state. The pneumatic tire 1 according to the present embodiment is, for example, the pneumatic tire 1 that can accommodate use at high loads, such as the pneumatic tire 1 with EXTRA LOAD standard. As such, the pneumatic tire 1 can be used with an air pressure at inflation in a relatively high state. Thus, when the pneumatic tire 1 is used at a high load, the pneumatic tire 1 is used at an increased air pressure. When the vehicle equipped with the pneumatic tires 1 travels, the pneumatic tire 1 rotates with the ground contact surface 3 at a portion positioned on a lower side in the ground contact surface 3 in contact with the road surface. The vehicle travels by transferring a driving force and a braking force to the road surface or generating a turning force due to the friction force between the ground contact surface 3 and the road surface.

For example, in a case where the vehicle on which the pneumatic tires 1 are mounted travels on a dry road surface, the vehicle travels mainly by transmitting a driving force or a braking force to the road surface or generating a turning force by a frictional force between the ground contact surface 3 and the road surface. When the vehicle travels on a wet road surface, the vehicle travels in such a way that water between the ground contact surface 3 and the road surface enters grooves, such as the main grooves 30 and the lug grooves, and the water between the ground contact surface 3 and the road surface is drained through these grooves. Accordingly, the ground contact surface 3 is easily grounded on the road surface, and the frictional force between the ground contact surface 3 and the road surface allows the vehicle to travel as desired.

Additionally, while the vehicle is traveling, the pneumatic tire 1 is subjected to a load associated with a weight of a vehicle body, acceleration/deceleration, and turning. Accordingly, a large load acts in the tire radial direction. This load is mainly received by air filled into the pneumatic tire 1, but is also received by the tread portion 2 and the sidewall portion 8 as well as the air inside the pneumatic tire 1. That is, the sidewall portion 8 transmits the load between the bead portion 10 to which the rim wheel R is fitted and the tread portion 2, and the tread portion 2 transmits the load between the sidewall portion 8 and the road surface. Accordingly, the large load acts on the sidewall portion 8 and the tread portion 2 while the vehicle is traveling, and the sidewall portion 8 and the tread portion 2 receive this load while deflecting mainly in the tire radial direction.

Additionally, while the vehicle is traveling, the pneumatic tire 1 rotates, so the position in the ground contact surface 3 that comes into contact with the road surface continuously moves in the tire circumferential direction. In accordance with this, the positions in the sidewall portion 8 and the tread portion 2 deflecting by the load while the vehicle is traveling also move in the tire circumferential direction. Thus, while the vehicle is traveling, the pneumatic tire 1 rotates while repeating the sequential deflection of the respective positions of the sidewall portion 8 and the tread portion 2 on the tire circumferential direction.

Additionally, a projection projecting from a road surface, such as a stone, is possibly present on a road surface on which the vehicle travels, and the vehicle during traveling possibly treads such a projection by the tread portion 2 of the pneumatic tire 1. At this time, when the sidewall portion 8 and the tread portion 2 have a small deflection due to the high air pressure filled in the pneumatic tire 1, the pneumatic tire 1 cannot absorb the change in the shape of the road surface due to the presence of the projection, and the projection possibly penetrates the tread portion 2 of the pneumatic tire 1. That is, in the pneumatic tire 1 with the increased internal pressure, when the projection on the road surface is trodden, the small deflection of the sidewall portion 8 and the tread portion 2 causes the projection to penetrate the tread portion 2, possibly causing a shock burst.

Figure 6:
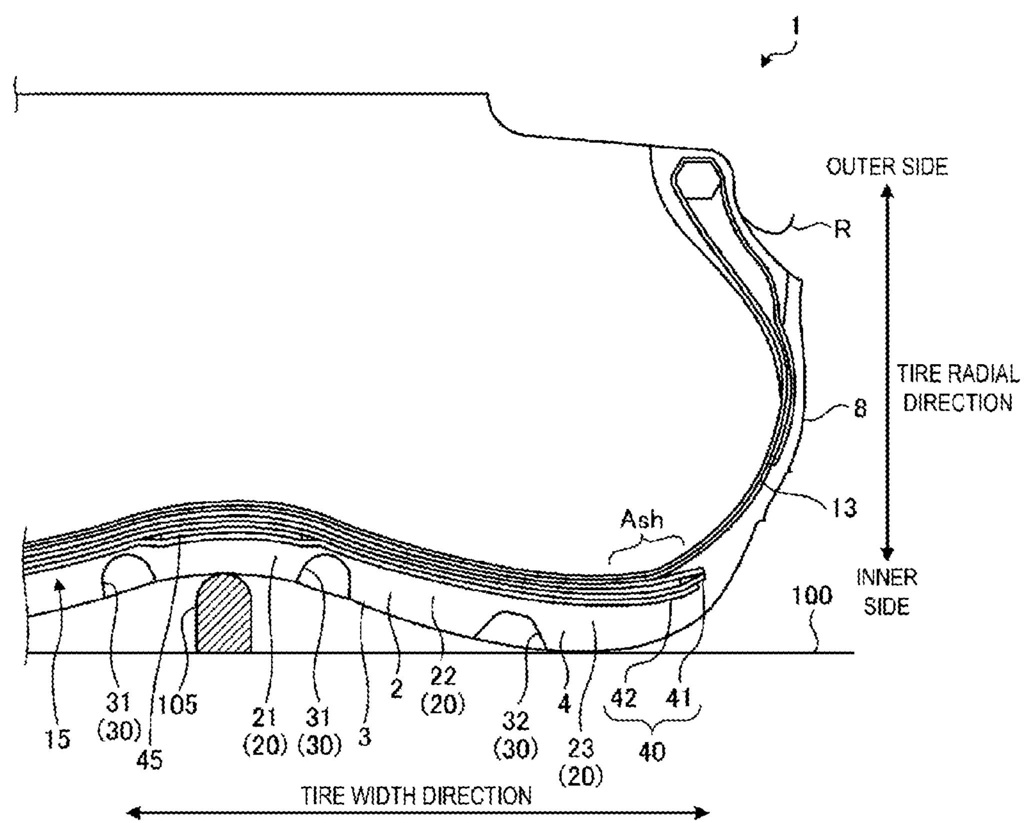
FIG. 6 is an explanatory diagram illustrating a state in which a projection on a road surface is trodden by the pneumatic tire according to an embodiment.

In contrast, in the pneumatic tire 1 according to the present embodiment, since the belt cover layer 15 includes the two layers of the full covers 40 layered in the tire radial direction and the narrow cover 45 disposed between the two layers of the full covers 40, a shock burst at an increased internal pressure can be suppressed. FIG. 6 is an explanatory diagram illustrating a state in which a projection 105 on a road surface 100 is trodden by the pneumatic tire 1 according to the embodiment. In the pneumatic tire 1 according to the present embodiment, the narrow cover 45 formed with the width in the tire width direction narrower than the width of the full cover 40 is disposed at the position on the inner side in the tire width direction than the shoulder regions Ash at the position between the two layers of the full covers 40. This allows increasing the number of layered belt cover materials 50 at the position where the narrow cover 45 is disposed. In other words, the number of the belt cover materials 50 layered in the tire radial direction in the belt cover layer 15 can be increased at the position across the tire equatorial plane CL. Specifically, in the belt cover layer 15, while the two layers of the full covers 40, the inner full cover 41 and the outer full cover 42, are layered at the position other than the position where the narrow cover 45 is disposed, three layers in which the narrow cover 45 is added to the two layers of the full covers 40 can be layered at the position where the narrow cover 45 is disposed. This allows increasing a strength at break at or near the center in the tire width direction of the tread portion 2 where a ground contact pressure is likely to increase. Even when the projection 105 on the road surface 100 is trodden at or near the center land portion 21, the penetration of the projection 105 through the tread portion 2 can be suppressed. Accordingly, shock bursts caused by the projection 105 being trodden during traveling of the vehicle can be suppressed.

In addition, the narrow cover 45 is disposed to be sandwiched in the tire radial direction between the two layers of the full covers 40, which are disposed between the shoulder regions Ash on both sides in the tire width direction. Accordingly, separation at or near the end portions **45*a* in the tire width direction of the narrow cover 45 from the tread rubber layer 4 can be suppressed. In other words, since physical properties of the belt cover materials 50 forming the belt cover layer 15 differ from the tread rubber layer 4, when the tread portion 2 deflects, the belt cover layer 15 and the tread rubber layer 4 deflect in a state of different elasticities. As a result, when the narrow cover 45 is disposed adjacent to the tread rubber layer 4, stress is likely to concentrate at or near the end portion 45*a* in the tire width direction of the narrow cover 45, which is a boundary portion between the belt cover layer 15 and the tread rubber layer 4 with the different elasticities. In this case, repetitive variation of a load acting on the narrow cover 45 along with the traveling of the vehicle possibly makes it easy for the narrow cover 45 and the tread rubber layer 4 to separate at or near the end portion 45*a* of the narrow cover 45**.

In contrast, when the narrow cover 45 is disposed to be sandwiched between the two layers of the full covers 40 in the tire radial direction, the narrow cover 45 can be disposed without the end portions **45*a* of the narrow cover 45 in direct contact with the tread rubber layer 4. As a result, a contact between the end portion 45*a* of the narrow cover 45 and the tread rubber layer 4 at the position at or near the center of the tread portion 2 in the tire width direction where a variation in load is large can be suppressed. This allows suppressing the boundary portion between the belt cover layer 15 and the tread rubber layer 4 having the different elasticities to position at or near the center of the tread portion 2 in the tire width direction. As a result, a so-called edge separation, which is a separation between the narrow cover 45 and the tread rubber layer 4 from at or near the end portion 45*a* of the narrow cover 45**, can be suppressed, and separation resistance performance can be ensured. As a result, it is possible to improve shock burst resistance performance while suppressing the decrease in separation resistance performance.

In addition, since the width W of the narrow cover 45 in the tire width direction is within a range from not less than 5 mm to not greater than 40 mm, it is possible to more reliably improve the strength at break at or near the center of the tread portion 2 in the tire width direction while suppressing an excessive increase in weight of the belt cover layer 15. In other words, when the width W of the narrow cover 45 in the tire width direction is less than 5 mm, the width W of the narrow cover 45 is excessively small, which possibly makes it difficult to effectively ensure the strength at or near the position where the narrow cover 45 is disposed. In this case, even when the narrow cover 45 is disposed, effectively improving the strength at break at or near the center of the tread portion 2 in the tire width direction is difficult, and this possibly makes it difficult to effectively suppress the penetration of the projection 105 trodden by the tread portion 2 through the tread portion 2. When the width W of the narrow cover 45 in the tire width direction is greater than 40 mm, the width W of the narrow cover 45 is excessively large, so there is a possibility that the belt cover material 50 used becomes excessively large. In this case, the weight of the belt cover layer 15 possibly excessively increases, and the weight of the pneumatic tire 1 possibly excessively increases caused by the provision of the narrow cover 45.

In contrast, when the width W of the narrow cover 45 in the tire width direction is within a range from not less than 5 mm to not greater than 40 mm, while the excessive increase in the weight of the belt cover layer 15 is suppressed, the strength at or near the position where the narrow cover 45 is disposed can be more reliably ensured, and the strength at break at or near the center of the tread portion 2 in the tire width direction where a ground contact pressure is likely to increase can be more reliably improved. As a result, while the increase in the weight of the pneumatic tire 1 is suppressed, shock burst resistance performance can be improved.

Additionally, the width W of the narrow cover 45 in the tire width direction is within a range from not less than 5% to not greater than 30% of the width CW of the belt cover layer 15 in the tire width direction, so it is possible to reliably improve the strength at break at or near the center of the tread portion 2 in the tire width direction while suppressing the excessive increase in the weight of the belt cover layer 15. In other words, when the width W of the narrow cover 45 in the tire width direction is less than 5% of the width CW of the belt cover layer 15, the width W of the narrow cover 45 in the tire width direction is excessively narrow, and thus, effectively ensuring the strength at or near the position where the narrow cover 45 is disposed is possibly difficult. In this case, even when the narrow cover 45 is disposed, effectively improving the strength at break at or near the center of the tread portion 2 in the tire width direction is difficult, and this possibly makes it difficult to effectively suppress the penetration of the projection 105 trodden by the tread portion 2 through the tread portion 2.

When the width W of the narrow cover 45 in the tire width direction is greater than 30% of the width CW of the belt cover layer 15, the width W of the narrow cover 45 in the tire width direction is excessively large, which possibly causes the excessive increase in the weight of the belt cover layer 15. In this case, the weight of the pneumatic tire 1 is possibly excessively increased caused by the provision of the narrow cover 45.

In contrast, when the width W of the narrow cover 45 in the tire width direction is within a range from not less than 5% to not greater than 30% of the width CW of the belt cover layer 15, the strength at or near the position where the narrow cover 45 is disposed can be more reliably ensured while suppressing the excessive increase in the weight of the belt cover layer 15. As a result, while the increase in the weight of the pneumatic tire 1 can be suppressed, shock burst resistance performance can be improved.

In addition, in the full cover 40 and the narrow cover 45, the belt cover material 50 forming the full cover 40 and the belt cover material 50 forming the narrow cover 45 are the identical type. Thus, the full cover 40 and the narrow cover 45 can be formed without separately preparing the belt cover material 50 for the full cover 40 or the belt cover material 50 for the narrow cover 45. As a result, a decrease in productivity when the full cover 40 and the narrow cover 45 are formed using the belt cover materials 50 can be suppressed. In addition, since the belt cover material 50 forming the full cover 40 and the belt cover material 50 forming the narrow cover 45 are the identical type, the strength at or near the position where the narrow cover 45 is disposed can be appropriately improved in accordance with the disposal range of the narrow cover 45 disposed between the two layers of the full covers 40. As a result, while the decrease in productivity is suppressed, shock burst resistance performance can be more reliably improved.

Additionally, because the narrow cover 45 is disposed across the tire equatorial plane CL in the tire width direction, the strength at break at the position in the tread portion 2 where the ground contact pressure is likely to increase while the vehicle is traveling can be more reliably increased. As a result, the shock burst when the projection 105 on the road surface 100 is trodden can be more reliably suppressed. As a result, it is possible to improve shock burst resistance performance more reliably.

In addition, because at least a part of the narrow cover 45 is positioned on the inner side in the tire radial direction of the center land portion 21, the strength at break at the position at or near the center of the center land portion 21 in the tread portion 2 where a ground contact pressure is likely to increase while the vehicle is traveling can be more reliably increased. As a result, the shock burst when the projection 105 on the road surface 100 is trodden by the center land portion 21 can be more reliably suppressed. As a result, it is possible to improve shock burst resistance performance more reliably.

The method for manufacturing the pneumatic tire 1 according to the embodiment includes: the step of spirally winding the belt cover material 50 on the outer side in the tire radial direction of the belt layer 14 to form the inner full cover 41; and the step of spirally winding the belt cover material 50 on the outer side in the tire radial direction of the inner full cover 41 to form the narrow cover 45. Accordingly, the strength at break at or near the center of the tread portion 2 in the tire width direction where a ground contact pressure is likely to increase can be increased. As a result, even when the projection 105 on the road surface 100 is trodden by the vicinity of the center land portion 21, the penetration of the projection 105 through the tread portion 2 can be suppressed, and a shock burst caused by the tread of the projection 105 during traveling of the vehicle can be suppressed.

Furthermore, since the step of spirally winding the belt cover material 50 on the outer side in the tire radial direction of the narrow cover 45 and the inner full cover 41 to form the outer full cover 42 is included, the narrow cover 45 can be completely covered from the outer side in the tire radial direction of the narrow cover 45 with the outer full cover 42. This allows suppressing the direct contact between the end portion 45*a* of the narrow cover 45 and the tread rubber layer 4 at the position at or near the center of the tread portion 2 in the tire width direction where a variation in load is large, and allows suppressing the boundary portion between the belt cover layer 15 and the tread rubber layer 4 having the different elasticities to be positioned at or near the center of the tread portion 2 in the tire width direction. As a result, a so-called edge separation, which is a separation between the narrow cover 45 and the tread rubber layer 4 from at or near the end portion 45*a* of the narrow cover 45, can be suppressed from, and separation resistance performance can be ensured. As a result, it is possible to improve shock burst resistance performance while suppressing a decrease in separation resistance performance.

MODIFIED EXAMPLES

Figure 7:
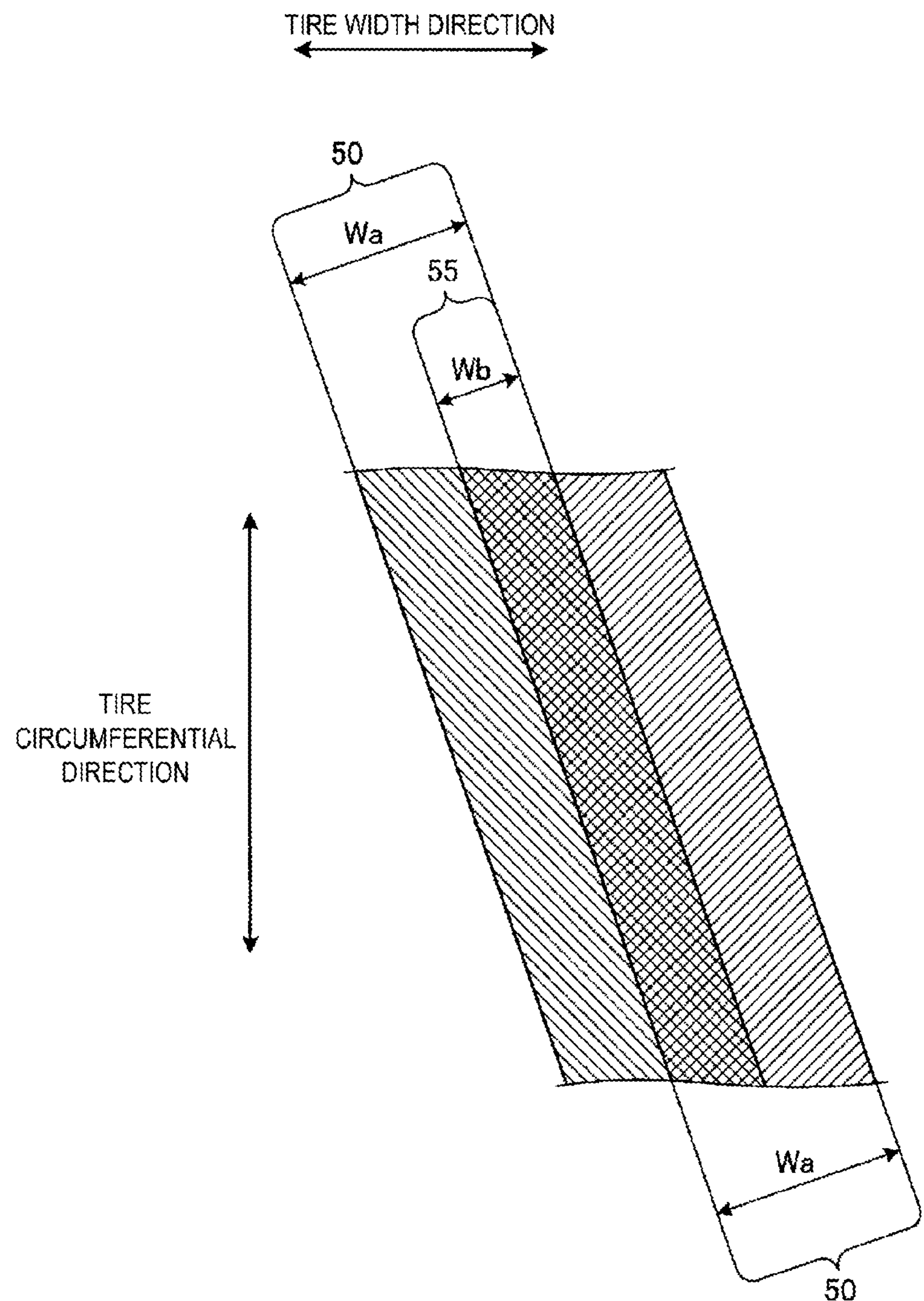
FIG. 7 is a modified example of the pneumatic tire according to an embodiment, and is an explanatory diagram in a case where the belt cover material is overlappingly wound.

Note that in the embodiments described above, the belt cover materials 50, which form the full covers 40 and the narrow cover 45, are spirally wound while portions adjacent in the tire width direction are aligned in the tire width direction without the portions adjacent in the tire width direction in one belt cover material 50 overlapping in the tire radial direction. However, winding may be performed with one belt cover material 50 overlapped. FIG. 7 is a modified example of the pneumatic tire 1 according to the embodiment, and is an explanatory diagram in a case where the belt cover material 50 is overlappingly wound. As illustrated in FIG. 7, the respective belt cover materials 50 that are spirally wound may be spirally wound while the portions adjacent in the tire width direction in one belt cover material 50 overlap in the tire radial direction at a width within a predetermined range. In this manner, in an adjacent wrap portion 55 as a portion in one belt cover material 50 where the portions adjacent in the tire width direction overlap in the tire radial direction, a width Wb in the width direction of the belt cover material 50 is preferably within a range from not less than 20% to not greater than 70% of a width Wa of the belt cover material 50.

The belt cover material 50 is spirally wound while the portions adjacent in the tire width direction are overlapped, and is spirally wound while the adjacent wrap portion 55 is formed. Thus, the belt cover layer 15 can be disposed with further high strength. As a result, the strength at break of the tread portion 2 can be increased to a further wide range by the belt cover layer 15, and a shock burst can be more reliably suppressed.

In the above-described embodiment, four main grooves 30 are formed, but the number of main grooves 30 may be other than four. In the embodiments described above, although the center land portion 21 is positioned on the tire equatorial plane CL, the land portion 20 needs not to be positioned on the tire equatorial plane CL. For example, the main groove 30 may be positioned on the tire equatorial plane CL. When the main groove 30 is positioned on the tire equatorial plane CL, at least a part of the narrow cover 45 is preferably positioned on the inner side in the tire radial direction of the land portion 20 closest to the tire equatorial plane CL among the plurality of land portions 20.

In the embodiments described above, in the two layers of the full covers 40, the inner full cover 41 has the width in the tire width direction wider than that of the outer full cover 42, but the relationship between the widths of the two layers of the full covers 40 may be other than that. For example, the outer full cover 42 may have the width in the tire width direction wider than that of the inner full cover 41, and the widths in the tire width direction of the inner full cover 41 and the outer full cover 42 may be the identical width. As long as each of the two layers of the full covers 40 are disposed between the shoulder regions Ash on both sides in the tire width direction, any relative relationship between the widths in the tire width direction is employed.

Furthermore, the above-described embodiments and modified examples may be combined as appropriate. In the pneumatic tire 1, at least the narrow cover 45 with the width in the tire width direction formed narrower than the widths of the full covers 40 is disposed between the two layers of the full covers 40 at the position on the inner side in the tire width direction than the shoulder regions Ash. This allows improving shock resistance burst performance while suppressing the decrease in separation resistance performance.

EXAMPLES

FIGS. 8A and 8B are tables showing results of performance evaluation tests of pneumatic tires. Hereinafter, evaluation tests of performance of the pneumatic tire 1 described above performed on pneumatic tires of Conventional Examples and the pneumatic tires 1 according to the embodiments of the present technology will be described. The performance evaluation tests performed a plunger test, which is an evaluation test for shock burst resistance performance, and a test on separation resistance performance, which is performance of unlikeliness of edge separation.

The performance evaluation tests were performed using the pneumatic tire 1 having the nominal size of 275/45ZR19 105Y of the tire defined by JATMA and mounted on a standard rim wheel of JATMA having a rim size of 19×9.5 J. The evaluation method for each of the test items was evaluated for the plunger test by filling the test tire with an air pressure of a regular internal pressure, performing a plunger breakage test, in accordance with JIS K6302 with a plunger diameter of 19 mm and an insertion speed of 50 mm/minute, and measuring a tire breaking energy J. The evaluation results of the plunger test show that the greater the measured tire breaking energy J is, the superior a tire strength is and the superior shock burst resistance performance is.

In addition, the separation resistance performance was evaluated by high-speed durability test. For the high-speed durability test, the test tires were inflated to an internal pressure 120% increase of the regular internal pressure and subjected to drying degradation for five days in an 80° C.-temperature environment. Thereafter, the test tires were inflated to the regular internal pressure and put on a 1707-mm-drum-diameter drum testing machine with a camber. Traveling was started at a speed of 120 km/h and a load of 5 kN applied to the test tires. While the speed was increased by 10 km/h every 24 hours, the test was performed until the tire failed, and a traveling distance until the failure was measured. The separation resistance performance is expressed as index evaluations of the traveling distance measured in the high-speed durability test with Conventional Example 2 described below being assigned as 100. Larger index values indicate longer traveling distance until the tire fails and superior separation resistance performance.

The performance evaluation test was performed on 13 types of pneumatic tires, which were pneumatic tires of Conventional Examples 1 and 2 as examples of the conventional pneumatic tires and Examples 1 to 11 as the pneumatic tires 1 according to the embodiments of the present technology. Of these, the pneumatic tire of Conventional Example 1 does not include the narrow cover 45 in the belt cover layer 15. In the pneumatic tire of Conventional Example 2, the belt cover layer 15 includes the narrow cover 45, but does not include the two layers of the full covers 40 between which the narrow cover 45 is sandwiched, and the narrow cover 45 is in direct contact with the tread rubber layer 4.

In contrast, in Examples 1 to 11, which are the examples of the pneumatic tires 1 according to the embodiments of the present technology, all of the belt cover layers 15 include the narrow covers 45, and the narrow covers 45 are sandwiched in the tire radial direction by the two layers of the full covers 40. Moreover, in the pneumatic tires 1 according to Examples 1 to 11, the respective width W of the narrow cover 45 and width W of the narrow cover 45 to the width CW of the belt cover layer 15 differ.

As the result of the performance evaluation tests using these pneumatic tires 1, as shown in FIGS. 8A and 8B, it has been found that the pneumatic tires 1 according to Examples 1 to 11 can improve shock burst resistance performance evaluated by the plunger test compared to those of Conventional Examples 1, 2 without degrading separation resistance performance as compared to those of Conventional Examples 1, 2. In other words, the pneumatic tires 1 according to Examples 1 to 11 and the manufacturing method for the pneumatic tires 1 according to Examples 1 to 11 can improve shock burst resistance performance while suppressing a decrease in separation resistance performance.

The invention claimed is:

1. A pneumatic tire, comprising:

a tread portion;

a belt layer disposed in the tread portion; and a belt cover layer disposed on an outer side in a tire radial direction of the belt layer, the belt cover layer comprising:

two layers of full covers disposed between shoulder regions on both sides in a tire width direction and layered in the tire radial direction, each of the full covers extending continuously from one of the shoulder regions to another one of the shoulder regions; and a narrow cover formed with a width in the tire width direction narrower than widths of the full covers, the narrow cover being disposed at a position between the two layers of the full covers and on an inner side in the tire width direction than the shoulder regions;

wherein the full covers and the narrow cover are formed by spirally winding each of band-like cover materials around a tire rotation axis, and the belt cover materials that form the narrow cover are an identical type.

2. The pneumatic tire according to claim 1, wherein the narrow cover has the width in the tire width direction in a range from not less than 5 mm to not greater than 40 mm.

3. The pneumatic tire according to claim 1, wherein the narrow cover has the width in the tire width direction in a range from not less than 5% to not greater than 30% of a width of the belt cover layer in the tire width direction.

4. The pneumatic tire according to claim 1, wherein the narrow cover is disposed across a tire equatorial plane in the tire width direction.

5. The pneumatic tire according to claim 1, wherein main grooves extending in a tire circumferential direction are formed in the tread portion, and a plurality of land portions are defined by the main grooves, and at least a part of the narrow cover is positioned on an inner side in the tire radial direction of the land portion closest to a tire equatorial plane among the plurality of land portions.

6. A method for manufacturing a pneumatic tire that spirally winds band-like belt cover materials on an outer side in a tire radial direction of a belt layer around a tire rotation axis to dispose a belt cover layer, the belt cover layer being formed by layering an inner full cover, a narrow cover, and an outer full cover from inside to outside in the tire radial direction, the method comprising:

spirally winding each of the belt cover materials on the outer side in the tire radial direction of the belt layer between shoulder regions on both sides in a tire width direction to form the inner full cover between the shoulder regions;

spirally winding each of the belt cover materials at a position on the outer side in the tire radial direction of the inner full cover and on an inner side in the tire width direction than the shoulder regions to form the narrow cover with a width in the tire width direction narrower than a width of the inner full cover in the tire width direction; and spirally winding each of the belt cover materials on the outer side in the tire radial direction of the narrow cover and the inner full cover between the shoulder regions on both the sides in the tire width direction to form the outer full cover between the shoulder regions;

wherein each of the inner full cover and the outer full cover is wound to extend continuously from one of the shoulder regions to another one of the shoulder regions, and the belt cover materials that form the full covers and each of the belt cover materials that form the narrow cover are an identical type.

7. The pneumatic tire according to claim 2, wherein the narrow cover has the width in the tire width direction in a range from not less than 5% to not greater than 30% of a width of the belt cover layer in the tire width direction.

8. The pneumatic tire according to claim 7 wherein the narrow narrow cover is disposed across a tire equatorial plane in the tire width direction.

9. The pneumatic tire according to claim 8, wherein main grooves extending in a tire circumferential direction are formed in the tread portion, and a plurality of land portions are defined by the main grooves, and at least a part of the narrow cover is positioned on an inner side in the tire radial direction of the land portion closest to a tire equatorial plane among the plurality of land portions.

* * * * *

SEQUENCE LISTING

```
<160> NUMBER OF SEQ ID NOS: 75

<210> SEQ ID NO 1
<211> LENGTH: 7801
<212> TYPE: DNA
<213> ORGANISM: Homo sapiens

<400> SEQUENCE: 1

gtggtggccg cgcacccggc cgcggctgat tcattcactt caagtgccgt gcagaaggct      60

cggcaggcgg ggcgggcgtg gggccgcggc tccgggttgg ggaccgagga gatccggctg     120
```

```
tggaccagac gctcctctgc ggggcgggca cccaagcgcg ctcgccaccc cctcgccatc    180
cgctagagcc gggctcctgg actgggactc gggcccgccg cacagttgaa aagtcgcata    240
gtggtttttc cgctcgcgtc gctgtgtgaa agttggctcg ccgctctttg cacgccctcc    300
ctggaggccg acccgagacg ccaagctgga gagaccgtgc ctccccgagg ccggccgccc    360
cgcgagcaca gcctccgccc ccgttgcact gccgggctgg gcaatatgaa ggagcagccc    420
tcatgtgccg gcaccgggca tccgagcatg gcggggtatg gcaggatggc cccctttgaa    480
ctcgctagcg gacccgtgaa gcgcttgaga actgagtccc cctttccctg tctcttcgca    540
gaggaggcct accagaaact ggccagcgag accctggagg agctggactg gtgtctggac    600
cagctagaga ccctacagac caggcactcc gtcagtgaga tggcctccaa caagtttaaa    660
aggatgctta atcgggagct cacccatctc tctgaaatga gtcggtctgg aaatcaagtg    720
tcagagttta tatcaaacac attcttagat aagcaacatg aagtggaaat tccttctcca    780
actcagaagg aaaaggagaa aaagaaaaga ccaatgtctc agatcagtgg agtcaagaaa    840
ttgatgcaca gctctagtct gactaattca agtatcccaa ggtttggagt taaaactgaa    900
caagaagatg tccttgccaa ggaactagaa gatgtgaaca aatggggtct tcatgttttc    960
agaatagcag agttgtctgg taaccggccc ttgactgtta tcatgcacac catttttcag   1020
gaacgggatt tattaaaaac atttaaaatt ccagtagata ctttaattac atatcttatg   1080
actctcgaag accattacca tgctgatgtg gcctatcaca acaatatcca tgctgcagat   1140
gttgtccagt ctactcatgt gctattatct acacctgctt tggaggctgt gtttacagat   1200
ttggagattc ttgcagcaat tttgccagt gcaatacatg atgtagatca tcctggtgtg   1260
tccaatcaat ttctgatcaa tacaaactct gaacttgcct tgatgtacaa tgattcctca   1320
gtcttagaga accatcattt ggctgtgggc tttaaattgc ttcaggaaga aaactgtgac   1380
attttccaga atttgaccaa aaaacaaaga caatctttaa ggaaaatggt cattgacatc   1440
gtacttgcaa cagatatgtc aaaacacatg aatctactgg ctgatttgaa gactatggtt   1500
gaaactaaga aagtgacaag ctctggagtt cttcttcttg ataattattc cgataggatt   1560
caggttcttc agaatatggt gcactgtgca gatctgagca acccaacaaa gcctctccag   1620
ctgtaccgcc agtggacgga ccggataatg gaggagttct tccgccaagg agaccgagag   1680
agggaacgtg gcatggagat aagccccatg tgtgacaagc acaatgcttc cgtggaaaaa   1740
tcacaggtgg gcttcataga ctatattgtt catcccctct gggagacatg ggcagacctc   1800
gtccaccctg acgcccagga tattttggac actttggagg acaatcgtga atggtaccag   1860
agcacaatcc ctcagagccc ctctcctgca cctgatgacc cagaggaggg ccggcagggt   1920
caaactgaga aattccagtt tgaactaact ttagaggaag atggtgagtc agacacggaa   1980
aaggacagtg gcagtcaagt ggaagaagac actagctgca gtgactccaa gactctttgt   2040
actcaagact cagagtctac tgaaattccc cttgatgaac aggttgaaga ggaggcagta   2100
ggggaagaag aggaaagcca gcctgaagcc tgtgtcatag atgatcgttc tcctgacacg   2160
taacagtgca aaaactttca tgcctttttt ttttttaagt agaaaaattg tttccaaagt   2220
gcatgtcaca tgccacaacc acggtcacac ctcactgtca tctgccagga cgtttgttga   2280
acaaaactga ccttgactac tcagtccagc gctcaggaat atcgtaacca gttttttcac   2340
ctccatgtca tccgagcaag gtggacatct tcacgaacag cgtttttaac aagatttcag   2400
cttggtagag ctgacaaagc agataaaatc tactccaaat tattttcaag agagtgtgac   2460
```

```
tcatcaggca gcccaaaagt ttattggact tggggtttct attccttttt atttgtttgc   2520
aatattttca gaagaaaggc attgcacaga gtgaacttaa tggacgaagc aacaaatatg   2580
tcaagaacag gacatagcac gaatctgtta ccagtaggag gaggatgagc cacagaaatt   2640
gcataatttt ctaatttcaa gtcttcctga tacatgactg aatagtgtgg ttcagtgagc   2700
tgcactgacc tctacatttt gtatgatatg taaaacagat tttttgtaga gcttactttt   2760
attattaaat gtattgaggt attatattta aaaaaaacta tgttcagaac ttcatctgcc   2820
actggttatt tttttctaag gagtaacttg caagttttca gtacaaatct gtgctacact   2880
ggataaaaat ctaatttatg aattttactt gcaccttata gttcatagca attaactgat   2940
ttgtagtgat tcattgtttg ttttatatac caatgacttc catattttaa aagagaaaaa   3000
caactttatg ttgcaggaaa ccctttttgt aagtctttat tatttacttt gcattttgtt   3060
tcactctttc cagataagca gagttgctct tcaccagtgt tttcttcat gtgcaaagtg    3120
actatttgtt ctataatact tttatgtgtg ttatatcaaa tgtgtcttaa gcttcatgca   3180
aactcagtca tcagttcgtg ttgtctgaag caagtgggag atatataaat acccagtagc   3240
taaaatggtc agtctttttt agatgttttc ctacttagta tctcctaata acgttttgct   3300
gtgtcactag atgttcattt cacaagtgca tgtctttcta ataatccaca catttcatgc   3360
tctaataatc cacacatttc atgctcattt ttattgtttt tacagccagt tatagtaaga   3420
aaaaggtttt tccccttgtg ctgctttata atttagcgtg tgtctgaacc ttatccatgt   3480
ttgctagatg aggtcttgtc aaatatatca ctaccattgt caccggtgaa aagaaacagg   3540
tagttaagtt agggttaaca ttcatttcaa ccacgaggtt gtatatcatg actagctttt   3600
actcttggtt tacagagaaa agttaaacag ccaactaggc agtttttaag aatattaaca   3660
atatattaac aaacaccaat acaactaatc ctatttggtt ttaatgattt caccatggga   3720
ttaagaacta tatcaggaac atccctgaga aacggtttta agtgtagcaa ctactcttcc   3780
ttaatggaca gccacataac gtgtaggaag tcctttatca cttatcctcg atccataagc   3840
atatcttgca gaggggaact acttctttaa acacatggag ggaaagaaga tgatgccact   3900
ggcaccagag ggttagtact gtgatgcatc ctaaaatatt tattatattg gtaaaaattc   3960
tggttaaata aaaaattaga gatcactctt ggctgatttc agcaccagga actgtattac   4020
agttttagag attaattcct agtgtttacc tgattatagc agttggcatc atggggcatt   4080
taattctgac tttatcccca cgtcagcctt aataaagtct tctttacctt ctctatgaag   4140
actttaaagc ccaaataatc atttttcaca ttgatattca agaattgaga tagatagaag   4200
ccaaagtggg tatctgacaa gtggaaaatc aaacgtttaa gaagaattac aactctgaaa   4260
agcatttata tgtggaactt ctcaaggagc ctcctgggga ctggaaagta agtcatcagc   4320
caggcaaatg actcatgctg aagagagtcc ccatttcagt cccctgagat ctagctgatg   4380
cttagatcct ttgaaataaa aattatgtct ttataactct gatcttttac ataaagcaga   4440
agaggaatca actagttaat tgcaaggttt ctactctgtt tcctctgtaa agatcagatg   4500
gtaatctttc aaataagaaa aaaataaaga cgtatgtttg accaagtagt ttcacaagaa   4560
tatttgggaa cttgtttctt ttaattttat ttgtccctga gtgaagtcta gaaagaaagg   4620
taaagagtct agagtttatt cctctttcca aaacattctc attcctctcc tccctacact   4680
tagtatttcc cccacagagt gcctagaatc ttaataatga ataaaataaa aagcagcaat   4740
atgtcattaa caaatccaga cctgaaaggg taaagggttt ataactgcac taataaagag   4800
aggctctttt tttttcttcc agtttgttgg tttttaatgg taccgtgttg taaagatacc   4860
```

```
cactaatgga caatcaaatt gcagaaaagg ctcaatatcc aagagacagg gactaatgca   4920
ctgtacaatc tgcttatcct tgcccttctc tcttgccaaa gtgtgcttca gaaatatata   4980
ctgctttaaa aaagaataaa agaatatcct tttacaagtg gctttacatt tcctaaaatg   5040
ccataagaaa atgcaatatc tgggtactgt atggggaaaa aaatgtccaa gtttgtgtaa   5100
aaccagtgca tttcagcttg caagttactg aacacaataa tgctgtttta attttgtttt   5160
atatcagtta aaattcacaa taatgtagat agaacaaatt acagacaagg aaagaaaaaa   5220
cttgaatgaa atggatttta cagaaagctt tatgataatt tttgaatgca ttatttattt   5280
tttgtgccat gcattttttt tctcaccaaa tgaccttacc tgtaatacag tcttgtttgt   5340
ctgtttacaa ccatgtattt attgcaatgt acatactgta atgttaattg taaattatct   5400
gttcttatta aaacatcatc ccatgatggg atggtgttga tatatttgga aactcttggt   5460
gagagaatga atggtgtgta tacatactct gtacattttt cttttctcct gtaatatagt   5520
cttgtcacct tagagcttgt ttatggaaga ttcaagaaaa ctataaaata cttaaagata   5580
tataaattta aaaaaacata gctgcaggtc tttggtccca gggctgtgcc ttaactttaa   5640
ccaatatttt cttctgtttt gctgcatttg aaaggtaaca gtggagctag ggctgggcat   5700
tttacatcca ggcttttaat tgattagaat tctgccaata ggtggatttt acaaaaccac   5760
agacaacctc tgaaagattc tgagaccctt ttgagacaga agctcttaag tacttcttgc   5820
cagggagcag cactgcatgt gtgatggttg tttgccatct gttgatcagg aactacttca   5880
gctacttgca tttgattatt tccttttttt ttttttttaa ctcggaaaca caactgggga   5940
aatatattct ttcccagtga ttataaacaa tctttttctt ttttttaagt ccttttggct   6000
tctagagctc ataggaaaat ggacttgatt tgaaattgga gccagagttt actcgtgttg   6060
gttatctatt catcagcttc ctgacatgtt aagagaatac attaaagaga aaatactgtt   6120
ttttaatcct aaaatttttc ttccactaag ataaaccaaa tgtccttaca tatatgtaaa   6180
cccatctatt taaacgcaaa ggtgggttga tgtcagttta catagcagaa agcattcact   6240
atcctctaag atttgtttct gcaaaacttt cattgcttta gaattttaaa atttcacctt   6300
gtacaatggc cagcccctaa agcaggaaac atttataatg gattatatgg aaacatcctc   6360
ccagtacttg cccagccctt gaatcatgtg gcttttcagt gaaaggaaag attctttttc   6420
taggaaaaat gagcctattt tattttattt tattttattt tttgacacaa actgtagatt   6480
ttagcagccc tggcccaaag gaatttgatt acttttgttt taaacagtac aaaggggaca   6540
ctataattac aaaaacatcc ttaactgatt tgagttgttt ttatttcttt ggatatattt   6600
tcagagtggt aaattgtgtg tgagaattac aaatgattat tcttttagtg gtttcttagc   6660
ctctcttaca gcccacgggg atagtactgt acatcaatac cttcatatga aatttttata   6720
tgcaatgaaa ataaaagcat gggttgattc tgcctattta tgactcaatc ttttacaaat   6780
aaaagattat tcattttaaa ttatagttca atcagcatgt ctcttaggat actgaacgtg   6840
gttgaaatga aaggatagtg acatcataag ttagtactga tattcataac caaataaagc   6900
caacttgagt aattttgcta cattaaaaat taccaaaatt acttagatgg cctataagat   6960
taagcatggt gttttctaag caagctttga aaggggcctt ccatacttac ttaattgaat   7020
attctgggat attgaaaatt attcagatac ttgacaatta tttttggtta cctactccgc   7080
aaactacaaa gttttaagga ctcaacaata agttaatgag acacagtgtt tgctttcatg   7140
gagcttacag tctggagggg acaaaggctt aaacaatact catataatta tatatgtgat   7200
```

cagtacaatg aaggagctca gtggggtaaa taagcaggaa cctgaacttg atctgttccg 7260
gagggccaca gaaggcttcc ttgaggcctt gagaaagtga tttgcatctg agttctgaag 7320
gattgtaaga ggtaactagg gaaaaagttg acaggaagag gaaggggatc cagacaagaa 7380
acatttgcaa agatcttgag gcataaatga gcttgagaca tctggagaaa ctgaggaaaa 7440
gtgagagagt aggcagggcc tggagccgca gagccattgc taaccatcct gtgtgagata 7500
tcccccattc tgtagcttta ttctcataac cctgctcaat ttctttata acacttctca 7560 cagatttata tacgtgtttg tttttgttat ctgtctctcc caccagacca cagctccatg 7620
agagcaaggt ctttgcttac caatatatca ctagcactta aaactatgcc tggtacacag 7680
taggttctta atatgtgttg aatatagcca tcaaattgat attggatata attcaatctg 7740
ataagatatt ttgagatatt aaagagtttt taacttgata ccataaaaaa aaaaaaaaaa 7800
a 7801

<210> SEQ ID NO 2
<211> LENGTH: 585
<212> TYPE: PRT
<213> ORGANISM: Homo sapiens

<400> SEQUENCE: 2

```
Met Lys Glu Gln Pro Ser Cys Ala Gly Thr Gly His Pro Ser Met Ala
1               5                   10                  15

Gly Tyr Gly Arg Met Ala Pro Phe Glu Leu Ala Ser Gly Pro Val Lys
            20                  25                  30

Arg Leu Arg Thr Glu Ser Pro Phe Pro Cys Leu Phe Ala Glu Glu Ala
        35                  40                  45

Tyr Gln Lys Leu Ala Ser Glu Thr Leu Glu Glu Leu Asp Trp Cys Leu
    50                  55                  60

Asp Gln Leu Glu Thr Leu Gln Thr Arg His Ser Val Ser Glu Met Ala
65                  70                  75                  80

Ser Asn Lys Phe Lys Arg Met Leu Asn Arg Glu Leu Thr His Leu Ser
                85                  90                  95

Glu Met Ser Arg Ser Gly Asn Gln Val Ser Glu Phe Ile Ser Asn Thr
            100                 105                 110

Phe Leu Asp Lys Gln His Glu Val Glu Ile Pro Ser Pro Thr Gln Lys
        115                 120                 125

Glu Lys Glu Lys Lys Lys Arg Pro Met Ser Gln Ile Ser Gly Val Lys
    130                 135                 140

Lys Leu Met His Ser Ser Ser Leu Thr Asn Ser Ser Ile Pro Arg Phe
145                 150                 155                 160

Gly Val Lys Thr Glu Gln Glu Asp Val Leu Ala Lys Glu Leu Glu Asp
                165                 170                 175

Val Asn Lys Trp Gly Leu His Val Phe Arg Ile Ala Glu Leu Ser Gly
            180                 185                 190

Asn Arg Pro Leu Thr Val Ile Met His Thr Ile Phe Gln Glu Arg Asp
        195                 200                 205

Leu Leu Lys Thr Phe Lys Ile Pro Val Asp Thr Leu Ile Thr Tyr Leu
    210                 215                 220

Met Thr Leu Glu Asp His Tyr His Ala Asp Val Ala Tyr His Asn Asn
225                 230                 235                 240

Ile His Ala Ala Asp Val Val Gln Ser Thr His Val Leu Leu Ser Thr
                245                 250                 255

Pro Ala Leu Glu Ala Val Phe Thr Asp Leu Glu Ile Leu Ala Ala Ile
```

```
            260                 265                 270

Phe Ala Ser Ala Ile His Asp Val Asp His Pro Gly Val Ser Asn Gln
        275                 280                 285

Phe Leu Ile Asn Thr Asn Ser Glu Leu Ala Leu Met Tyr Asn Asp Ser
    290                 295                 300

Ser Val Leu Glu Asn His His Leu Ala Val Gly Phe Lys Leu Leu Gln
305                 310                 315                 320

Glu Glu Asn Cys Asp Ile Phe Gln Asn Leu Thr Lys Lys Gln Arg Gln
                325                 330                 335

Ser Leu Arg Lys Met Val Ile Asp Ile Val Leu Ala Thr Asp Met Ser
            340                 345                 350

Lys His Met Asn Leu Leu Ala Asp Leu Lys Thr Met Val Glu Thr Lys
        355                 360                 365

Lys Val Thr Ser Ser Gly Val Leu Leu Leu Asp Asn Tyr Ser Asp Arg
    370                 375                 380

Ile Gln Val Leu Gln Asn Met Val His Cys Ala Asp Leu Ser Asn Pro
385                 390                 395                 400

Thr Lys Pro Leu Gln Leu Tyr Arg Gln Trp Thr Asp Arg Ile Met Glu
                405                 410                 415

Glu Phe Phe Arg Gln Gly Asp Arg Glu Arg Glu Arg Gly Met Glu Ile
            420                 425                 430

Ser Pro Met Cys Asp Lys His Asn Ala Ser Val Glu Lys Ser Gln Val
        435                 440                 445

Gly Phe Ile Asp Tyr Ile Val His Pro Leu Trp Glu Thr Trp Ala Asp
    450                 455                 460

Leu Val His Pro Asp Ala Gln Asp Ile Leu Asp Thr Leu Glu Asp Asn
465                 470                 475                 480

Arg Glu Trp Tyr Gln Ser Thr Ile Pro Gln Ser Pro Ser Pro Ala Pro
                485                 490                 495

Asp Asp Pro Glu Glu Gly Arg Gln Gly Gln Thr Glu Lys Phe Gln Phe
            500                 505                 510

Glu Leu Thr Leu Glu Glu Asp Gly Glu Ser Asp Thr Glu Lys Asp Ser
        515                 520                 525

Gly Ser Gln Val Glu Glu Asp Thr Ser Cys Ser Asp Ser Lys Thr Leu
    530                 535                 540

Cys Thr Gln Asp Ser Glu Ser Thr Glu Ile Pro Leu Asp Glu Gln Val
545                 550                 555                 560

Glu Glu Glu Ala Val Gly Glu Glu Glu Glu Ser Gln Pro Glu Ala Cys
                565                 570                 575

Val Ile Asp Asp Arg Ser Pro Asp Thr
            580                 585
```

<210> SEQ ID NO 3
<211> LENGTH: 21
<212> TYPE: DNA
<213> ORGANISM: Artificial Sequence
<220> FEATURE:
<223> OTHER INFORMATION: PDE4D1D2_forward primer

<400> SEQUENCE: 3
aatatgaagg agcagccctc a 21

<210> SEQ ID NO 4
<211> LENGTH: 18
<212> TYPE: DNA
<213> ORGANISM: Artificial Sequence
<220> FEATURE:
<223> OTHER INFORMATION: PDE4D1D2_reverse primer

<400> SEQUENCE: 4
gtctcgctgg ccagtttc 18

<210> SEQ ID NO 5
<211> LENGTH: 18
<212> TYPE: DNA
<213> ORGANISM: Artificial Sequence
<220> FEATURE:
<223> OTHER INFORMATION: PDE4D1D2 probe

<400> SEQUENCE: 5
catccgagca tggcggga 18

<210> SEQ ID NO 6
<211> LENGTH: 7715
<212> TYPE: DNA
<213> ORGANISM: Homo sapiens

<400> SEQUENCE: 6
gtggtggccg cgcacccggc cgcggctgat tcattcactt caagtgccgt gcagaaggct 60
cggcaggcgg ggcgggcgtg gggccgcggc tccgggttgg ggaccgagga gatccggctg 120
tggaccagac gctcctctgc ggggcgggca cccaagcgcg ctcgccaccc cctcgccatc 180
cgctagagcc gggctcctgg actgggactc gggcccgccg cacagttgaa aagtcgcata 240
gtggtttttc cgctcgcgtc gctgtgtgaa agttggctcg ccgctctttg cacgccctcc 300
ctggaggccg acccgagacg ccaagctgga gagaccgtgc ctccccgagg ccggccgccc 360
cgcgagcaca gcctccgccc ccgttgcact gccgggctgg gcaatatgaa ggagcagccc 420
tcatgtgccg gcaccgggca tccgagcatg gcgggaggag gcctaccaga aactggccag 480
cgagaccctg gaggagctgg actggtgtct ggaccagcta gagaccctac agaccaggca 540
ctccgtcagt gagatggcct ccaacaagtt taaaaggatg cttaatcggg agctcaccca 600
tctctctgaa atgagtcggt ctggaaatca agtgtcagag tttatatcaa acacattctt 660
agataagcaa catgaagtgg aaattccttc tccaactcag aaggaaaagg agaaaaagaa 720
aagaccaatg tctcagatca gtggagtcaa gaaattgatg cacagctcta gtctgactaa 780
ttcaagtatc ccaaggtttg gagttaaaac tgaacaagaa gatgtccttg ccaaggaact 840
agaagatgtg aacaaatggg gtcttcatgt tttcagaata gcagagttgt ctggtaaccg 900
gcccttgact gttatcatgc acaccatttt tcaggaacgg gatttattaa aaacatttaa 960
aattccagta gatactttaa ttacatatct tatgactctc gaagaccatt accatgctga 1020
tgtggcctat cacaacaata tccatgctgc agatgttgtc cagtctactc atgtgctatt 1080
atctacacct gctttggagg ctgtgtttac agatttggag attcttgcag caatttttgc 1140
cagtgcaata catgatgtag atcatcctgg tgtgtccaat caatttctga tcaatacaaa 1200
ctctgaactt gccttgatgt acaatgattc ctcagtctta gagaaccatc atttggctgt 1260
gggctttaaa ttgcttcagg aagaaaactg tgacattttc cagaatttga ccaaaaaaca 1320
aagacaatct ttaaggaaaa tggtcattga catcgtactt gcaacagata tgtcaaaaca 1380
catgaatcta ctggctgatt tgaagactat ggttgaaact aagaaagtga caagctctgg 1440
agttcttctt cttgataatt attccgatag gattcaggtt cttcagaata tggtgcactg 1500
tgcagatctg agcaacccaa caaagcctct ccagctgtac cgccagtgga cggaccggat 1560

-continued

```
aatggaggag ttcttccgcc aaggagaccg agagagggaa cgtggcatgg agataagccc   1620
catgtgtgac aagcacaatg cttccgtgga aaaatcacag gtgggcttca tagactatat   1680
tgttcatccc ctctgggaga catgggcaga cctcgtccac cctgacgccc aggatatttt   1740
ggacactttg gaggacaatc gtgaatggta ccagagcaca atccctcaga gcccctctcc   1800
tgcacctgat gacccagagg agggccggca gggtcaaact gagaaattcc agtttgaact   1860
aactttagag gaagatggtg agtcagacac ggaaaaggac agtggcagtc aagtggaaga   1920
agacactagc tgcagtgact ccaagactct ttgtactcaa gactcagagt ctactgaaat   1980
tccccttgat gaacaggttg aagaggaggc agtaggggaa gaagaggaaa gccagcctga   2040
agcctgtgtc atagatgatc gttctcctga cacgtaacag tgcaaaaact ttcatgcctt   2100
ttttttttt aagtagaaaa attgtttcca aagtgcatgt cacatgccac aaccacggtc    2160
acacctcact gtcatctgcc aggacgtttg ttgaacaaaa ctgaccttga ctactcagtc   2220
cagcgctcag gaatatcgta accagttttt tcacctccat gtcatccgag caaggtggac   2280
atcttcacga acagcgtttt taacaagatt tcagcttggt agagctgaca aagcagataa   2340
aatctactcc aaattatttt caagagagtg tgactcatca ggcagcccaa aagtttattg   2400
gacttggggt ttctattcct ttttatttgt ttgcaatatt ttcagaagaa aggcattgca   2460
cagagtgaac ttaatggacg aagcaacaaa tatgtcaaga acaggacata gcacgaatct   2520
gttaccagta ggaggaggat gagccacaga aattgcataa ttttctaatt tcaagtcttc   2580
ctgatacatg actgaatagt gtggttcagt gagctgcact gacctctaca ttttgtatga   2640
tatgtaaaac agatttttg tagagcttac ttttattatt aaatgtattg aggtattata    2700
tttaaaaaaa actatgttca gaacttcatc tgccactggt tattttttc taaggagtaa    2760
cttgcaagtt ttcagtacaa atctgtgcta cactggataa aaatctaatt tatgaatttt   2820
acttgcacct tatagttcat agcaattaac tgatttgtag tgattcattg tttgttttat   2880
ataccaatga cttccatatt ttaaaagaga aaaacaactt tatgttgcag gaaacccttt   2940
ttgtaagtct ttattattta ctttgcattt tgtttcactc tttccagata agcagagttg   3000
ctcttcacca gtgtttttct tcatgtgcaa agtgactatt tgttctataa tacttttatg   3060
tgtgttatat caaatgtgtc ttaagcttca tgcaaactca gtcatcagtt cgtgttgtct   3120
gaagcaagtg ggagatatat aaatacccag tagctaaaat ggtcagtctt ttttagatgt   3180
tttcctactt agtatctcct aataacgttt tgctgtgtca ctagatgttc atttcacaag   3240
tgcatgtctt tctaataatc cacacatttc atgctctaat aatccacaca tttcatgctc   3300
atttttattg tttttacagc cagttatagt aagaaaaagg tttttcccct tgtgctgctt   3360
tataatttag cgtgtgtctg aaccttatcc atgtttgcta gatgaggtct tgtcaaatat   3420
atcactacca ttgtcaccgg tgaaaagaaa caggtagtta agttagggtt aacattcatt   3480
tcaaccacga ggttgtatat catgactagc ttttactctt ggtttacaga gaaaagttaa   3540
acagccaact aggcagtttt taagaatatt aacaatatat taacaaacac caatacaact   3600
aatcctattt ggttttaatg atttcaccat gggattaaga actatatcag gaacatccct   3660
gagaaacggt tttaagtgta gcaactactc ttccttaatg gacagccaca taacgtgtag   3720
gaagtccttt atcacttatc ctcgatccat aagcatatct tgcagagggg aactacttct   3780
ttaaacacat ggagggaaag aagatgatgc cactggcacc agagggttag tactgtgatg   3840
catcctaaaa tatttattat attggtaaaa attctggtta aataaaaaat tagagatcac   3900
tcttggctga tttcagcacc aggaactgta ttacagtttt agagattaat tcctagtgtt   3960
```

```
tacctgatta tagcagttgg catcatgggg catttaattc tgactttatc cccacgtcag   4020
ccttaataaa gtcttcttta ccttctctat gaagacttta aagcccaaat aatcattttt   4080
cacattgata ttcaagaatt gagatagata gaagccaaag tgggtatctg acaagtggaa   4140
aatcaaacgt ttaagaagaa ttacaactct gaaaagcatt tatatgtgga acttctcaag   4200
gagcctcctg gggactggaa agtaagtcat cagccaggca aatgactcat gctgaagaga   4260
gtccccattt cagtcccctg agatctagct gatgcttaga tcctttgaaa taaaaattat   4320
gtctttataa ctctgatctt ttacataaag cagaagagga atcaactagt taattgcaag   4380
gtttctactc tgtttcctct gtaaagatca gatggtaatc tttcaaataa gaaaaaaata   4440
aagacgtatg tttgaccaag tagtttcaca agaatatttg ggaacttgtt tcttttaatt   4500
ttatttgtcc ctgagtgaag tctagaaaga aaggtaaaga gtctagagtt tattcctctt   4560
tccaaaacat tctcattcct ctcctcccta cacttagtat ttcccccaca gagtgcctag   4620
aatcttaata atgaataaaa taaaaagcag caatatgtca ttaacaaatc cagacctgaa   4680
agggtaaagg gtttataact gcactaataa agagaggctc tttttttttc ttccagtttg   4740
ttggttttta atggtaccgt gttgtaaaga tacccactaa tggacaatca aattgcagaa   4800
aaggctcaat atccaagaga cagggactaa tgcactgtac aatctgctta tccttgccct   4860
tctctcttgc caaagtgtgc ttcagaaata tatactgctt taaaaaagaa taaaagaata   4920
tccttttaca agtggcttta catttcctaa aatgccataa gaaaatgcaa tatctgggta   4980
ctgtatgggg aaaaaaatgt ccaagtttgt gtaaaaccag tgcatttcag cttgcaagtt   5040
actgaacaca ataatgctgt tttaattttg ttttatatca gttaaaattc acaataatgt   5100
agatagaaca aattacagac aaggaaagaa aaaacttgaa tgaaatggat tttacagaaa   5160
gctttatgat aatttttgaa tgcattattt attttttgtg ccatgcattt tttttctcac   5220
caaatgacct tacctgtaat acagtcttgt ttgtctgttt acaaccatgt atttattgca   5280
atgtacatac tgtaatgtta attgtaaatt atctgttctt attaaaacat catcccatga   5340
tgggatggtg ttgatatatt tggaaactct tggtgagaga atgaatggtg tgtatacata   5400
ctctgtacat ttttcttttc tcctgtaata tagtcttgtc accttagagc ttgtttatgg   5460
aagattcaag aaaactataa aatacttaaa gatatataaa tttaaaaaaa catagctgca   5520
ggtctttggt cccagggctg tgccttaact ttaaccaata ttttcttctg ttttgctgca   5580
tttgaaaggt aacagtggag ctagggctgg gcattttaca tccaggcttt taattgatta   5640
gaattctgcc aataggtgga ttttacaaaa ccacagacaa cctctgaaag attctgagac   5700
ccttttgaga cagaagctct taagtacttc ttgccaggga gcagcactgc atgtgtgatg   5760
gttgtttgcc atctgttgat caggaactac ttcagctact tgcatttgat tatttccttt   5820
tttttttttt ttaactcgga aacacaactg gggaaatata ttctttccca gtgattataa   5880
acaatctttt tctttttttt aagtcctttt ggcttctaga gctcatagga aaatggactt   5940
gatttgaaat tggagccaga gtttactcgt gttggttatc tattcatcag cttcctgaca   6000
tgttaagaga atacattaaa gagaaaatac tgttttttaa tcctaaaatt tttcttccac   6060
taagataaac caaatgtcct tacatatatg taaacccatc tatttaaacg caaaggtggg   6120
ttgatgtcag tttacatagc agaaagcatt cactatcctc taagatttgt ttctgcaaaa   6180
ctttcattgc tttagaattt taaaatttca ccttgtacaa tggccagccc ctaaagcagg   6240
aaacatttat aatggattat atggaaacat cctcccagta cttgcccagc ccttgaatca   6300
```

```
tgtggctttt cagtgaaagg aaagattctt tttctaggaa aaatgagcct attttatttt   6360

attttatttt attttttgac acaaactgta gattttagca gccctggccc aaaggaattt   6420

gattactttt gttttaaaca gtacaaaggg gacactataa ttacaaaaac atccttaact   6480

gatttgagtt gtttttattt ctttggatat attttcagag tggtaaattg tgtgtgagaa   6540

ttacaaatga ttattctttt agtggtttct tagcctctct tacagcccac ggggatagta   6600

ctgtacatca ataccttcat atgaaatttt tatatgcaat gaaaataaaa gcatgggttg   6660

attctgccta tttatgactc aatcttttac aaataaaaga ttattcattt taaattatag   6720

ttcaatcagc atgtctctta ggatactgaa cgtggttgaa atgaaaggat agtgacatca   6780

taagttagta ctgatattca taaccaaata aagccaactt gagtaatttt gctacattaa   6840

aaattaccaa aattacttag atggcctata agattaagca tggtgttttc taagcaagct   6900

ttgaaagggg ccttccatac ttacttaatt gaatattctg ggatattgaa aattattcag   6960

atacttgaca attatttttg gttacctact ccgcaaacta caaagtttta aggactcaac   7020

aataagttaa tgagacacag tgtttgcttt catggagctt acagtctgga ggggacaaag   7080

gcttaaacaa tactcatata attatatatg tgatcagtac aatgaaggag ctcagtgggg   7140

taaataagca ggaacctgaa cttgatctgt tccggagggc cacagaaggc ttccttgagg   7200

ccttgagaaa gtgatttgca tctgagttct gaaggattgt aagaggtaac tagggaaaaa   7260

gttgacagga agaggaaggg gatccagaca agaaacattt gcaaagatct tgaggcataa   7320

atgagcttga gacatctgga gaaactgagg aaaagtgaga gagtaggcag ggcctggagc   7380

cgcagagcca ttgctaacca tcctgtgtga gatatccccc attctgtagc tttattctca   7440

taaccctgct caattttctt tataacactt ctcacagatt tatatacgtg tttgtttttg   7500

ttatctgtct ctcccaccag accacagctc catgagagca aggtctttgc ttaccaatat   7560

atcactagca cttaaaacta tgcctggtac acagtaggtt cttaatatgt gttgaatata   7620

gccatcaaat tgatattgga tataattcaa tctgataaga tattttgaga tattaaagag   7680

tttttaactt gataccataa aaaaaaaaaa aaaaa                              7715
```

<210> SEQ ID NO 7
<211> LENGTH: 507
<212> TYPE: PRT
<213> ORGANISM: Homo sapiens

<400> SEQUENCE: 7

```
Met Ala Ser Asn Lys Phe Lys Arg Met Leu Asn Arg Glu Leu Thr His
1               5                   10                  15

Leu Ser Glu Met Ser Arg Ser Gly Asn Gln Val Ser Glu Phe Ile Ser
            20                  25                  30

Asn Thr Phe Leu Asp Lys Gln His Glu Val Glu Ile Pro Ser Pro Thr
        35                  40                  45

Gln Lys Glu Lys Glu Lys Lys Lys Arg Pro Met Ser Gln Ile Ser Gly
    50                  55                  60

Val Lys Lys Leu Met His Ser Ser Ser Leu Thr Asn Ser Ser Ile Pro
65                  70                  75                  80

Arg Phe Gly Val Lys Thr Glu Gln Glu Asp Val Leu Ala Lys Glu Leu
                85                  90                  95

Glu Asp Val Asn Lys Trp Gly Leu His Val Phe Arg Ile Ala Glu Leu
            100                 105                 110

Ser Gly Asn Arg Pro Leu Thr Val Ile Met His Thr Ile Phe Gln Glu
        115                 120                 125
```

```
Arg Asp Leu Leu Lys Thr Phe Lys Ile Pro Val Asp Thr Leu Ile Thr
    130                 135                 140

Tyr Leu Met Thr Leu Glu Asp His Tyr His Ala Asp Val Ala Tyr His
145                 150                 155                 160

Asn Asn Ile His Ala Ala Asp Val Val Gln Ser Thr His Val Leu Leu
                165                 170                 175

Ser Thr Pro Ala Leu Glu Ala Val Phe Thr Asp Leu Glu Ile Leu Ala
            180                 185                 190

Ala Ile Phe Ala Ser Ala Ile His Asp Val Asp His Pro Gly Val Ser
        195                 200                 205

Asn Gln Phe Leu Ile Asn Thr Asn Ser Glu Leu Ala Leu Met Tyr Asn
    210                 215                 220

Asp Ser Ser Val Leu Glu Asn His His Leu Ala Val Gly Phe Lys Leu
225                 230                 235                 240

Leu Gln Glu Glu Asn Cys Asp Ile Phe Gln Asn Leu Thr Lys Lys Gln
                245                 250                 255

Arg Gln Ser Leu Arg Lys Met Val Ile Asp Ile Val Leu Ala Thr Asp
            260                 265                 270

Met Ser Lys His Met Asn Leu Leu Ala Asp Leu Lys Thr Met Val Glu
        275                 280                 285

Thr Lys Lys Val Thr Ser Ser Gly Val Leu Leu Leu Asp Asn Tyr Ser
    290                 295                 300

Asp Arg Ile Gln Val Leu Gln Asn Met Val His Cys Ala Asp Leu Ser
305                 310                 315                 320

Asn Pro Thr Lys Pro Leu Gln Leu Tyr Arg Gln Trp Thr Asp Arg Ile
                325                 330                 335

Met Glu Glu Phe Phe Arg Gln Gly Asp Arg Glu Arg Glu Arg Gly Met
            340                 345                 350

Glu Ile Ser Pro Met Cys Asp Lys His Asn Ala Ser Val Glu Lys Ser
        355                 360                 365

Gln Val Gly Phe Ile Asp Tyr Ile Val His Pro Leu Trp Glu Thr Trp
    370                 375                 380

Ala Asp Leu Val His Pro Asp Ala Gln Asp Ile Leu Asp Thr Leu Glu
385                 390                 395                 400

Asp Asn Arg Glu Trp Tyr Gln Ser Thr Ile Pro Gln Ser Pro Ser Pro
                405                 410                 415

Ala Pro Asp Asp Pro Glu Glu Gly Arg Gln Gly Gln Thr Glu Lys Phe
            420                 425                 430

Gln Phe Glu Leu Thr Leu Glu Glu Asp Gly Glu Ser Asp Thr Glu Lys
        435                 440                 445

Asp Ser Gly Ser Gln Val Glu Glu Asp Thr Ser Cys Ser Asp Ser Lys
    450                 455                 460

Thr Leu Cys Thr Gln Asp Ser Glu Ser Thr Glu Ile Pro Leu Asp Glu
465                 470                 475                 480

Gln Val Glu Glu Glu Ala Val Gly Glu Glu Glu Glu Ser Gln Pro Glu
                485                 490                 495

Ala Cys Val Ile Asp Asp Arg Ser Pro Asp Thr
            500                 505
```

<210> SEQ ID NO 8
<211> LENGTH: 7783
<212> TYPE: DNA
<213> ORGANISM: Homo sapiens

<400> SEQUENCE: 8

```
aatacttgtt gcaataattg cccacgatag ctgctcaaac aagagagttg gaattcatct     60
gtaaaaatca ctacatgtaa cgtaggagac aagaaaaata ttaatgacag aagatctgcg    120
aacatgatgc acgtgaataa ttttcccttt agaaggcatt cctggatatg ttttgatgtg    180
gacaatggca catctgcggg acggagtccc ttggatccca tgaccagccc aggatccggg    240
ctaattctcc aagcaaattt tgtccacagt caacgacggg agtccttcct gtatcgatcc    300
gacagcgatt atgacctctc tccaaagtct atgtcccgga actcctccat tgccagtgat    360
atacacggag atgacttgat tgtgactcca tttgctcagg tcttggccag tctgcgaact    420
gtacgaaaca actttgctgc attaactaat ttgcaagatc gagcacctag caaaagatca    480
cccatgtgca accaaccatc catcaacaaa gccaccataa cagaggaggc ctaccagaaa    540
ctggccagcg agaccctgga ggagctggac tggtgtctgg accagctaga gaccctacag    600
accaggcact ccgtcagtga gatggcctcc aacaagttta aaggatgct taatcgggag    660
ctcacccatc tctctgaaat gagtcggtct ggaaatcaag tgtcagagtt tatatcaaac    720
acattcttag ataagcaaca tgaagtggaa attccttctc caactcagaa ggaaaaggag    780
aaaaagaaaa gaccaatgtc tcagatcagt ggagtcaaga aattgatgca cagctctagt    840
ctgactaatt caagtatccc aaggtttgga gttaaaactg aacaagaaga tgtccttgcc    900
aaggaactag aagatgtgaa caaatggggt cttcatgttt tcagaatagc agagttgtct    960
ggtaaccggc ccttgactgt tatcatgcac accatttttc aggaacggga tttattaaaa   1020
acatttaaaa ttccagtaga tactttaatt acatatctta tgactctcga agaccattac   1080
catgctgatg tggcctatca caacaatatc catgctgcag atgttgtcca gtctactcat   1140
gtgctattat ctacacctgc tttggaggct gtgtttacag atttggagat tcttgcagca   1200
atttttgcca gtgcaataca tgatgtagat catcctggtg tgtccaatca atttctgatc   1260
aatacaaact ctgaacttgc cttgatgtac aatgattcct cagtcttaga gaaccatcat   1320
ttggctgtgg gctttaaatt gcttcaggaa gaaaactgtg acattttcca gaatttgacc   1380
aaaaaacaaa gacaatcttt aaggaaaatg gtcattgaca tcgtacttgc aacagatatg   1440
tcaaaacaca tgaatctact ggctgatttg aagactatgg ttgaaactaa gaaagtgaca   1500
agctctggag ttcttcttct tgataattat tccgatagga ttcaggttct tcagaatatg   1560
gtgcactgtg cagatctgag caacccaaca aagcctctcc agctgtaccg ccagtggacg   1620
gaccggataa tggaggagtt cttccgccaa ggagaccgag agagggaacg tggcatggag   1680
ataagcccca tgtgtgacaa gcacaatgct tccgtggaaa aatcacaggt gggcttcata   1740
gactatattg ttcatcccct ctgggagaca tgggcagacc tcgtccaccc tgacgcccag   1800
gatattttgg acactttgga ggacaatcgt gaatggtacc agagcacaat ccctcagagc   1860
ccctctcctg cacctgatga cccagaggag ggccggcagg gtcaaactga gaaattccag   1920
tttgaactaa ctttagagga agatggtgag tcagacacgg aaaaggacag tggcagtcaa   1980
gtggaagaag acactagctg cagtgactcc aagactcttt gtactcaaga ctcagagtct   2040
actgaaattc cccttgatga acaggttgaa gaggaggcag taggggaaga agaggaaagc   2100
cagcctgaag cctgtgtcat agatgatcgt tctcctgaca cgtaacagtg caaaaacttt   2160
catgcctttt tttttttaa gtagaaaaat tgtttccaaa gtgcatgtca catgccacaa   2220
ccacggtcac acctcactgt catctgccag gacgtttgtt gaacaaaact gaccttgact   2280
actcagtcca gcgctcagga atatcgtaac cagtttttc acctccatgt catccgagca   2340
```

```
aggtggacat cttcacgaac agcgttttta acaagatttc agcttggtag agctgacaaa   2400
gcagataaaa tctactccaa attattttca agagagtgtg actcatcagg cagcccaaaa   2460
gtttattgga cttggggttt ctattccttt ttatttgttt gcaatatttt cagaagaaag   2520
gcattgcaca gagtgaactt aatggacgaa gcaacaaata tgtcaagaac aggacatagc   2580
acgaatctgt taccagtagg aggaggatga gccacagaaa ttgcataatt ttctaatttc   2640
aagtcttcct gatacatgac tgaatagtgt ggttcagtga gctgcactga cctctacatt   2700
ttgtatgata tgtaaaacag attttttgta gagcttactt ttattattaa atgtattgag   2760
gtattatatt taaaaaaaac tatgttcaga acttcatctg ccactggtta tttttttcta   2820
aggagtaact tgcaagtttt cagtacaaat ctgtgctaca ctggataaaa atctaattta   2880
tgaattttac ttgcacctta tagttcatag caattaactg atttgtagtg attcattgtt   2940
tgttttatat accaatgact tccatatttt aaaagagaaa aacaacttta tgttgcagga   3000
aaccctttt gtaagtcttt attatttact ttgcattttg tttcactctt tccagataag   3060
cagagttgct cttcaccagt gtttttcttc atgtgcaaag tgactatttg ttctataata   3120
cttttatgtg tgttatatca aatgtgtctt aagcttcatg caaactcagt catcagttcg   3180
tgttgtctga agcaagtggg agatatataa atacccagta gctaaaatgg tcagtctttt   3240
ttagatgttt tcctacttag tatctcctaa taacgttttg ctgtgtcact agatgttcat   3300
ttcacaagtg catgtctttc taataatcca cacatttcat gctctaataa tccacacatt   3360
tcatgctcat ttttattgtt tttacagcca gttatagtaa gaaaaaggtt tttccccttg   3420
tgctgcttta taatttagcg tgtgtctgaa ccttatccat gtttgctaga tgaggtcttg   3480
tcaaatatat cactaccatt gtcaccggtg aaaagaaaca ggtagttaag ttagggttaa   3540
cattcatttc aaccacgagg ttgtatatca tgactagctt ttactcttgg tttacagaga   3600
aaagttaaac agccaactag gcagtttta agaatattaa caatatatta acaaacacca   3660
atacaactaa tcctatttgg ttttaatgat ttcaccatgg gattaagaac tatatcagga   3720
acatccctga gaaacggttt taagtgtagc aactactctt ccttaatgga cagccacata   3780
acgtgtagga agtcctttat cacttatcct cgatccataa gcatatcttg cagaggggaa   3840
ctacttcttt aaacacatgg agggaaagaa gatgatgcca ctggcaccag agggttagta   3900
ctgtgatgca tcctaaaata tttattatat tggtaaaaat tctggttaaa taaaaaatta   3960
gagatcactc ttggctgatt tcagcaccag gaactgtatt acagttttag agattaattc   4020
ctagtgttta cctgattata gcagttggca tcatggggca tttaattctg actttatccc   4080
cacgtcagcc ttaataaagt cttctttacc ttctctatga agactttaaa gcccaaataa   4140
tcatttttca cattgatatt caagaattga gatagataga agccaaagtg ggtatctgac   4200
aagtggaaaa tcaaacgttt aagaagaatt acaactctga aaagcattta tatgtggaac   4260
ttctcaagga gcctcctggg gactggaaag taagtcatca gccaggcaaa tgactcatgc   4320
tgaagagagt ccccatttca gtcccctgag atctagctga tgcttagatc ctttgaaata   4380
aaaattatgt ctttataact ctgatctttt acataaagca gaagaggaat caactagtta   4440
attgcaaggt ttctactctg tttcctctgt aaagatcaga tggtaatctt tcaaataaga   4500
aaaaaataaa gacgtatgtt tgaccaagta gtttcacaag aatatttggg aacttgtttc   4560
ttttaatttt atttgtccct gagtgaagtc tagaaagaaa ggtaaagagt ctagagttta   4620
ttcctctttc caaaacattc tcattcctct cctccctaca cttagtattt cccccacaga   4680
```

-continued

```
gtgcctagaa tcttaataat gaataaaata aaaagcagca atatgtcatt aacaaatcca   4740
gacctgaaag ggtaaagggt ttataactgc actaataaag agaggctctt tttttttctt   4800
ccagtttgtt ggtttttaat ggtaccgtgt tgtaaagata cccactaatg gacaatcaaa   4860
ttgcagaaaa ggctcaatat ccaagagaca gggactaatg cactgtacaa tctgcttatc   4920
cttgcccttc tctcttgcca aagtgtgctt cagaaatata tactgcttta aaaaagaata   4980
aaagaatatc cttttacaag tggctttaca tttcctaaaa tgccataaga aaatgcaata   5040
tctgggtact gtatggggaa aaaaatgtcc aagtttgtgt aaaaccagtg catttcagct   5100
tgcaagttac tgaacacaat aatgctgttt taattttgtt ttatatcagt taaaattcac   5160
aataatgtag atagaacaaa ttacagacaa ggaaagaaaa aacttgaatg aaatggattt   5220
tacagaaagc tttatgataa tttttgaatg cattatttat tttttgtgcc atgcattttt   5280
tttctcacca aatgacctta cctgtaatac agtcttgttt gtctgtttac aaccatgtat   5340
ttattgcaat gtacatactg taatgttaat tgtaaattat ctgttcttat taaaacatca   5400
tcccatgatg ggatggtgtt gatatatttg gaaactcttg gtgagagaat gaatggtgtg   5460
tatacatact ctgtacattt ttcttttctc ctgtaatata gtcttgtcac cttagagctt   5520
gtttatggaa gattcaagaa aactataaaa tacttaaaga tatataaatt taaaaaaaca   5580
tagctgcagg tctttggtcc cagggctgtg ccttaacttt aaccaatatt ttcttctgtt   5640
ttgctgcatt tgaaaggtaa cagtggagct agggctgggc attttacatc caggctttta   5700
attgattaga attctgccaa taggtggatt ttacaaaacc acagacaacc tctgaaagat   5760
tctgagaccc ttttgagaca gaagctctta agtacttctt gccagggagc agcactgcat   5820
gtgtgatggt tgtttgccat ctgttgatca ggaactactt cagctacttg catttgatta   5880
tttccttttt tttttttttt aactcggaaa cacaactggg gaaatatatt ctttcccagt   5940
gattataaac aatctttttc tttttttaa gtccttttgg cttctagagc tcataggaaa   6000
atggacttga tttgaaattg gagccagagt ttactcgtgt tggttatcta ttcatcagct   6060
tcctgacatg ttaagagaat acattaaaga gaaaatactg ttttttaatc ctaaaatttt   6120
tcttccacta agataaacca aatgtcctta catatatgta aacccatcta tttaaacgca   6180
aaggtgggtt gatgtcagtt tacatagcag aaagcattca ctatcctcta agatttgttt   6240
ctgcaaaact ttcattgctt tagaatttta aaatttcacc ttgtacaatg gccagcccct   6300
aaagcaggaa acatttataa tggattatat ggaaacatcc tcccagtact tgcccagccc   6360
ttgaatcatg tggcttttca gtgaaaggaa agattctttt tctaggaaaa atgagcctat   6420
tttattttat tttattttat tttttgacac aaactgtaga ttttagcagc cctggcccaa   6480
aggaatttga ttacttttgt tttaaacagt acaaagggga cactataatt acaaaaaacat   6540
ccttaactga tttgagttgt ttttatttct ttggatatat tttcagagtg gtaaattgtg   6600
tgtgagaatt acaaatgatt attcttttag tggtttctta gcctctctta cagcccacgg   6660
ggatagtact gtacatcaat accttcatat gaaattttta tatgcaatga aaataaaagc   6720
atgggttgat tctgcctatt tatgactcaa tcttttacaa ataaaagatt attcatttta   6780
aattatagtt caatcagcat gtctcttagg atactgaacg tggttgaaat gaaaggatag   6840
tgacatcata agttagtact gatattcata accaaataaa gccaacttga gtaattttgc   6900
tacattaaaa attaccaaaa ttacttagat ggcctataag attaagcatg gtgttttcta   6960
agcaagcttt gaaaggggcc ttccatactt acttaattga atattctggg atattgaaaa   7020
ttattcagat acttgacaat tatttttggt tacctactcc gcaaactaca aagttttaag   7080
```

```
gactcaacaa taagttaatg agacacagtg tttgctttca tggagcttac agtctggagg   7140

ggacaaaggc ttaaacaata ctcatataat tatatatgtg atcagtacaa tgaaggagct   7200

cagtggggta aataagcagg aacctgaact tgatctgttc cggagggcca cagaaggctt   7260

ccttgaggcc ttgagaaagt gatttgcatc tgagttctga aggattgtaa gaggtaacta   7320

gggaaaaagt tgacaggaag aggaagggga tccagacaag aaacatttgc aaagatcttg   7380

aggcataaat gagcttgaga catctggaga aactgaggaa aagtgagaga gtaggcaggg   7440

cctggagccg cagagccatt gctaaccatc ctgtgtgaga tatcccccat tctgtagctt   7500

tattctcata accctgctca attttcttta taacacttct cacagattta tatacgtgtt   7560

tgtttttgtt atctgtctct cccaccagac cacagctcca tgagagcaag gtctttgctt   7620

accaatatat cactagcact taaaactatg cctggtacac agtaggttct taatatgtgt   7680

tgaatatagc catcaaattg atattggata taattcaatc tgataagata ttttgagata   7740

ttaaagagtt tttaacttga taccataaaa aaaaaaaaaa aaa                     7783
```

```
<210> SEQ ID NO 9
<211> LENGTH: 673
<212> TYPE: PRT
<213> ORGANISM: Homo sapiens

<400> SEQUENCE: 9

Met Met His Val Asn Asn Phe Pro Phe Arg Arg His Ser Trp Ile Cys
1               5                   10                  15

Phe Asp Val Asp Asn Gly Thr Ser Ala Gly Arg Ser Pro Leu Asp Pro
            20                  25                  30

Met Thr Ser Pro Gly Ser Gly Leu Ile Leu Gln Ala Asn Phe Val His
        35                  40                  45

Ser Gln Arg Arg Glu Ser Phe Leu Tyr Arg Ser Asp Ser Asp Tyr Asp
    50                  55                  60

Leu Ser Pro Lys Ser Met Ser Arg Asn Ser Ser Ile Ala Ser Asp Ile
65                  70                  75                  80

His Gly Asp Asp Leu Ile Val Thr Pro Phe Ala Gln Val Leu Ala Ser
                85                  90                  95

Leu Arg Thr Val Arg Asn Asn Phe Ala Ala Leu Thr Asn Leu Gln Asp
            100                 105                 110

Arg Ala Pro Ser Lys Arg Ser Pro Met Cys Asn Gln Pro Ser Ile Asn
        115                 120                 125

Lys Ala Thr Ile Thr Glu Glu Ala Tyr Gln Lys Leu Ala Ser Glu Thr
    130                 135                 140

Leu Glu Glu Leu Asp Trp Cys Leu Asp Gln Leu Glu Thr Leu Gln Thr
145                 150                 155                 160

Arg His Ser Val Ser Glu Met Ala Ser Asn Lys Phe Lys Arg Met Leu
                165                 170                 175

Asn Arg Glu Leu Thr His Leu Ser Glu Met Ser Arg Ser Gly Asn Gln
            180                 185                 190

Val Ser Glu Phe Ile Ser Asn Thr Phe Leu Asp Lys Gln His Glu Val
        195                 200                 205

Glu Ile Pro Ser Pro Thr Gln Lys Glu Lys Glu Lys Lys Lys Arg Pro
    210                 215                 220

Met Ser Gln Ile Ser Gly Val Lys Lys Leu Met His Ser Ser Ser Leu
225                 230                 235                 240

Thr Asn Ser Ser Ile Pro Arg Phe Gly Val Lys Thr Glu Gln Glu Asp
```

```
                245                 250                 255

Val Leu Ala Lys Glu Leu Glu Asp Val Asn Lys Trp Gly Leu His Val
            260                 265                 270

Phe Arg Ile Ala Glu Leu Ser Gly Asn Arg Pro Leu Thr Val Ile Met
        275                 280                 285

His Thr Ile Phe Gln Glu Arg Asp Leu Leu Lys Thr Phe Lys Ile Pro
    290                 295                 300

Val Asp Thr Leu Ile Thr Tyr Leu Met Thr Leu Glu Asp His Tyr His
305                 310                 315                 320

Ala Asp Val Ala Tyr His Asn Asn Ile His Ala Ala Asp Val Val Gln
                325                 330                 335

Ser Thr His Val Leu Leu Ser Thr Pro Ala Leu Glu Ala Val Phe Thr
            340                 345                 350

Asp Leu Glu Ile Leu Ala Ala Ile Phe Ala Ser Ala Ile His Asp Val
        355                 360                 365

Asp His Pro Gly Val Ser Asn Gln Phe Leu Ile Asn Thr Asn Ser Glu
    370                 375                 380

Leu Ala Leu Met Tyr Asn Asp Ser Ser Val Leu Glu Asn His His Leu
385                 390                 395                 400

Ala Val Gly Phe Lys Leu Leu Gln Glu Glu Asn Cys Asp Ile Phe Gln
                405                 410                 415

Asn Leu Thr Lys Lys Gln Arg Gln Ser Leu Arg Lys Met Val Ile Asp
            420                 425                 430

Ile Val Leu Ala Thr Asp Met Ser Lys His Met Asn Leu Leu Ala Asp
        435                 440                 445

Leu Lys Thr Met Val Glu Thr Lys Lys Val Thr Ser Ser Gly Val Leu
    450                 455                 460

Leu Leu Asp Asn Tyr Ser Asp Arg Ile Gln Val Leu Gln Asn Met Val
465                 470                 475                 480

His Cys Ala Asp Leu Ser Asn Pro Thr Lys Pro Leu Gln Leu Tyr Arg
                485                 490                 495

Gln Trp Thr Asp Arg Ile Met Glu Glu Phe Phe Arg Gln Gly Asp Arg
            500                 505                 510

Glu Arg Glu Arg Gly Met Glu Ile Ser Pro Met Cys Asp Lys His Asn
        515                 520                 525

Ala Ser Val Glu Lys Ser Gln Val Gly Phe Ile Asp Tyr Ile Val His
    530                 535                 540

Pro Leu Trp Glu Thr Trp Ala Asp Leu Val His Pro Asp Ala Gln Asp
545                 550                 555                 560

Ile Leu Asp Thr Leu Glu Asp Asn Arg Glu Trp Tyr Gln Ser Thr Ile
                565                 570                 575

Pro Gln Ser Pro Ser Pro Ala Pro Asp Asp Pro Glu Glu Gly Arg Gln
            580                 585                 590

Gly Gln Thr Glu Lys Phe Gln Phe Glu Leu Thr Leu Glu Glu Asp Gly
        595                 600                 605

Glu Ser Asp Thr Glu Lys Asp Ser Gly Ser Gln Val Glu Glu Asp Thr
    610                 615                 620

Ser Cys Ser Asp Ser Lys Thr Leu Cys Thr Gln Asp Ser Glu Ser Thr
625                 630                 635                 640

Glu Ile Pro Leu Asp Glu Gln Val Glu Glu Glu Ala Val Gly Glu Glu
                645                 650                 655

Glu Glu Ser Gln Pro Glu Ala Cys Val Ile Asp Asp Arg Ser Pro Asp
            660                 665                 670
```

Thr

<210> SEQ ID NO 10
<211> LENGTH: 8240
<212> TYPE: DNA
<213> ORGANISM: Homo sapiens

<400> SEQUENCE: 10

```
ccccctctcgg tagccctgag gctctggcgc cttcaagtga gaagctaagc accagcctct     60
gctgggctgc agaagcggcg gcggcggcag cagcagcagc agcatcagga aggcgctcgg    120
gccagcgcgg tgaacccggg ctgggcagca ggtcgcggag ccgcgagcca ggatggaggc    180
agagggcagc agcgcgccgg cccgggcggg cagcggagag ggcagcgaca gcgccggcgg    240
ggccacgctc aaagccccca agcatctctg gaggcacgag cagcaccacc agtacccgct    300
ccggcagccc cagttccgcc tcctgcatcc ccatcaccac ctgcccccgc cgccgccacc    360
ctcgccccag ccccagcccc agtgtccgct acagccgccg ccgccgcccc ccctgccgcc    420
gcccccgccg ccgcccgggg ctgcccgcgg ccgctacgcc tcgagcgggg ccaccggccg    480
cgtccggcat cgcggctact cggacaccga gcgctacctg tactgtcgcg ccatggaccg    540
cacctcctac gcggtggaga ccggccaccg gcccggcctg aagaaatcca ggatgtcctg    600
gccctcctcg ttccagggac tcaggcgttt tgatgtggac aatggcacat ctgcgggacg    660
gagtcccttg gatcccatga ccagcccagg atccgggcta attctccaag caaattttgt    720
ccacagtcaa cgacgggagt ccttcctgta tcgatccgac agcgattatg acctctctcc    780
aaagtctatg tcccggaact cctccattgc cagtgatata cacggagatg acttgattgt    840
gactccattt gctcaggtct tggccagtct gcgaactgta cgaaacaact ttgctgcatt    900
aactaatttg caagatcgag cacctagcaa aagatcaccc atgtgcaacc aaccatccat    960
caacaaagcc accataacag aggaggccta ccagaaactg gccagcgaga ccctggagga   1020
gctggactgg tgtctggacc agctagagac cctacagacc aggcactccg tcagtgagat   1080
ggcctccaac aagtttaaaa ggatgcttaa tcgggagctc acccatctct ctgaaatgag   1140
tcggtctgga aatcaagtgt cagagtttat atcaaacaca ttcttagata agcaacatga   1200
agtggaaatt ccttctccaa ctcagaagga aaaggagaaa aagaaaagac caatgtctca   1260
gatcagtgga gtcaagaaat tgatgcacag ctctagtctg actaattcaa gtatcccaag   1320
gtttggagtt aaaactgaac aagaagatgt ccttgccaag gaactagaag atgtgaacaa   1380
atggggtctt catgttttca gaatagcaga gttgtctggt aaccggccct tgactgttat   1440
catgcacacc atttttcagg aacgggattt attaaaaaca tttaaaattc cagtagatac   1500
tttaattaca tatcttatga ctctcgaaga ccattaccat gctgatgtgg cctatcacaa   1560
caatatccat gctgcagatg ttgtccagtc tactcatgtg ctattatcta cacctgcttt   1620
ggaggctgtg tttacagatt tggagattct tgcagcaatt tttgccagtg caatacatga   1680
tgtagatcat cctggtgtgt ccaatcaatt tctgatcaat acaaactctg aacttgcctt   1740
gatgtacaat gattcctcag tcttagagaa ccatcatttg gctgtgggct ttaaattgct   1800
tcaggaagaa aactgtgaca ttttccagaa tttgaccaaa aaacaaagac aatctttaag   1860
gaaaatggtc attgacatcg tacttgcaac agatatgtca aaacacatga atctactggc   1920
tgatttgaag actatggttg aaactaagaa agtgacaagc tctggagttc ttcttcttga   1980
taattattcc gataggattc aggttcttca gaatatggtg cactgtgcag atctgagcaa   2040
```

```
cccaacaaag cctctccagc tgtaccgcca gtggacggac cggataatgg aggagttctt   2100

ccgccaagga gaccgagaga gggaacgtgg catggagata agccccatgt gtgacaagca   2160

caatgcttcc gtggaaaaat cacaggtggg cttcatagac tatattgttc atcccctctg   2220

ggagacatgg gcagacctcg tccaccctga cgcccaggat attttggaca ctttggagga   2280

caatcgtgaa tggtaccaga gcacaatccc tcagagcccc tctcctgcac ctgatgaccc   2340

agaggagggc cggcagggtc aaactgagaa attccagttt gaactaactt tagaggaaga   2400

tggtgagtca gacacggaaa aggacagtgg cagtcaagtg gaagaagaca ctagctgcag   2460

tgactccaag actctttgta ctcaagactc agagtctact gaaattcccc ttgatgaaca   2520

ggttgaagag gaggcagtag gggaagaaga ggaaagccag cctgaagcct gtgtcataga   2580

tgatcgttct cctgacacgt aacagtgcaa aaactttcat gccttttttt tttttaagta   2640

gaaaaattgt ttccaaagtg catgtcacat gccacaacca cggtcacacc tcactgtcat   2700

ctgccaggac gtttgttgaa caaaactgac cttgactact cagtccagcg ctcaggaata   2760

tcgtaaccag tttttttcacc tccatgtcat ccgagcaagg tggacatctt cacgaacagc   2820

gtttttaaca agatttcagc ttggtagagc tgacaaagca gataaaatct actccaaatt   2880

attttcaaga gagtgtgact catcaggcag cccaaaagtt tattggactt ggggtttcta   2940

ttcctttttta tttgtttgca atattttcag aagaaaggca ttgcacagag tgaacttaat   3000

ggacgaagca acaaatatgt caagaacagg acatagcacg aatctgttac cagtaggagg   3060

aggatgagcc acagaaattg cataattttc taatttcaag tcttcctgat acatgactga   3120

atagtgtggt tcagtgagct gcactgacct ctacattttg tatgatatgt aaaacagatt   3180

ttttgtagag cttactttta ttattaaatg tattgaggta ttatatttaa aaaaaactat   3240

gttcagaact tcatctgcca ctggttattt ttttctaagg agtaacttgc aagttttcag   3300

tacaaatctg tgctacactg gataaaaatc taatttatga attttacttg caccttatag   3360

ttcatagcaa ttaactgatt tgtagtgatt cattgtttgt tttatatacc aatgacttcc   3420

atattttaaa agagaaaaac aactttatgt tgcaggaaac cctttttgta agtctttatt   3480

atttactttg cattttgttt cactctttcc agataagcag agttgctctt caccagtgtt   3540

tttcttcatg tgcaaagtga ctatttgttc tataatactt ttatgtgtgt tatatcaaat   3600

gtgtcttaag cttcatgcaa actcagtcat cagttcgtgt tgtctgaagc aagtgggaga   3660

tatataaata cccagtagct aaaatggtca gtcttttttta gatgttttcc tacttagtat   3720

ctcctaataa cgttttgctg tgtcactaga tgttcatttc acaagtgcat gtctttctaa   3780

taatccacac atttcatgct ctaataatcc acacatttca tgctcatttt tattgttttt   3840

acagccagtt atagtaagaa aaaggttttt ccccttgtgc tgctttataa tttagcgtgt   3900

gtctgaacct tatccatgtt tgctagatga ggtcttgtca aatatatcac taccattgtc   3960

accggtgaaa agaaacaggt agttaagtta gggttaacat tcatttcaac cacgaggttg   4020

tatatcatga ctagctttta ctcttggttt acagagaaaa gttaaacagc caactaggca   4080

gtttttaaga atattaacaa tatattaaca aacaccaata caactaatcc tatttggttt   4140

taatgatttc accatgggat taagaactat atcaggaaca tccctgagaa acggttttaa   4200

gtgtagcaac tactcttcct taatggacag ccacataacg tgtaggaagt cctttatcac   4260

ttatcctcga tccataagca tatcttgcag aggggaacta cttctttaaa cacatggagg   4320

gaaagaagat gatgccactg gcaccagagg gttagtactg tgatgcatcc taaaatattt   4380

attatattgg taaaaattct ggttaaataa aaaattagag atcactcttg gctgatttca   4440
```

```
gcaccaggaa ctgtattaca gttttagaga ttaattccta gtgtttacct gattatagca   4500
gttggcatca tggggcattt aattctgact ttatccccac gtcagcctta ataaagtctt   4560
ctttaccttc tctatgaaga ctttaaagcc caaataatca tttttcacat tgatattcaa   4620
gaattgagat agatagaagc caaagtgggt atctgacaag tggaaaatca aacgtttaag   4680
aagaattaca actctgaaaa gcatttatat gtggaacttc tcaaggagcc tcctggggac   4740
tggaaagtaa gtcatcagcc aggcaaatga ctcatgctga agagagtccc catttcagtc   4800
ccctgagatc tagctgatgc ttagatcctt tgaaataaaa attatgtctt tataactctg   4860
atcttttaca taaagcagaa gaggaatcaa ctagttaatt gcaaggtttc tactctgttt   4920
cctctgtaaa gatcagatgg taatctttca aataagaaaa aaataaagac gtatgtttga   4980
ccaagtagtt tcacaagaat atttgggaac ttgtttcttt taattttatt tgtccctgag   5040
tgaagtctag aaagaaaggt aaagagtcta gagtttattc ctctttccaa aacattctca   5100
ttcctctcct ccctacactt agtatttccc ccacagagtg cctagaatct taataatgaa   5160
taaaataaaa agcagcaata tgtcattaac aaatccagac ctgaaagggt aaagggttta   5220
taactgcact aataaagaga ggctcttttt ttttcttcca gtttgttggt ttttaatggt   5280
accgtgttgt aaagataccc actaatggac aatcaaattg cagaaaaggc tcaatatcca   5340
agagacaggg actaatgcac tgtacaatct gcttatcctt gcccttctct cttgccaaag   5400
tgtgcttcag aaatatatac tgctttaaaa aagaataaaa gaatatcctt ttacaagtgg   5460
ctttacattt cctaaaatgc cataagaaaa tgcaatatct gggtactgta tggggaaaaa   5520
aatgtccaag tttgtgtaaa accagtgcat ttcagcttgc aagttactga acacaataat   5580
gctgttttaa ttttgtttta tatcagttaa aattcacaat aatgtagata gaacaaatta   5640
cagacaagga aagaaaaaac ttgaatgaaa tggattttac agaaagcttt atgataattt   5700
ttgaatgcat tatttatttt ttgtgccatg catttttttt ctcaccaaat gaccttacct   5760
gtaatacagt cttgtttgtc tgtttacaac catgtattta ttgcaatgta catactgtaa   5820
tgttaattgt aaattatctg ttcttattaa aacatcatcc catgatggga tggtgttgat   5880
atatttggaa actcttggtg agagaatgaa tggtgtgtat acatactctg tacatttttc   5940
ttttctcctg taatatagtc ttgtcacctt agagcttgtt tatggaagat tcaagaaaac   6000
tataaaatac ttaaagatat ataaatttaa aaaaacatag ctgcaggtct ttggtcccag   6060
ggctgtgcct taactttaac caatattttc ttctgttttg ctgcatttga aaggtaacag   6120
tggagctagg gctgggcatt ttacatccag gcttttaatt gattagaatt ctgccaatag   6180
gtggatttta caaaaccaca gacaacctct gaaagattct gagacccttt tgagacagaa   6240
gctcttaagt acttcttgcc agggagcagc actgcatgtg tgatggttgt ttgccatctg   6300
ttgatcagga actacttcag ctacttgcat ttgattattt cctttttttt ttttttaac    6360
tcggaaacac aactggggaa atatattctt tcccagtgat tataaacaat ctttttcttt   6420
tttttaagtc cttttggctt ctagagctca taggaaaatg gacttgattt gaaattggag   6480
ccagagttta ctcgtgttgg ttatctattc atcagcttcc tgacatgtta agagaataca   6540
ttaaagagaa aatactgttt tttaatccta aaatttttct tccactaaga taaaccaaat   6600
gtccttacat atatgtaaac ccatctattt aaacgcaaag gtgggttgat gtcagtttac   6660
atagcagaaa gcattcacta tcctctaaga tttgtttctg caaaactttc attgctttag   6720
aattttaaaa tttcaccttg tacaatggcc agcccctaaa gcaggaaaca tttataatgg   6780
```

-continued

```
attatatgga aacatcctcc cagtacttgc ccagcccttg aatcatgtgg cttttcagtg   6840
aaaggaaaga ttctttttct aggaaaaatg agcctatttt attttatttt attttatttt   6900
ttgacacaaa ctgtagattt tagcagccct ggcccaaagg aatttgatta cttttgtttt   6960
aaacagtaca aaggggacac tataattaca aaaacatcct taactgattt gagttgtttt   7020
tatttctttg gatatatttt cagagtggta aattgtgtgt gagaattaca aatgattatt   7080
cttttagtgg tttcttagcc tctcttacag cccacgggga tagtactgta catcaatacc   7140
ttcatatgaa atttttatat gcaatgaaaa taaaagcatg ggttgattct gcctatttat   7200
gactcaatct tttacaaata aaagattatt cattttaaat tatagttcaa tcagcatgtc   7260
tcttaggata ctgaacgtgg ttgaaatgaa aggatagtga catcataagt tagtactgat   7320
attcataacc aaataaagcc aacttgagta attttgctac attaaaaatt accaaaatta   7380
cttagatggc ctataagatt aagcatggtg ttttctaagc aagctttgaa aggggccttc   7440
catacttact taattgaata ttctgggata ttgaaaatta ttcagatact tgacaattat   7500
ttttggttac ctactccgca aactacaaag ttttaaggac tcaacaataa gttaatgaga   7560
cacagtgttt gctttcatgg agcttacagt ctggagggga caaaggctta aacaatactc   7620
atataattat atatgtgatc agtacaatga aggagctcag tggggtaaat aagcaggaac   7680
ctgaacttga tctgttccgg agggccacag aaggcttcct tgaggccttg agaaagtgat   7740
ttgcatctga gttctgaagg attgtaagag gtaactaggg aaaaagttga caggaagagg   7800
aaggggatcc agacaagaaa catttgcaaa gatcttgagg cataaatgag cttgagacat   7860
ctggagaaac tgaggaaaag tgagagagta ggcagggcct ggagccgcag agccattgct   7920
aaccatcctg tgtgagatat cccccattct gtagctttat tctcataacc ctgctcaatt   7980
ttctttataa cacttctcac agatttatat acgtgtttgt ttttgttatc tgtctctccc   8040
accagaccac agctccatga gagcaaggtc tttgcttacc aatatatcac tagcacttaa   8100
aactatgcct ggtacacagt aggttcttaa tatgtgttga atatagccat caaattgata   8160
ttggatataa ttcaatctga taagatattt tgagatatta aagagttttt aacttgatac   8220
cataaaaaaa aaaaaaaaaa                                                8240
```

<210> SEQ ID NO 11
<211> LENGTH: 809
<212> TYPE: PRT
<213> ORGANISM: Homo sapiens

<400> SEQUENCE: 11

```
Met Glu Ala Glu Gly Ser Ser Ala Pro Ala Arg Ala Gly Ser Gly Glu
1               5                   10                  15

Gly Ser Asp Ser Ala Gly Gly Ala Thr Leu Lys Ala Pro Lys His Leu
            20                  25                  30

Trp Arg His Glu Gln His His Gln Tyr Pro Leu Arg Gln Pro Gln Phe
        35                  40                  45

Arg Leu Leu His Pro His His His Leu Pro Pro Pro Pro Pro Pro Ser
    50                  55                  60

Pro Gln Pro Gln Pro Gln Cys Pro Leu Gln Pro Pro Pro Pro Pro Pro
65                  70                  75                  80

Leu Pro Pro Pro Pro Pro Pro Pro Gly Ala Ala Arg Gly Arg Tyr Ala
                85                  90                  95

Ser Ser Gly Ala Thr Gly Arg Val Arg His Arg Gly Tyr Ser Asp Thr
            100                 105                 110
```

```
Glu Arg Tyr Leu Tyr Cys Arg Ala Met Asp Arg Thr Ser Tyr Ala Val
        115                 120                 125

Glu Thr Gly His Arg Pro Gly Leu Lys Lys Ser Arg Met Ser Trp Pro
    130                 135                 140

Ser Ser Phe Gln Gly Leu Arg Arg Phe Asp Val Asp Asn Gly Thr Ser
145                 150                 155                 160

Ala Gly Arg Ser Pro Leu Asp Pro Met Thr Ser Pro Gly Ser Gly Leu
                165                 170                 175

Ile Leu Gln Ala Asn Phe Val His Ser Gln Arg Arg Glu Ser Phe Leu
            180                 185                 190

Tyr Arg Ser Asp Ser Asp Tyr Asp Leu Ser Pro Lys Ser Met Ser Arg
        195                 200                 205

Asn Ser Ser Ile Ala Ser Asp Ile His Gly Asp Asp Leu Ile Val Thr
    210                 215                 220

Pro Phe Ala Gln Val Leu Ala Ser Leu Arg Thr Val Arg Asn Asn Phe
225                 230                 235                 240

Ala Ala Leu Thr Asn Leu Gln Asp Arg Ala Pro Ser Lys Arg Ser Pro
                245                 250                 255

Met Cys Asn Gln Pro Ser Ile Asn Lys Ala Thr Ile Thr Glu Glu Ala
            260                 265                 270

Tyr Gln Lys Leu Ala Ser Glu Thr Leu Glu Glu Leu Asp Trp Cys Leu
        275                 280                 285

Asp Gln Leu Glu Thr Leu Gln Thr Arg His Ser Val Ser Glu Met Ala
    290                 295                 300

Ser Asn Lys Phe Lys Arg Met Leu Asn Arg Glu Leu Thr His Leu Ser
305                 310                 315                 320

Glu Met Ser Arg Ser Gly Asn Gln Val Ser Glu Phe Ile Ser Asn Thr
                325                 330                 335

Phe Leu Asp Lys Gln His Glu Val Glu Ile Pro Ser Pro Thr Gln Lys
            340                 345                 350

Glu Lys Glu Lys Lys Lys Arg Pro Met Ser Gln Ile Ser Gly Val Lys
        355                 360                 365

Lys Leu Met His Ser Ser Ser Leu Thr Asn Ser Ser Ile Pro Arg Phe
    370                 375                 380

Gly Val Lys Thr Glu Gln Glu Asp Val Leu Ala Lys Glu Leu Glu Asp
385                 390                 395                 400

Val Asn Lys Trp Gly Leu His Val Phe Arg Ile Ala Glu Leu Ser Gly
                405                 410                 415

Asn Arg Pro Leu Thr Val Ile Met His Thr Ile Phe Gln Glu Arg Asp
            420                 425                 430

Leu Leu Lys Thr Phe Lys Ile Pro Val Asp Thr Leu Ile Thr Tyr Leu
        435                 440                 445

Met Thr Leu Glu Asp His Tyr His Ala Asp Val Ala Tyr His Asn Asn
    450                 455                 460

Ile His Ala Ala Asp Val Val Gln Ser Thr His Val Leu Leu Ser Thr
465                 470                 475                 480

Pro Ala Leu Glu Ala Val Phe Thr Asp Leu Glu Ile Leu Ala Ala Ile
                485                 490                 495

Phe Ala Ser Ala Ile His Asp Val Asp His Pro Gly Val Ser Asn Gln
            500                 505                 510

Phe Leu Ile Asn Thr Asn Ser Glu Leu Ala Leu Met Tyr Asn Asp Ser
        515                 520                 525

Ser Val Leu Glu Asn His His Leu Ala Val Gly Phe Lys Leu Leu Gln
```

```
    530                 535                 540

Glu Glu Asn Cys Asp Ile Phe Gln Asn Leu Thr Lys Lys Gln Arg Gln
545                 550                 555                 560

Ser Leu Arg Lys Met Val Ile Asp Ile Val Leu Ala Thr Asp Met Ser
                565                 570                 575

Lys His Met Asn Leu Leu Ala Asp Leu Lys Thr Met Val Glu Thr Lys
            580                 585                 590

Lys Val Thr Ser Ser Gly Val Leu Leu Leu Asp Asn Tyr Ser Asp Arg
        595                 600                 605

Ile Gln Val Leu Gln Asn Met Val His Cys Ala Asp Leu Ser Asn Pro
    610                 615                 620

Thr Lys Pro Leu Gln Leu Tyr Arg Gln Trp Thr Asp Arg Ile Met Glu
625                 630                 635                 640

Glu Phe Phe Arg Gln Gly Asp Arg Glu Arg Glu Arg Gly Met Glu Ile
                645                 650                 655

Ser Pro Met Cys Asp Lys His Asn Ala Ser Val Glu Lys Ser Gln Val
            660                 665                 670

Gly Phe Ile Asp Tyr Ile Val His Pro Leu Trp Glu Thr Trp Ala Asp
        675                 680                 685

Leu Val His Pro Asp Ala Gln Asp Ile Leu Asp Thr Leu Glu Asp Asn
    690                 695                 700

Arg Glu Trp Tyr Gln Ser Thr Ile Pro Gln Ser Pro Ser Pro Ala Pro
705                 710                 715                 720

Asp Asp Pro Glu Glu Gly Arg Gln Gly Gln Thr Glu Lys Phe Gln Phe
                725                 730                 735

Glu Leu Thr Leu Glu Glu Asp Gly Glu Ser Asp Thr Glu Lys Asp Ser
            740                 745                 750

Gly Ser Gln Val Glu Glu Asp Thr Ser Cys Ser Asp Ser Lys Thr Leu
        755                 760                 765

Cys Thr Gln Asp Ser Glu Ser Thr Glu Ile Pro Leu Asp Glu Gln Val
    770                 775                 780

Glu Glu Glu Ala Val Gly Glu Glu Glu Glu Ser Gln Pro Glu Ala Cys
785                 790                 795                 800

Val Ile Asp Asp Arg Ser Pro Asp Thr
                805


<210> SEQ ID NO 12
<211> LENGTH: 7979
<212> TYPE: DNA
<213> ORGANISM: Homo sapiens

<400> SEQUENCE: 12

cagcagcagg ctcagacctg cttccctgga catttccggg accgtgagcg agggaaccac      60

gttgccctgg attcttgcca gctgtacaaa gttgaccagg aaaatggctc agcagacaag     120

cccggacact ttaacagtac ctgaagtgga taatccgcat tgtccaaacc cgtggctgaa     180

cgaagacctt gtgaaatcct tgcgagaaaa cctgttgcag catgagaagt ccaagacagc     240

gaggaaatcg gtttctccca agctctctcc agtgatctct ccgagaaatt cccccaggct     300

tctgcgcaga atgcttctca gcagcaacat ccccaaacag cggcgtttca cggtggcaca     360

tacatgtttt gatgtggaca atggcacatc tgcgggacgg agtcccttgg atcccatgac     420

cagcccagga tccgggctaa ttctccaagc aaattttgtc cacagtcaac gacgggagtc     480

cttcctgtat cgatccgaca gcgattatga cctctctcca aagtctatgt cccggaactc     540
```

```
ctccattgcc agtgatatac acggagatga cttgattgtg actccatttg ctcaggtctt    600
ggccagtctg cgaactgtac gaaacaactt tgctgcatta actaatttgc aagatcgagc    660
acctagcaaa agatcaccca tgtgcaacca accatccatc aacaaagcca ccataacaga    720
ggaggcctac cagaaactgg ccagcgagac cctggaggag ctggactggt gtctggacca    780
gctagagacc ctacagacca ggcactccgt cagtgagatg gcctccaaca agtttaaaag    840
gatgcttaat cgggagctca cccatctctc tgaaatgagt cggtctggaa atcaagtgtc    900
agagtttata tcaaacacat tcttagataa gcaacatgaa gtggaaattc cttctccaac    960
tcagaaggaa aaggagaaaa agaaaagacc aatgtctcag atcagtggag tcaagaaatt   1020
gatgcacagc tctagtctga ctaattcaag tatcccaagg tttggagtta aaactgaaca   1080
agaagatgtc cttgccaagg aactagaaga tgtgaacaaa tggggtcttc atgttttcag   1140
aatagcagag ttgtctggta accggccctt gactgttatc atgcacacca tttttcagga   1200
acgggattta ttaaaaacat ttaaaattcc agtagatact ttaattacat atcttatgac   1260
tctcgaagac cattaccatg ctgatgtggc ctatcacaac aatatccatg ctgcagatgt   1320
tgtccagtct actcatgtgc tattatctac acctgctttg gaggctgtgt ttacagattt   1380
ggagattctt gcagcaattt ttgccagtgc aatacatgat gtagatcatc ctggtgtgtc   1440
caatcaattt ctgatcaata caaactctga acttgccttg atgtacaatg attcctcagt   1500
cttagagaac catcatttgg ctgtgggctt taaattgctt caggaagaaa actgtgacat   1560
tttccagaat ttgaccaaaa aacaaagaca atctttaagg aaaatggtca ttgacatcgt   1620
acttgcaaca gatatgtcaa aacacatgaa tctactggct gatttgaaga ctatggttga   1680
aactaagaaa gtgacaagct ctggagttct tcttcttgat aattattccg ataggattca   1740
ggttcttcag aatatggtgc actgtgcaga tctgagcaac ccaacaaagc ctctccagct   1800
gtaccgccag tggacggacc ggataatgga ggagttcttc cgccaaggag accgagagag   1860
ggaacgtggc atggagataa gccccatgtg tgacaagcac aatgcttccg tggaaaaatc   1920
acaggtgggc ttcatagact atattgttca tcccctctgg gagacatggg cagacctcgt   1980
ccaccctgac gcccaggata ttttggacac tttggaggac aatcgtgaat ggtaccagag   2040
cacaatccct cagagcccct ctcctgcacc tgatgaccca gaggagggcc ggcagggtca   2100
aactgagaaa ttccagtttg aactaacttt agaggaagat ggtgagtcag acacggaaaa   2160
ggacagtggc agtcaagtgg aagaagacac tagctgcagt gactccaaga ctctttgtac   2220
tcaagactca gagtctactg aaattcccct tgatgaacag gttgaagagg aggcagtagg   2280
ggaagaagag gaaagccagc ctgaagcctg tgtcatagat gatcgttctc ctgacacgta   2340
acagtgcaaa aactttcatg ccttttttt ttttaagtag aaaaattgtt tccaaagtgc   2400
atgtcacatg ccacaaccac ggtcacacct cactgtcatc tgccaggacg tttgttgaac   2460
aaaactgacc ttgactactc agtccagcgc tcaggaatat cgtaaccagt tttttcacct   2520
ccatgtcatc cgagcaaggt ggacatcttc acgaacagcg tttttaacaa gatttcagct   2580
tggtagagct gacaaagcag ataaaatcta ctccaaatta ttttcaagag agtgtgactc   2640
atcaggcagc ccaaaagttt attggacttg ggtttctat tcctttttat ttgtttgcaa   2700
tattttcaga agaaaggcat tgcacagagt gaacttaatg gacgaagcaa caaatatgtc   2760
aagaacagga catagcacga atctgttacc agtaggagga ggatgagcca cagaaattgc   2820
ataattttct aatttcaagt cttcctgata catgactgaa tagtgtggtt cagtgagctg   2880
cactgacctc tacattttgt atgatatgta aaacagattt tttgtagagc ttacttttat   2940
```

```
tattaaatgt attgaggtat tatatttaaa aaaaactatg ttcagaactt catctgccac   3000
tggttatttt tttctaagga gtaacttgca agttttcagt acaaatctgt gctacactgg   3060
ataaaaatct aatttatgaa ttttacttgc accttatagt tcatagcaat taactgattt   3120
gtagtgattc attgtttgtt ttatatacca atgacttcca tattttaaaa gagaaaaaca   3180
actttatgtt gcaggaaacc ctttttgtaa gtctttatta tttactttgc attttgtttc   3240
actctttcca gataagcaga gttgctcttc accagtgttt ttcttcatgt gcaaagtgac   3300
tatttgttct ataatacttt tatgtgtgtt atatcaaatg tgtcttaagc ttcatgcaaa   3360
ctcagtcatc agttcgtgtt gtctgaagca agtgggagat atataaatac ccagtagcta   3420
aaatggtcag tctttttttag atgttttcct acttagtatc tcctaataac gttttgctgt   3480
gtcactagat gttcatttca caagtgcatg tctttctaat aatccacaca tttcatgctc   3540
taataatcca cacatttcat gctcattttt attgttttta cagccagtta tagtaagaaa   3600
aaggtttttc cccttgtgct gctttataat ttagcgtgtg tctgaacctt atccatgttt   3660
gctagatgag gtcttgtcaa atatatcact accattgtca ccggtgaaaa gaaacaggta   3720
gttaagttag ggttaacatt catttcaacc acgaggttgt atatcatgac tagcttttac   3780
tcttggttta cagagaaaag ttaaacagcc aactaggcag tttttaagaa tattaacaat   3840
atattaacaa acaccaatac aactaatcct atttggtttt aatgatttca ccatgggatt   3900
aagaactata tcaggaacat ccctgagaaa cggttttaag tgtagcaact actcttcctt   3960
aatggacagc cacataacgt gtaggaagtc ctttatcact tatcctcgat ccataagcat   4020
atcttgcaga ggggaactac ttctttaaac acatggaggg aaagaagatg atgccactgg   4080
caccagaggg ttagtactgt gatgcatcct aaaatattta ttatattggt aaaaattctg   4140
gttaaataaa aaattagaga tcactcttgg ctgatttcag caccaggaac tgtattacag   4200
ttttagagat taattcctag tgtttacctg attatagcag ttggcatcat ggggcattta   4260
attctgactt tatccccacg tcagccttaa taaagtcttc tttaccttct ctatgaagac   4320
tttaaagccc aaataatcat ttttcacatt gatattcaag aattgagata gatagaagcc   4380
aaagtgggta tctgacaagt ggaaaatcaa acgtttaaga agaattacaa ctctgaaaag   4440
catttatatg tggaacttct caaggagcct cctggggact ggaaagtaag tcatcagcca   4500
ggcaaatgac tcatgctgaa gagagtcccc atttcagtcc cctgagatct agctgatgct   4560
tagatccttt gaaataaaaa ttatgtcttt ataactctga tcttttacat aaagcagaag   4620
aggaatcaac tagttaattg caaggtttct actctgtttc ctctgtaaag atcagatggt   4680
aatctttcaa ataagaaaaa aataaagacg tatgtttgac caagtagttt cacaagaata   4740
tttgggaact tgtttctttt aattttattt gtccctgagt gaagtctaga aagaaaggta   4800
aagagtctag agtttattcc tctttccaaa acattctcat tcctctcctc cctacactta   4860
gtatttcccc cacagagtgc ctagaatctt aataatgaat aaaataaaaa gcagcaatat   4920
gtcattaaca aatccagacc tgaaagggta aagggtttat aactgcacta ataaagagag   4980
gctctttttt tttcttccag tttgttggtt tttaatggta ccgtgttgta aagataccca   5040
ctaatggaca atcaaattgc agaaaaggct caatatccaa gagacaggga ctaatgcact   5100
gtacaatctg cttatccttg cccttctctc ttgccaaagt gtgcttcaga aatatatact   5160
gctttaaaaa agaataaaag aatatccttt tacaagtggc tttacatttc ctaaaatgcc   5220
ataagaaaat gcaatatctg ggtactgtat ggggaaaaaa atgtccaagt ttgtgtaaaa   5280
```

```
ccagtgcatt tcagcttgca agttactgaa cacaataatg ctgttttaat tttgttttat   5340
atcagttaaa attcacaata atgtagatag aacaaattac agacaaggaa agaaaaaact   5400
tgaatgaaat ggattttaca gaaagcttta tgataatttt tgaatgcatt atttattttt   5460
tgtgccatgc attttttttc tcaccaaatg accttacctg taatacagtc ttgtttgtct   5520
gtttacaacc atgtatttat tgcaatgtac atactgtaat gttaattgta aattatctgt   5580
tcttattaaa acatcatccc atgatgggat ggtgttgata tatttggaaa ctcttggtga   5640
gagaatgaat ggtgtgtata catactctgt acatttttct tttctcctgt aatatagtct   5700
tgtcacctta gagcttgttt atggaagatt caagaaaact ataaaatact taaagatata   5760
taaatttaaa aaaacatagc tgcaggtctt tggtcccagg gctgtgcctt aactttaacc   5820
aatattttct tctgttttgc tgcatttgaa aggtaacagt ggagctaggg ctgggcattt   5880
tacatccagg cttttaattg attagaattc tgccaatagg tggattttac aaaaccacag   5940
acaacctctg aaagattctg agaccctttt gagacagaag ctcttaagta cttcttgcca   6000
gggagcagca ctgcatgtgt gatggttgtt tgccatctgt tgatcaggaa ctacttcagc   6060
tacttgcatt tgattatttc cttttttttt ttttttaact cggaaacaca actggggaaa   6120
tatattcttt cccagtgatt ataaacaatc tttttctttt ttttaagtcc ttttggcttc   6180
tagagctcat aggaaaatgg acttgatttg aaattggagc cagagtttac tcgtgttggt   6240
tatctattca tcagcttcct gacatgttaa gagaatacat taaagagaaa atactgtttt   6300
ttaatcctaa aatttttctt ccactaagat aaaccaaatg tccttacata tatgtaaacc   6360
catctattta aacgcaaagg tgggttgatg tcagtttaca tagcagaaag cattcactat   6420
cctctaagat ttgtttctgc aaaactttca ttgctttaga attttaaaat ttcaccttgt   6480
acaatggcca gcccctaaag caggaaacat ttataatgga ttatatggaa acatcctccc   6540
agtacttgcc cagcccttga atcatgtggc ttttcagtga aaggaaagat tctttttcta   6600
ggaaaaatga gcctatttta ttttatttta ttttattttt tgacacaaac tgtagatttt   6660
agcagccctg gcccaaagga atttgattac ttttgtttta aacagtacaa aggggacact   6720
ataattacaa aaacatcctt aactgatttg agttgttttt atttctttgg atatattttc   6780
agagtggtaa attgtgtgtg agaattacaa atgattattc ttttagtggt ttcttagcct   6840
ctcttacagc ccacggggat agtactgtac atcaatacct tcatatgaaa tttttatatg   6900
caatgaaaat aaaagcatgg gttgattctg cctatttatg actcaatctt ttacaaataa   6960
aagattattc attttaaatt atagttcaat cagcatgtct cttaggatac tgaacgtggt   7020
tgaaatgaaa ggatagtgac atcataagtt agtactgata ttcataacca aataaagcca   7080
acttgagtaa ttttgctaca ttaaaaatta ccaaaattac ttagatggcc tataagatta   7140
agcatggtgt tttctaagca agctttgaaa ggggccttcc atacttactt aattgaatat   7200
tctgggatat tgaaaattat tcagatactt gacaattatt tttggttacc tactccgcaa   7260
actacaaagt tttaaggact caacaataag ttaatgagac acagtgtttg ctttcatgga   7320
gcttacagtc tggaggggac aaaggcttaa acaatactca tataattata tatgtgatca   7380
gtacaatgaa ggagctcagt ggggtaaata agcaggaacc tgaacttgat ctgttccgga   7440
gggccacaga aggcttcctt gaggccttga gaaagtgatt tgcatctgag ttctgaagga   7500
ttgtaagagg taactaggga aaaagttgac aggaagagga aggggatcca gacaagaaac   7560
atttgcaaag atcttgaggc ataaatgagc ttgagacatc tggagaaact gaggaaaagt   7620
gagagagtag gcagggcctg gagccgcaga gccattgcta accatcctgt gtgagatatc   7680
```

```
ccccattctg tagctttatt ctcataaccc tgctcaattt tctttataac acttctcaca   7740

gatttatata cgtgtttgtt tttgttatct gtctctccca ccagaccaca gctccatgag   7800

agcaaggtct ttgcttacca atatatcact agcacttaaa actatgcctg gtacacagta   7860

ggttcttaat atgtgttgaa tatagccatc aaattgatat tggatataat tcaatctgat   7920

aagatatttt gagatattaa agagttttta acttgatacc ataaaaaaaa aaaaaaaaa    7979


<210> SEQ ID NO 13
<211> LENGTH: 745
<212> TYPE: PRT
<213> ORGANISM: Homo sapiens

<400> SEQUENCE: 13

Met Ala Gln Gln Thr Ser Pro Asp Thr Leu Thr Val Pro Glu Val Asp
1               5                   10                  15

Asn Pro His Cys Pro Asn Pro Trp Leu Asn Glu Asp Leu Val Lys Ser
            20                  25                  30

Leu Arg Glu Asn Leu Leu Gln His Glu Lys Ser Lys Thr Ala Arg Lys
        35                  40                  45

Ser Val Ser Pro Lys Leu Ser Pro Val Ile Ser Pro Arg Asn Ser Pro
    50                  55                  60

Arg Leu Leu Arg Arg Met Leu Leu Ser Ser Asn Ile Pro Lys Gln Arg
65                  70                  75                  80

Arg Phe Thr Val Ala His Thr Cys Phe Asp Val Asp Asn Gly Thr Ser
                85                  90                  95

Ala Gly Arg Ser Pro Leu Asp Pro Met Thr Ser Pro Gly Ser Gly Leu
            100                 105                 110

Ile Leu Gln Ala Asn Phe Val His Ser Gln Arg Arg Glu Ser Phe Leu
        115                 120                 125

Tyr Arg Ser Asp Ser Asp Tyr Asp Leu Ser Pro Lys Ser Met Ser Arg
    130                 135                 140

Asn Ser Ser Ile Ala Ser Asp Ile His Gly Asp Asp Leu Ile Val Thr
145                 150                 155                 160

Pro Phe Ala Gln Val Leu Ala Ser Leu Arg Thr Val Arg Asn Asn Phe
                165                 170                 175

Ala Ala Leu Thr Asn Leu Gln Asp Arg Ala Pro Ser Lys Arg Ser Pro
            180                 185                 190

Met Cys Asn Gln Pro Ser Ile Asn Lys Ala Thr Ile Thr Glu Glu Ala
        195                 200                 205

Tyr Gln Lys Leu Ala Ser Glu Thr Leu Glu Glu Leu Asp Trp Cys Leu
    210                 215                 220

Asp Gln Leu Glu Thr Leu Gln Thr Arg His Ser Val Ser Glu Met Ala
225                 230                 235                 240

Ser Asn Lys Phe Lys Arg Met Leu Asn Arg Glu Leu Thr His Leu Ser
                245                 250                 255

Glu Met Ser Arg Ser Gly Asn Gln Val Ser Glu Phe Ile Ser Asn Thr
            260                 265                 270

Phe Leu Asp Lys Gln His Glu Val Glu Ile Pro Ser Pro Thr Gln Lys
        275                 280                 285

Glu Lys Glu Lys Lys Lys Arg Pro Met Ser Gln Ile Ser Gly Val Lys
    290                 295                 300

Lys Leu Met His Ser Ser Ser Leu Thr Asn Ser Ser Ile Pro Arg Phe
305                 310                 315                 320
```

```
Gly Val Lys Thr Glu Gln Glu Asp Val Leu Ala Lys Glu Leu Glu Asp
                325                 330                 335

Val Asn Lys Trp Gly Leu His Val Phe Arg Ile Ala Glu Leu Ser Gly
            340                 345                 350

Asn Arg Pro Leu Thr Val Ile Met His Thr Ile Phe Gln Glu Arg Asp
        355                 360                 365

Leu Leu Lys Thr Phe Lys Ile Pro Val Asp Thr Leu Ile Thr Tyr Leu
    370                 375                 380

Met Thr Leu Glu Asp His Tyr His Ala Asp Val Ala Tyr His Asn Asn
385                 390                 395                 400

Ile His Ala Ala Asp Val Val Gln Ser Thr His Val Leu Leu Ser Thr
                405                 410                 415

Pro Ala Leu Glu Ala Val Phe Thr Asp Leu Glu Ile Leu Ala Ala Ile
            420                 425                 430

Phe Ala Ser Ala Ile His Asp Val Asp His Pro Gly Val Ser Asn Gln
        435                 440                 445

Phe Leu Ile Asn Thr Asn Ser Glu Leu Ala Leu Met Tyr Asn Asp Ser
    450                 455                 460

Ser Val Leu Glu Asn His His Leu Ala Val Gly Phe Lys Leu Leu Gln
465                 470                 475                 480

Glu Glu Asn Cys Asp Ile Phe Gln Asn Leu Thr Lys Lys Gln Arg Gln
                485                 490                 495

Ser Leu Arg Lys Met Val Ile Asp Ile Val Leu Ala Thr Asp Met Ser
            500                 505                 510

Lys His Met Asn Leu Leu Ala Asp Leu Lys Thr Met Val Glu Thr Lys
        515                 520                 525

Lys Val Thr Ser Ser Gly Val Leu Leu Leu Asp Asn Tyr Ser Asp Arg
    530                 535                 540

Ile Gln Val Leu Gln Asn Met Val His Cys Ala Asp Leu Ser Asn Pro
545                 550                 555                 560

Thr Lys Pro Leu Gln Leu Tyr Arg Gln Trp Thr Asp Arg Ile Met Glu
                565                 570                 575

Glu Phe Phe Arg Gln Gly Asp Arg Glu Arg Glu Arg Gly Met Glu Ile
            580                 585                 590

Ser Pro Met Cys Asp Lys His Asn Ala Ser Val Glu Lys Ser Gln Val
        595                 600                 605

Gly Phe Ile Asp Tyr Ile Val His Pro Leu Trp Glu Thr Trp Ala Asp
    610                 615                 620

Leu Val His Pro Asp Ala Gln Asp Ile Leu Asp Thr Leu Glu Asp Asn
625                 630                 635                 640

Arg Glu Trp Tyr Gln Ser Thr Ile Pro Gln Ser Pro Ser Pro Ala Pro
                645                 650                 655

Asp Asp Pro Glu Glu Gly Arg Gln Gly Gln Thr Glu Lys Phe Gln Phe
            660                 665                 670

Glu Leu Thr Leu Glu Glu Asp Gly Glu Ser Asp Thr Glu Lys Asp Ser
        675                 680                 685

Gly Ser Gln Val Glu Glu Asp Thr Ser Cys Ser Asp Ser Lys Thr Leu
    690                 695                 700

Cys Thr Gln Asp Ser Glu Ser Thr Glu Ile Pro Leu Asp Glu Gln Val
705                 710                 715                 720

Glu Glu Glu Ala Val Gly Glu Glu Glu Glu Ser Gln Pro Glu Ala Cys
                725                 730                 735

Val Ile Asp Asp Arg Ser Pro Asp Thr
```

740 745

<210> SEQ ID NO 14
<211> LENGTH: 19
<212> TYPE: DNA
<213> ORGANISM: Artificial Sequence
<220> FEATURE:
<223> OTHER INFORMATION: PDE4D5_forward primer

<400> SEQUENCE: 14
gcttctcagc agcaacatc 19

<210> SEQ ID NO 15
<211> LENGTH: 20
<212> TYPE: DNA
<213> ORGANISM: Artificial Sequence
<220> FEATURE:
<223> OTHER INFORMATION: PDE4D5_reverse primer

<400> SEQUENCE: 15
tgccattgtc cacatcaaaa 20

<210> SEQ ID NO 16
<211> LENGTH: 24
<212> TYPE: DNA
<213> ORGANISM: Artificial Sequence
<220> FEATURE:
<223> OTHER INFORMATION: PDE4D5 probe

<400> SEQUENCE: 16
acagcggcgt ttcacggtgg caca 24

<210> SEQ ID NO 17
<211> LENGTH: 7591
<212> TYPE: DNA
<213> ORGANISM: Homo sapiens

<400> SEQUENCE: 17
agttccttat ttggtagctt ttgacaggac tagcctttct tgcaactaag catcttgaca 60
tacattattc attaagccct ggagctcggg agagaaagat gcagaccctt agatctttag 120
atattccttt atcacgtgga ttttctttat tcagaatagt tgctgaattt tgtgccattc 180
tggagtctta caaatggcat gtattcgatg ggaagacggc tggatgggat ttaatgcgag 240
gctttcttat gtatacttaa ttaccaaaaa tctttaaaaa ctcatactct gcgtggcttg 300
tggaggttgt taaagtgtcg agattttgaa gctaaataca ttttagagct tactatatat 360
atacatatat atatatatac atataatcaa tcaaaaatgc ctgaagcaaa ctatttactg 420
tcagtgtctt ggggctacat aaagtttaaa aggatgctta atcgggagct cacccatctc 480
tctgaaatga gtcggtctgg aaatcaagtg tcagagttta tatcaaacac attcttagat 540
aagcaacatg aagtggaaat tccttctcca actcagaagg aaaaggagaa aaagaaaaga 600
ccaatgtctc agatcagtgg agtcaagaaa ttgatgcaca gctctagtct gactaattca 660
agtatcccaa ggtttggagt taaaactgaa caagaagatg tccttgccaa ggaactagaa 720
gatgtgaaca aatggggtct tcatgttttc agaatagcag agttgtctgg taaccggccc 780
ttgactgtta tcatgcacac catttttcag gaacgggatt tattaaaaac atttaaaatt 840
ccagtagata ctttaattac atatcttatg actctcgaag accattacca tgctgatgtg 900
gcctatcaca acaatatcca tgctgcagat gttgtccagt ctactcatgt gctattatct 960
acacctgctt tggaggctgt gtttacagat ttggagattc ttgcagcaat tttgccagt 1020

```
gcaatacatg atgtagatca tcctggtgtg tccaatcaat ttctgatcaa tacaaactct   1080
gaacttgcct tgatgtacaa tgattcctca gtcttagaga accatcattt ggctgtgggc   1140
tttaaattgc ttcaggaaga aaactgtgac attttccaga atttgaccaa aaaacaaaga   1200
caatctttaa ggaaaatggt cattgacatc gtacttgcaa cagatatgtc aaaacacatg   1260
aatctactgg ctgatttgaa gactatggtt gaaactaaga aagtgacaag ctctggagtt   1320
cttcttcttg ataattattc cgataggatt caggttcttc agaatatggt gcactgtgca   1380
gatctgagca acccaacaaa gcctctccag ctgtaccgcc agtggacgga ccggataatg   1440
gaggagttct tccgccaagg agaccgagag agggaacgtg gcatggagat aagccccatg   1500
tgtgacaagc acaatgcttc cgtggaaaaa tcacaggtgg gcttcataga ctatattgtt   1560
catcccctct gggagacatg ggcagacctc gtccaccctg acgcccagga tattttggac   1620
actttggagg acaatcgtga atggtaccag agcacaatcc ctcagagccc ctctcctgca   1680
cctgatgacc cagaggaggg ccggcagggt caaactgaga aattccagtt tgaactaact   1740
ttagaggaag atggtgagtc agacacggaa aaggacagtg gcagtcaagt ggaagaagac   1800
actagctgca gtgactccaa gactctttgt actcaagact cagagtctac tgaaattccc   1860
cttgatgaac aggttgaaga ggaggcagta ggggaagaag aggaaagcca gcctgaagcc   1920
tgtgtcatag atgatcgttc tcctgacacg taacagtgca aaaactttca tgcctttttt   1980
tttttaagt agaaaaattg tttccaaagt gcatgtcaca tgccacaacc acggtcacac   2040
ctcactgtca tctgccagga cgtttgttga acaaaactga ccttgactac tcagtccagc   2100
gctcaggaat atcgtaacca gtttttcac ctccatgtca tccgagcaag gtggacatct   2160
tcacgaacag cgtttttaac aagatttcag cttggtagag ctgacaaagc agataaaatc   2220
tactccaaat tattttcaag agagtgtgac tcatcaggca gcccaaaagt ttattggact   2280
tggggtttct attcctttt atttgtttgc aatattttca gaagaaaggc attgcacaga   2340
gtgaacttaa tggacgaagc aacaaatatg tcaagaacag gacatagcac gaatctgtta   2400
ccagtaggag gaggatgagc cacagaaatt gcataatttt ctaatttcaa gtcttcctga   2460
tacatgactg aatagtgtgg ttcagtgagc tgcactgacc tctacatttt gtatgatatg   2520
taaaacagat tttttgtaga gcttactttt attattaaat gtattgaggt attatattta   2580
aaaaaaacta tgttcagaac ttcatctgcc actggttatt tttttctaag gagtaacttg   2640
caagttttca gtacaaatct gtgctacact ggataaaaat ctaatttatg aattttactt   2700
gcaccttata gttcatagca attaactgat ttgtagtgat tcattgtttg ttttatatac   2760
caatgacttc catattttaa aagagaaaaa caactttatg ttgcaggaaa cccttttgt    2820
aagtctttat tatttacttt gcattttgtt tcactctttc cagataagca gagttgctct   2880
tcaccagtgt ttttcttcat gtgcaaagtg actatttgtt ctataatact tttatgtgtg   2940
ttatatcaaa tgtgtcttaa gcttcatgca aactcagtca tcagttcgtg ttgtctgaag   3000
caagtgggag atatataaat acccagtagc taaaatggtc agtcttttt agatgttttc    3060
ctacttagta tctcctaata acgttttgct gtgtcactag atgttcattt cacaagtgca   3120
tgtctttcta ataatccaca catttcatgc tctaataatc cacacatttc atgctcattt   3180
ttattgtttt tacagccagt tatagtaaga aaaaggtttt tcccttgtg ctgctttata    3240
atttagcgtg tgtctgaacc ttatccatgt ttgctagatg aggtcttgtc aaatatatca   3300
ctaccattgt caccggtgaa aagaaacagg tagttaagtt agggttaaca ttcatttcaa   3360
```

```
ccacgaggtt gtatatcatg actagctttt actcttggtt tacagagaaa agttaaacag   3420
ccaactaggc agtttttaag aatattaaca atatattaac aaacaccaat acaactaatc   3480
ctatttggtt ttaatgattt caccatggga ttaagaacta tatcaggaac atccctgaga   3540
aacggtttta agtgtagcaa ctactcttcc ttaatggaca gccacataac gtgtaggaag   3600
tcctttatca cttatcctcg atccataagc atatcttgca gaggggaact acttctttaa   3660
acacatggag ggaaagaaga tgatgccact ggcaccagag ggttagtact gtgatgcatc   3720
ctaaaatatt tattatattg gtaaaaattc tggttaaata aaaaattaga gatcactctt   3780
ggctgatttc agcaccagga actgtattac agttttagag attaattcct agtgtttacc   3840
tgattatagc agttggcatc atggggcatt taattctgac tttatcccca cgtcagcctt   3900
aataaagtct tctttacctt ctctatgaag actttaaagc ccaaataatc atttttcaca   3960
ttgatattca agaattgaga tagatagaag ccaaagtggg tatctgacaa gtggaaaatc   4020
aaacgtttaa gaagaattac aactctgaaa agcatttata tgtggaactt ctcaaggagc   4080
ctcctgggga ctggaaagta agtcatcagc caggcaaatg actcatgctg aagagagtcc   4140
ccatttcagt cccctgagat ctagctgatg cttagatcct ttgaaataaa aattatgtct   4200
ttataactct gatcttttac ataaagcaga agaggaatca actagttaat tgcaaggttt   4260
ctactctgtt tcctctgtaa agatcagatg gtaatctttc aaataagaaa aaaataaaga   4320
cgtatgtttg accaagtagt ttcacaagaa tatttgggaa cttgtttctt ttaattttat   4380
ttgtccctga gtgaagtcta gaaagaaagg taaagagtct agagtttatt cctctttcca   4440
aaacattctc attcctctcc tccctacact tagtatttcc cccacagagt gcctagaatc   4500
ttaataatga ataaaataaa aagcagcaat atgtcattaa caaatccaga cctgaaaggg   4560
taaagggttt ataactgcac taataaagag aggctctttt tttttcttcc agtttgttgg   4620
tttttaatgg taccgtgttg taaagatacc cactaatgga caatcaaatt gcagaaaagg   4680
ctcaatatcc aagagacagg gactaatgca ctgtacaatc tgcttatcct tgcccttctc   4740
tcttgccaaa gtgtgcttca gaaatatata ctgctttaaa aaagaataaa agaatatcct   4800
tttacaagtg gctttacatt tcctaaaatg ccataagaaa atgcaatatc tgggtactgt   4860
atggggaaaa aaatgtccaa gtttgtgtaa aaccagtgca tttcagcttg caagttactg   4920
aacacaataa tgctgtttta attttgtttt atatcagtta aaattcacaa taatgtagat   4980
agaacaaatt acagacaagg aaagaaaaaa cttgaatgaa atggatttta cagaaagctt   5040
tatgataatt tttgaatgca ttatttattt tttgtgccat gcattttttt tctcaccaaa   5100
tgaccttacc tgtaatacag tcttgtttgt ctgtttacaa ccatgtattt attgcaatgt   5160
acatactgta atgttaattg taaattatct gttcttatta aaacatcatc ccatgatggg   5220
atggtgttga tatatttgga aactcttggt gagagaatga atggtgtgta tacatactct   5280
gtacattttt cttttctcct gtaatatagt cttgtcacct tagagcttgt ttatggaaga   5340
ttcaagaaaa ctataaaata cttaaagata tataaattta aaaaaacata gctgcaggtc   5400
tttggtccca gggctgtgcc ttaactttaa ccaatatttt cttctgtttt gctgcatttg   5460
aaaggtaaca gtggagctag ggctgggcat tttacatcca ggcttttaat tgattagaat   5520
tctgccaata ggtggatttt acaaaaccac agacaacctc tgaaagattc tgagaccctt   5580
ttgagacaga agctcttaag tacttcttgc cagggagcag cactgcatgt gtgatggttg   5640
tttgccatct gttgatcagg aactacttca gctacttgca tttgattatt tcctttttt    5700
ttttttttaa ctcggaaaca caactgggga aatatattct ttcccagtga ttataaacaa   5760
```

```
tctttttctt ttttttaagt ccttttggct tctagagctc ataggaaaat ggacttgatt   5820

tgaaattgga gccagagttt actcgtgttg gttatctatt catcagcttc ctgacatgtt   5880

aagagaatac attaaagaga aaatactgtt ttttaatcct aaaatttttc ttccactaag   5940

ataaaccaaa tgtccttaca tatatgtaaa cccatctatt taaacgcaaa ggtgggttga   6000

tgtcagttta catagcagaa agcattcact atcctctaag atttgtttct gcaaaacttt   6060

cattgcttta gaattttaaa atttcacctt gtacaatggc cagcccctaa agcaggaaac   6120

atttataatg gattatatgg aaacatcctc ccagtacttg cccagccctt gaatcatgtg   6180

gcttttcagt gaaaggaaag attctttttc taggaaaaat gagcctattt tattttattt   6240

tattttattt tttgacacaa actgtagatt ttagcagccc tggcccaaag gaatttgatt   6300

acttttgttt taaacagtac aaaggggaca ctataattac aaaaacatcc ttaactgatt   6360

tgagttgttt ttatttcttt ggatatattt tcagagtggt aaattgtgtg tgagaattac   6420

aaatgattat tcttttagtg gtttcttagc ctctcttaca gcccacgggg atagtactgt   6480

acatcaatac cttcatatga aatttttata tgcaatgaaa ataaaagcat gggttgattc   6540

tgcctattta tgactcaatc ttttacaaat aaaagattat tcattttaaa ttatagttca   6600

atcagcatgt ctcttaggat actgaacgtg gttgaaatga aaggatagtg acatcataag   6660

ttagtactga tattcataac caaataaagc caacttgagt aattttgcta cattaaaaat   6720

taccaaaatt acttagatgg cctataagat taagcatggt gttttctaag caagctttga   6780

aaggggcctt ccatacttac ttaattgaat attctgggat attgaaaatt attcagatac   6840

ttgacaatta tttttggtta cctactccgc aaactacaaa gttttaagga ctcaacaata   6900

agttaatgag acacagtgtt tgctttcatg gagcttacag tctggagggg acaaaggctt   6960

aaacaatact catataatta tatatgtgat cagtacaatg aaggagctca gtggggtaaa   7020

taagcaggaa cctgaacttg atctgttccg gagggccaca gaaggcttcc ttgaggcctt   7080

gagaaagtga tttgcatctg agttctgaag gattgtaaga ggtaactagg gaaaaagttg   7140

acaggaagag gaaggggatc cagacaagaa acatttgcaa agatcttgag gcataaatga   7200

gcttgagaca tctggagaaa ctgaggaaaa gtgagagagt aggcagggcc tggagccgca   7260

gagccattgc taaccatcct gtgtgagata tcccccattc tgtagcttta ttctcataac   7320

cctgctcaat ttctttata acacttctca cagatttata tacgtgtttg tttttgttat   7380

ctgtctctcc caccagacca cagctccatg agagcaaggt ctttgcttac caatatatca   7440

ctagcactta aaactatgcc tggtacacag taggttctta atatgtgttg aatatagcca   7500

tcaaattgat attggatata attcaatctg ataagatatt ttgagatatt aaagagtttt   7560

taacttgata ccataaaaaa aaaaaaaaaa a                                  7591
```

<210> SEQ ID NO 18
<211> LENGTH: 518
<212> TYPE: PRT
<213> ORGANISM: Homo sapiens

<400> SEQUENCE: 18

```
Met Pro Glu Ala Asn Tyr Leu Leu Ser Val Ser Trp Gly Tyr Ile Lys
1               5                   10                  15

Phe Lys Arg Met Leu Asn Arg Glu Leu Thr His Leu Ser Glu Met Ser
            20                  25                  30

Arg Ser Gly Asn Gln Val Ser Glu Phe Ile Ser Asn Thr Phe Leu Asp
        35                  40                  45
```

```
Lys Gln His Glu Val Glu Ile Pro Ser Pro Thr Gln Lys Glu Lys Glu
    50                  55                  60

Lys Lys Lys Arg Pro Met Ser Gln Ile Ser Gly Val Lys Lys Leu Met
65                  70                  75                  80

His Ser Ser Ser Leu Thr Asn Ser Ser Ile Pro Arg Phe Gly Val Lys
                85                  90                  95

Thr Glu Gln Glu Asp Val Leu Ala Lys Glu Leu Glu Asp Val Asn Lys
            100                 105                 110

Trp Gly Leu His Val Phe Arg Ile Ala Glu Leu Ser Gly Asn Arg Pro
        115                 120                 125

Leu Thr Val Ile Met His Thr Ile Phe Gln Glu Arg Asp Leu Leu Lys
    130                 135                 140

Thr Phe Lys Ile Pro Val Asp Thr Leu Ile Thr Tyr Leu Met Thr Leu
145                 150                 155                 160

Glu Asp His Tyr His Ala Asp Val Ala Tyr His Asn Asn Ile His Ala
                165                 170                 175

Ala Asp Val Val Gln Ser Thr His Val Leu Leu Ser Thr Pro Ala Leu
            180                 185                 190

Glu Ala Val Phe Thr Asp Leu Glu Ile Leu Ala Ala Ile Phe Ala Ser
        195                 200                 205

Ala Ile His Asp Val Asp His Pro Gly Val Ser Asn Gln Phe Leu Ile
    210                 215                 220

Asn Thr Asn Ser Glu Leu Ala Leu Met Tyr Asn Asp Ser Ser Val Leu
225                 230                 235                 240

Glu Asn His His Leu Ala Val Gly Phe Lys Leu Leu Gln Glu Glu Asn
                245                 250                 255

Cys Asp Ile Phe Gln Asn Leu Thr Lys Lys Gln Arg Gln Ser Leu Arg
            260                 265                 270

Lys Met Val Ile Asp Ile Val Leu Ala Thr Asp Met Ser Lys His Met
        275                 280                 285

Asn Leu Leu Ala Asp Leu Lys Thr Met Val Glu Thr Lys Lys Val Thr
    290                 295                 300

Ser Ser Gly Val Leu Leu Leu Asp Asn Tyr Ser Asp Arg Ile Gln Val
305                 310                 315                 320

Leu Gln Asn Met Val His Cys Ala Asp Leu Ser Asn Pro Thr Lys Pro
                325                 330                 335

Leu Gln Leu Tyr Arg Gln Trp Thr Asp Arg Ile Met Glu Glu Phe Phe
            340                 345                 350

Arg Gln Gly Asp Arg Glu Arg Glu Arg Gly Met Glu Ile Ser Pro Met
        355                 360                 365

Cys Asp Lys His Asn Ala Ser Val Glu Lys Ser Gln Val Gly Phe Ile
    370                 375                 380

Asp Tyr Ile Val His Pro Leu Trp Glu Thr Trp Ala Asp Leu Val His
385                 390                 395                 400

Pro Asp Ala Gln Asp Ile Leu Asp Thr Leu Glu Asp Asn Arg Glu Trp
                405                 410                 415

Tyr Gln Ser Thr Ile Pro Gln Ser Pro Ser Pro Ala Pro Asp Asp Pro
            420                 425                 430

Glu Glu Gly Arg Gln Gly Gln Thr Glu Lys Phe Gln Phe Glu Leu Thr
        435                 440                 445

Leu Glu Glu Asp Gly Glu Ser Asp Thr Glu Lys Asp Ser Gly Ser Gln
    450                 455                 460
```

```
Val Glu Glu Asp Thr Ser Cys Ser Asp Ser Lys Thr Leu Cys Thr Gln
465                 470                 475                 480

Asp Ser Glu Ser Thr Glu Ile Pro Leu Asp Glu Gln Val Glu Glu Glu
                485                 490                 495

Ala Val Gly Glu Glu Glu Glu Ser Gln Pro Glu Ala Cys Val Ile Asp
            500                 505                 510

Asp Arg Ser Pro Asp Thr
        515


<210> SEQ ID NO 19
<211> LENGTH: 8130
<212> TYPE: DNA
<213> ORGANISM: Homo sapiens

<400> SEQUENCE: 19

agattatagc ccagcgtacg agaagcacga gtcctatagt tggcgtaccc tgaggcctgc      60

cagttcctgc cttaatgcat atgtagtcgt aattgagttc tgacacggcc ttggatgttt     120

ctgtcctaaa tagctgacat tgcatcttca agactgtcat tccagttggc ttttgagtgg     180

atacgtgcag tgagatcatt gacactggaa acactagttc ccattttaat tacttaaaac     240

accacgatga aaagaaatac ctgtgatttg ctttctcgga gcaaaagtgc ctctgaggaa     300

acactacatt ccagtaatga agaggaagac cctttccgcg gaatggaacc ctatcttgtc     360

cggagacttt catgtcgcaa tattcagctt ccccctctcg ccttcagaca gttggaacaa     420

gctgacttga aaagtgaatc agagaacatt caacgaccaa ccagcctccc cctgaagatt     480

ctgccgctga ttgctatcac ttctgcagaa tccagtggtt ttgatgtgga caatggcaca     540

tctgcgggac ggagtccctt ggatcccatg accagcccag gatccgggct aattctccaa     600

gcaaattttg tccacagtca acgacgggag tccttcctgt atcgatccga cagcgattat     660

gacctctctc caaagtctat gtcccggaac tcctccattg ccagtgatat acacggagat     720

gacttgattg tgactccatt tgctcaggtc ttggccagtc tgcgaactgt acgaaacaac     780

tttgctgcat taactaattt gcaagatcga gcacctagca aaagatcacc catgtgcaac     840

caaccatcca tcaacaaagc caccataaca gaggaggcct accagaaact ggccagcgag     900

accctggagg agctggactg gtgtctggac cagctagaga ccctacagac caggcactcc     960

gtcagtgaga tggcctccaa caagtttaaa aggatgctta atcgggagct cacccatctc    1020

tctgaaatga gtcggtctgg aaatcaagtg tcagagttta tatcaaacac attcttagat    1080

aagcaacatg aagtggaaat tccttctcca actcagaagg aaaaggagaa aaagaaaaga    1140

ccaatgtctc agatcagtgg agtcaagaaa ttgatgcaca gctctagtct gactaattca    1200

agtatcccaa ggtttggagt taaaactgaa caagaagatg tccttgccaa ggaactagaa    1260

gatgtgaaca aatggggtct tcatgttttc agaatagcag agttgtctgg taaccggccc    1320

ttgactgtta tcatgcacac catttttcag gaacgggatt tattaaaaac atttaaaatt    1380

ccagtagata ctttaattac atatcttatg actctcgaag accattacca tgctgatgtg    1440

gcctatcaca acaatatcca tgctgcagat gttgtccagt ctactcatgt gctattatct    1500

acacctgctt tggaggctgt gtttacagat ttggagattc ttgcagcaat tttgccagt     1560

gcaatacatg atgtagatca tcctggtgtg tccaatcaat ttctgatcaa tacaaactct    1620

gaacttgcct tgatgtacaa tgattcctca gtcttagaga accatcattt ggctgtgggc    1680

tttaaattgc ttcaggaaga aaactgtgac attttccaga atttgaccaa aaaacaaaga    1740

caatctttaa ggaaaatggt cattgacatc gtacttgcaa cagatatgtc aaaacacatg    1800
```

```
aatctactgg ctgatttgaa gactatggtt gaaactaaga aagtgacaag ctctggagtt   1860
cttcttcttg ataattattc cgataggatt caggttcttc agaatatggt gcactgtgca   1920
gatctgagca acccaacaaa gcctctccag ctgtaccgcc agtggacgga ccggataatg   1980
gaggagttct tccgccaagg agaccgagag agggaacgtg gcatggagat aagccccatg   2040
tgtgacaagc acaatgcttc cgtggaaaaa tcacaggtgg gcttcataga ctatattgtt   2100
catcccctct gggagacatg ggcagacctc gtccaccctg acgcccagga tattttggac   2160
actttggagg acaatcgtga atggtaccag agcacaatcc ctcagagccc ctctcctgca   2220
cctgatgacc cagaggaggg ccggcagggt caaactgaga aattccagtt tgaactaact   2280
ttagaggaag atggtgagtc agacacggaa aaggacagtg gcagtcaagt ggaagaagac   2340
actagctgca gtgactccaa gactctttgt actcaagact cagagtctac tgaaattccc   2400
cttgatgaac aggttgaaga ggaggcagta ggggaagaag aggaaagcca gcctgaagcc   2460
tgtgtcatag atgatcgttc tcctgacacg taacagtgca aaaactttca tgcctttttt   2520
tttttaagt agaaaaattg tttccaaagt gcatgtcaca tgccacaacc acggtcacac   2580
ctcactgtca tctgccagga cgtttgttga acaaaactga ccttgactac tcagtccagc   2640
gctcaggaat atcgtaacca gttttttcac ctccatgtca tccgagcaag gtggacatct   2700
tcacgaacag cgtttttaac aagatttcag cttggtagag ctgacaaagc agataaaatc   2760
tactccaaat tattttcaag agagtgtgac tcatcaggca gcccaaaagt ttattggact   2820
tggggtttct attccttttt atttgtttgc aatattttca gaagaaaggc attgcacaga   2880
gtgaacttaa tggacgaagc aacaaatatg tcaagaacag gacatagcac gaatctgtta   2940
ccagtaggag gaggatgagc cacagaaatt gcataatttt ctaatttcaa gtcttcctga   3000
tacatgactg aatagtgtgg ttcagtgagc tgcactgacc tctacatttt gtatgatatg   3060
taaaacagat tttttgtaga gcttactttt attattaaat gtattgaggt attatattta   3120
aaaaaaacta tgttcagaac ttcatctgcc actggttatt tttttctaag gagtaacttg   3180
caagttttca gtacaaatct gtgctacact ggataaaaat ctaatttatg aattttactt   3240
gcaccttata gttcatagca attaactgat ttgtagtgat tcattgtttg ttttatatac   3300
caatgacttc catattttaa aagagaaaaa caactttatg ttgcaggaaa cccttttttgt  3360
aagtctttat tatttacttt gcattttgtt tcactctttc cagataagca gagttgctct   3420
tcaccagtgt ttttcttcat gtgcaaagtg actatttgtt ctataatact tttatgtgtg   3480
ttatatcaaa tgtgtcttaa gcttcatgca aactcagtca tcagttcgtg ttgtctgaag   3540
caagtgggag atatataaat acccagtagc taaaatggtc agtctttttt agatgttttc   3600
ctacttagta tctcctaata acgttttgct gtgtcactag atgttcattt cacaagtgca   3660
tgtctttcta ataatccaca catttcatgc tctaataatc cacacatttc atgctcattt   3720
ttattgtttt tacagccagt tatagtaaga aaaaggtttt tccccttgtg ctgctttata   3780
atttagcgtg tgtctgaacc ttatccatgt ttgctagatg aggtcttgtc aaatatatca   3840
ctaccattgt caccggtgaa aagaaacagg tagttaagtt agggttaaca ttcatttcaa   3900
ccacgaggtt gtatatcatg actagctttt actcttggtt tacagagaaa agttaaacag   3960
ccaactaggc agtttttaag aatattaaca atatattaac aaacaccaat acaactaatc   4020
ctatttggtt ttaatgattt caccatggga ttaagaacta tatcaggaac atccctgaga   4080
aacggtttta agtgtagcaa ctactcttcc ttaatggaca gccacataac gtgtaggaag   4140
```

```
tcctttatca cttatcctcg atccataagc atatcttgca gaggggaact acttctttaa   4200

acacatggag ggaaagaaga tgatgccact ggcaccagag ggttagtact gtgatgcatc   4260

ctaaaatatt tattatattg gtaaaaattc tggttaaata aaaaattaga gatcactctt   4320

ggctgatttc agcaccagga actgtattac agttttagag attaattcct agtgtttacc   4380

tgattatagc agttggcatc atggggcatt taattctgac tttatcccca cgtcagcctt   4440

aataaagtct tctttacctt ctctatgaag actttaaagc ccaaataatc atttttcaca   4500

ttgatattca agaattgaga tagatagaag ccaaagtggg tatctgacaa gtggaaaatc   4560

aaacgtttaa gaagaattac aactctgaaa agcatttata tgtggaactt ctcaaggagc   4620

ctcctgggga ctggaaagta agtcatcagc caggcaaatg actcatgctg aagagagtcc   4680

ccatttcagt cccctgagat ctagctgatg cttagatcct ttgaaataaa aattatgtct   4740

ttataactct gatcttttac ataaagcaga agaggaatca actagttaat tgcaaggttt   4800

ctactctgtt tcctctgtaa agatcagatg gtaatctttc aaataagaaa aaaataaaga   4860

cgtatgtttg accaagtagt ttcacaagaa tatttgggaa cttgtttctt ttaattttat   4920

ttgtccctga gtgaagtcta gaaagaaagg taaagagtct agagtttatt cctctttcca   4980

aaacattctc attcctctcc tccctacact tagtatttcc cccacagagt gcctagaatc   5040

ttaataatga ataaaataaa aagcagcaat atgtcattaa caaatccaga cctgaaaggg   5100

taaagggttt ataactgcac taataaagag aggctctttt tttttcttcc agtttgttgg   5160

tttttaatgg taccgtgttg taaagatacc cactaatgga caatcaaatt gcagaaaagg   5220

ctcaatatcc aagagacagg gactaatgca ctgtacaatc tgcttatcct tgcccttctc   5280

tcttgccaaa gtgtgcttca gaaatatata ctgctttaaa aaagaataaa agaatatcct   5340

tttacaagtg gctttacatt tcctaaaatg ccataagaaa atgcaatatc tgggtactgt   5400

atggggaaaa aaatgtccaa gtttgtgtaa aaccagtgca tttcagcttg caagttactg   5460

aacacaataa tgctgtttta attttgtttt atatcagtta aaattcacaa taatgtagat   5520

agaacaaatt acagacaagg aaagaaaaaa cttgaatgaa atggatttta cagaaagctt   5580

tatgataatt tttgaatgca ttatttattt tttgtgccat gcattttttt tctcaccaaa   5640

tgaccttacc tgtaatacag tcttgtttgt ctgtttacaa ccatgtattt attgcaatgt   5700

acatactgta atgttaattg taaattatct gttcttatta aaacatcatc ccatgatggg   5760

atggtgttga tatatttgga aactcttggt gagagaatga atggtgtgta tacatactct   5820

gtacattttt cttttctcct gtaatatagt cttgtcacct tagagcttgt ttatggaaga   5880

ttcaagaaaa ctataaaata cttaaagata tataaattta aaaaaacata gctgcaggtc   5940

tttggtccca gggctgtgcc ttaactttaa ccaatatttt cttctgtttt gctgcatttg   6000

aaaggtaaca gtggagctag ggctgggcat tttacatcca ggcttttaat tgattagaat   6060

tctgccaata ggtggatttt acaaaaccac agacaacctc tgaaagattc tgagaccctt   6120

ttgagacaga agctcttaag tacttcttgc cagggagcag cactgcatgt gtgatggttg   6180

tttgccatct gttgatcagg aactacttca gctacttgca tttgattatt tccttttttt   6240

tttttttaa ctcggaaaca caactgggga aatatattct ttcccagtga ttataaacaa   6300

tctttttctt ttttttaagt ccttttggct tctagagctc ataggaaaat ggacttgatt   6360

tgaaattgga gccagagttt actcgtgttg gttatctatt catcagcttc ctgacatgtt   6420

aagagaatac attaaagaga aaatactgtt ttttaatcct aaaatttttc ttccactaag   6480

ataaaccaaa tgtccttaca tatatgtaaa cccatctatt taaacgcaaa ggtgggttga   6540
```

```
tgtcagttta catagcagaa agcattcact atcctctaag atttgtttct gcaaaacttt   6600

cattgcttta gaattttaaa atttcacctt gtacaatggc cagcccctaa agcaggaaac   6660

atttataatg gattatatgg aaacatcctc ccagtacttg cccagccctt gaatcatgtg   6720

gcttttcagt gaaaggaaag attctttttc taggaaaaat gagcctattt tattttattt   6780

tattttattt tttgacacaa actgtagatt ttagcagccc tggcccaaag gaatttgatt   6840

acttttgttt taaacagtac aaaggggaca ctataattac aaaaacatcc ttaactgatt   6900

tgagttgttt ttatttcttt ggatatattt tcagagtggt aaattgtgtg tgagaattac   6960

aaatgattat tcttttagtg gtttcttagc ctctcttaca gcccacgggg atagtactgt   7020

acatcaatac cttcatatga aatttttata tgcaatgaaa ataaaagcat gggttgattc   7080

tgcctattta tgactcaatc ttttacaaat aaaagattat tcattttaaa ttatagttca   7140

atcagcatgt ctcttaggat actgaacgtg gttgaaatga aaggatagtg acatcataag   7200

ttagtactga tattcataac caaataaagc caacttgagt aattttgcta cattaaaaat   7260

taccaaaatt acttagatgg cctataagat taagcatggt gttttctaag caagctttga   7320

aaggggcctt ccatacttac ttaattgaat attctgggat attgaaaatt attcagatac   7380

ttgacaatta tttttggtta cctactccgc aaactacaaa gttttaagga ctcaacaata   7440

agttaatgag acacagtgtt tgctttcatg gagcttacag tctggagggg acaaaggctt   7500

aaacaatact catataatta tatatgtgat cagtacaatg aaggagctca gtggggtaaa   7560

taagcaggaa cctgaacttg atctgttccg gagggccaca gaaggcttcc ttgaggcctt   7620

gagaaagtga tttgcatctg agttctgaag gattgtaaga ggtaactagg gaaaaagttg   7680

acaggaagag gaaggggatc cagacaagaa acatttgcaa agatcttgag gcataaatga   7740

gcttgagaca tctggagaaa ctgaggaaaa gtgagagagt aggcagggcc tggagccgca   7800

gagccattgc taaccatcct gtgtgagata tcccccattc tgtagcttta ttctcataac   7860

cctgctcaat tttctttata acacttctca cagatttata tacgtgtttg tttttgttat   7920

ctgtctctcc caccagacca cagctccatg agagcaaggt ctttgcttac caatatatca   7980

ctagcactta aaactatgcc tggtacacag taggttctta atatgtgttg aatatagcca   8040

tcaaattgat attggatata attcaatctg ataagatatt ttgagatatt aaagagtttt   8100

taacttgata ccataaaaaa aaaaaaaaaa                                    8130
```

```
<210> SEQ ID NO 20
<211> LENGTH: 748
<212> TYPE: PRT
<213> ORGANISM: Homo sapiens

<400> SEQUENCE: 20

Met Lys Arg Asn Thr Cys Asp Leu Leu Ser Arg Ser Lys Ser Ala Ser
1               5                   10                  15

Glu Glu Thr Leu His Ser Ser Asn Glu Glu Glu Asp Pro Phe Arg Gly
            20                  25                  30

Met Glu Pro Tyr Leu Val Arg Arg Leu Ser Cys Arg Asn Ile Gln Leu
        35                  40                  45

Pro Pro Leu Ala Phe Arg Gln Leu Glu Gln Ala Asp Leu Lys Ser Glu
    50                  55                  60

Ser Glu Asn Ile Gln Arg Pro Thr Ser Leu Pro Leu Lys Ile Leu Pro
65                  70                  75                  80

Leu Ile Ala Ile Thr Ser Ala Glu Ser Ser Gly Phe Asp Val Asp Asn
```

-continued

```
                85                  90                  95

Gly Thr Ser Ala Gly Arg Ser Pro Leu Asp Pro Met Thr Ser Pro Gly
            100                 105                 110

Ser Gly Leu Ile Leu Gln Ala Asn Phe Val His Ser Gln Arg Arg Glu
        115                 120                 125

Ser Phe Leu Tyr Arg Ser Asp Ser Asp Tyr Asp Leu Ser Pro Lys Ser
    130                 135                 140

Met Ser Arg Asn Ser Ser Ile Ala Ser Asp Ile His Gly Asp Asp Leu
145                 150                 155                 160

Ile Val Thr Pro Phe Ala Gln Val Leu Ala Ser Leu Arg Thr Val Arg
                165                 170                 175

Asn Asn Phe Ala Ala Leu Thr Asn Leu Gln Asp Arg Ala Pro Ser Lys
            180                 185                 190

Arg Ser Pro Met Cys Asn Gln Pro Ser Ile Asn Lys Ala Thr Ile Thr
        195                 200                 205

Glu Glu Ala Tyr Gln Lys Leu Ala Ser Glu Thr Leu Glu Glu Leu Asp
    210                 215                 220

Trp Cys Leu Asp Gln Leu Glu Thr Leu Gln Thr Arg His Ser Val Ser
225                 230                 235                 240

Glu Met Ala Ser Asn Lys Phe Lys Arg Met Leu Asn Arg Glu Leu Thr
                245                 250                 255

His Leu Ser Glu Met Ser Arg Ser Gly Asn Gln Val Ser Glu Phe Ile
            260                 265                 270

Ser Asn Thr Phe Leu Asp Lys Gln His Glu Val Glu Ile Pro Ser Pro
        275                 280                 285

Thr Gln Lys Glu Lys Glu Lys Lys Lys Arg Pro Met Ser Gln Ile Ser
    290                 295                 300

Gly Val Lys Lys Leu Met His Ser Ser Ser Leu Thr Asn Ser Ser Ile
305                 310                 315                 320

Pro Arg Phe Gly Val Lys Thr Glu Gln Glu Asp Val Leu Ala Lys Glu
                325                 330                 335

Leu Glu Asp Val Asn Lys Trp Gly Leu His Val Phe Arg Ile Ala Glu
            340                 345                 350

Leu Ser Gly Asn Arg Pro Leu Thr Val Ile Met His Thr Ile Phe Gln
        355                 360                 365

Glu Arg Asp Leu Leu Lys Thr Phe Lys Ile Pro Val Asp Thr Leu Ile
    370                 375                 380

Thr Tyr Leu Met Thr Leu Glu Asp His Tyr His Ala Asp Val Ala Tyr
385                 390                 395                 400

His Asn Asn Ile His Ala Ala Asp Val Val Gln Ser Thr His Val Leu
                405                 410                 415

Leu Ser Thr Pro Ala Leu Glu Ala Val Phe Thr Asp Leu Glu Ile Leu
            420                 425                 430

Ala Ala Ile Phe Ala Ser Ala Ile His Asp Val Asp His Pro Gly Val
        435                 440                 445

Ser Asn Gln Phe Leu Ile Asn Thr Asn Ser Glu Leu Ala Leu Met Tyr
    450                 455                 460

Asn Asp Ser Ser Val Leu Glu Asn His His Leu Ala Val Gly Phe Lys
465                 470                 475                 480

Leu Leu Gln Glu Glu Asn Cys Asp Ile Phe Gln Asn Leu Thr Lys Lys
                485                 490                 495

Gln Arg Gln Ser Leu Arg Lys Met Val Ile Asp Ile Val Leu Ala Thr
            500                 505                 510
```

Asp Met Ser Lys His Met Asn Leu Leu Ala Asp Leu Lys Thr Met Val
515 520 525

Glu Thr Lys Lys Val Thr Ser Ser Gly Val Leu Leu Leu Asp Asn Tyr
530 535 540

Ser Asp Arg Ile Gln Val Leu Gln Asn Met Val His Cys Ala Asp Leu
545 550 555 560

Ser Asn Pro Thr Lys Pro Leu Gln Leu Tyr Arg Gln Trp Thr Asp Arg
565 570 575

Ile Met Glu Glu Phe Phe Arg Gln Gly Asp Arg Glu Arg Glu Arg Gly
580 585 590

Met Glu Ile Ser Pro Met Cys Asp Lys His Asn Ala Ser Val Glu Lys
595 600 605

Ser Gln Val Gly Phe Ile Asp Tyr Ile Val His Pro Leu Trp Glu Thr
610 615 620

Trp Ala Asp Leu Val His Pro Asp Ala Gln Asp Ile Leu Asp Thr Leu
625 630 635 640

Glu Asp Asn Arg Glu Trp Tyr Gln Ser Thr Ile Pro Gln Ser Pro Ser
645 650 655

Pro Ala Pro Asp Asp Pro Glu Glu Gly Arg Gln Gly Gln Thr Glu Lys
660 665 670

Phe Gln Phe Glu Leu Thr Leu Glu Glu Asp Gly Glu Ser Asp Thr Glu
675 680 685

Lys Asp Ser Gly Ser Gln Val Glu Glu Asp Thr Ser Cys Ser Asp Ser
690 695 700

Lys Thr Leu Cys Thr Gln Asp Ser Glu Ser Thr Glu Ile Pro Leu Asp
705 710 715 720

Glu Gln Val Glu Glu Glu Ala Val Gly Glu Glu Glu Glu Ser Gln Pro
725 730 735

Glu Ala Cys Val Ile Asp Asp Arg Ser Pro Asp Thr
740 745

<210> SEQ ID NO 21
<211> LENGTH: 20
<212> TYPE: DNA
<213> ORGANISM: Artificial Sequence
<220> FEATURE:
<223> OTHER INFORMATION: PDE4D7_forward primer

<400> SEQUENCE: 21
gaacattcaa cgaccaacca 20

<210> SEQ ID NO 22
<211> LENGTH: 20
<212> TYPE: DNA
<213> ORGANISM: Artificial Sequence
<220> FEATURE:
<223> OTHER INFORMATION: PDE4D7_reverse primer

<400> SEQUENCE: 22
tgccattgtc cacatcaaaa 20

<210> SEQ ID NO 23
<211> LENGTH: 27
<212> TYPE: DNA
<213> ORGANISM: Artificial Sequence
<220> FEATURE:
<223> OTHER INFORMATION: PDE4D7 probe

<400> SEQUENCE: 23

```
ctgccgctga ttgctatcac ttctgca                                          27


<210> SEQ ID NO 24
<211> LENGTH: 22
<212> TYPE: DNA
<213> ORGANISM: Artificial Sequence
<220> FEATURE:
<223> OTHER INFORMATION: PDE4D7 Forward Primer 2

<400> SEQUENCE: 24

cgctgattgc tatcacttct gc                                               22


<210> SEQ ID NO 25
<211> LENGTH: 24
<212> TYPE: DNA
<213> ORGANISM: Artificial Sequence
<220> FEATURE:
<223> OTHER INFORMATION: PDE4D7 Reverse primer

<400> SEQUENCE: 25

gtcgttgact gtggacaaaa tttg                                             24


<210> SEQ ID NO 26
<211> LENGTH: 34
<212> TYPE: DNA
<213> ORGANISM: Artificial Sequence
<220> FEATURE:
<223> OTHER INFORMATION: PDE4D7 Probe 2

<400> SEQUENCE: 26

ttcccttgga tcccatgacc agcccataag ggaa                                  34


<210> SEQ ID NO 27
<211> LENGTH: 8130
<212> TYPE: DNA
<213> ORGANISM: Homo sapiens

<400> SEQUENCE: 27

agattatagc ccagcgtacg agaagcacga gtcctatagt tggcgtaccc tgaggcctgc      60

cagttcctgc cttaatgcat atgtagtcgt aattgagttc tgacacggcc ttggatgttt     120

ctgtcctaaa tagctgacat tgcatcttca agactgtcat tccagttggc ttttgagtgg     180

atacgtgcag tgagatcatt gacactggaa acactagttc ccattttaat tacttaaaac     240

accacgatga aaagaaatac ctgtgatttg ctttctcgga gcaaaagtgc ctctgaggaa     300

acactacatt ccagtaatga agaggaagac cctttccgcg gaatggaacc ctatcttgtc     360

cggagacttt catgtcgcaa tattcagctt ccccctctcg ccttcagaca gttggaacaa     420

gctgacttga aaagtgaatc agagaacatt caacgaccaa ccagcctccc cctgaagatt     480

ctgccgctga ttgctatcac ttctgcagaa tccagtggtt ttgatgtgga caatggcaca     540

tctgcgggac ggagtccctt ggatcccatg accagcccag gatccgggct aattctccaa     600

gcaaattttg tccacagtca acgacgggag tccttcctgt atcgatccga cagcgattat     660

gacctctctc caaagtctat gtcccggaac tcctccattg ccagtgatat acacggagat     720

gacttgattg tgactccatt tgctcaggtc ttggccagtc tgcgaactgt acgaaacaac     780

tttgctgcat taactaattt gcaagatcga gcacctagca aaagatcacc catgtgcaac     840

caaccatcca tcaacaaagc caccataaca gaggaggcct accagaaact ggccagcgag     900

accctggagg agctggactg gtgtctggac cagctagaga ccctacagac caggcactcc     960
```

```
gtcagtgaga tggcctccaa caagtttaaa aggatgctta atcgggagct cacccatctc   1020
tctgaaatga gtcggtctgg aaatcaagtg tcagagttta tatcaaacac attcttagat   1080
aagcaacatg aagtggaaat tccttctcca actcagaagg aaaaggagaa aaagaaaaga   1140
ccaatgtctc agatcagtgg agtcaagaaa ttgatgcaca gctctagtct gactaattca   1200
agtatcccaa ggtttggagt taaaactgaa caagaagatg tccttgccaa ggaactagaa   1260
gatgtgaaca aatggggtct tcatgttttc agaatagcag agttgtctgg taaccggccc   1320
ttgactgtta tcatgcacac catttttcag gaacgggatt tattaaaaac atttaaaatt   1380
ccagtagata ctttaattac atatcttatg actctcgaag accattacca tgctgatgtg   1440
gcctatcaca acaatatcca tgctgcagat gttgtccagt ctactcatgt gctattatct   1500
acacctgctt tggaggctgt gtttacagat ttggagattc ttgcagcaat tttgccagt    1560
gcaatacatg atgtagatca tcctggtgtg tccaatcaat ttctgatcaa tacaaactct   1620
gaacttgcct tgatgtacaa tgattcctca gtcttagaga accatcattt ggctgtgggc   1680
tttaaattgc ttcaggaaga aaactgtgac attttccaga atttgaccaa aaaacaaaga   1740
caatctttaa ggaaaatggt cattgacatc gtacttgcaa cagatatgtc aaaacacatg   1800
aatctactgg ctgatttgaa gactatggtt gaaactaaga aagtgacaag ctctggagtt   1860
cttcttcttg ataattattc cgataggatt caggttcttc agaatatggt gcactgtgca   1920
gatctgagca acccaacaaa gcctctccag ctgtaccgcc agtggacgga ccggataatg   1980
gaggagttct tccgccaagg agaccgagag agggaacgtg gcatggagat aagccccatg   2040
tgtgacaagc acaatgcttc cgtggaaaaa tcacaggtgg gcttcataga ctatattgtt   2100
catcccctct gggagacatg gcagacctc gtccaccctg acgcccagga tatttggac    2160
actttggagg acaatcgtga atggtaccag agcacaatcc ctcagagccc ctctcctgca   2220
cctgatgacc cagaggaggg ccggcagggt caaactgaga aattccagtt tgaactaact   2280
ttagaggaag atggtgagtc agacacggaa aaggacagtg gcagtcaagt ggaagaagac   2340
actagctgca gtgactccaa gactctttgt actcaagact cagagtctac tgaaattccc   2400
cttgatgaac aggttgaaga ggaggcagta ggggaagaag aggaaagcca gcctgaagcc   2460
tgtgtcatag atgatcgttc tcctgacacg taacagtgca aaaactttca tgcctttttt   2520
tttttaagt agaaaaattg tttccaaagt gcatgtcaca tgccacaacc acggtcacac    2580
ctcactgtca tctgccagga cgtttgttga acaaaactga ccttgactac tcagtccagc   2640
gctcaggaat atcgtaacca gtttttcac ctccatgtca tccgagcaag gtggacatct    2700
tcacgaacag cgtttttaac aagatttcag cttggtagag ctgacaaagc agataaaatc   2760
tactccaaat tattttcaag agagtgtgac tcatcaggca gcccaaaagt ttattggact   2820
tggggtttct attcctttt atttgtttgc aatattttca gaagaaaggc attgcacaga    2880
gtgaacttaa tggacgaagc aacaaatatg tcaagaacag gacatagcac gaatctgtta   2940
ccagtaggag gaggatgagc cacagaaatt gcataatttt ctaatttcaa gtcttcctga   3000
tacatgactg aatagtgtgg ttcagtgagc tgcactgacc tctacatttt gtatgatatg   3060
taaaacagat tttttgtaga gcttactttt attattaaat gtattgaggt attatattta   3120
aaaaaaacta tgttcagaac ttcatctgcc actggttatt tttttctaag gagtaacttg   3180
caagttttca gtacaaatct gtgctacact ggataaaaat ctaatttatg aattttactt   3240
gcaccttata gttcatagca attaactgat ttgtagtgat tcattgtttg ttttatatac   3300
caatgacttc catattttaa aagagaaaaa caactttatg ttgcaggaaa ccctttttgt   3360
```

```
aagtctttat tatttacttt gcattttgtt tcactctttc cagataagca gagttgctct   3420
tcaccagtgt ttttcttcat gtgcaaagtg actatttgtt ctataatact tttatgtgtg   3480
ttatatcaaa tgtgtcttaa gcttcatgca aactcagtca tcagttcgtg ttgtctgaag   3540
caagtgggag atatataaat acccagtagc taaaatggtc agtctttttt agatgttttc   3600
ctacttagta tctcctaata acgttttgct gtgtcactag atgttcattt cacaagtgca   3660
tgtctttcta ataatccaca catttcatgc tctaataatc cacacatttc atgctcattt   3720
ttattgtttt tacagccagt tatagtaaga aaaaggtttt tccccttgtg ctgctttata   3780
atttagcgtg tgtctgaacc ttatccatgt ttgctagatg aggtcttgtc aaatatatca   3840
ctaccattgt caccggtgaa aagaaacagg tagttaagtt agggttaaca ttcatttcaa   3900
ccacgaggtt gtatatcatg actagctttt actcttggtt tacagagaaa agttaaacag   3960
ccaactaggc agtttttaag aatattaaca atatattaac aaacaccaat acaactaatc   4020
ctatttggtt ttaatgattt caccatggga ttaagaacta tatcaggaac atccctgaga   4080
aacggtttta agtgtagcaa ctactcttcc ttaatggaca gccacataac gtgtaggaag   4140
tcctttatca cttatcctcg atccataagc atatcttgca gaggggaact acttctttaa   4200
acacatggag ggaaagaaga tgatgccact ggcaccagag ggttagtact gtgatgcatc   4260
ctaaaatatt tattatattg gtaaaaattc tggttaaata aaaaattaga gatcactctt   4320
ggctgatttc agcaccagga actgtattac agttttagag attaattcct agtgtttacc   4380
tgattatagc agttggcatc atggggcatt taattctgac tttatcccca cgtcagcctt   4440
aataaagtct tctttacctt ctctatgaag actttaaagc ccaaataatc atttttcaca   4500
ttgatattca agaattgaga tagatagaag ccaaagtggg tatctgacaa gtggaaaatc   4560
aaacgtttaa gaagaattac aactctgaaa agcatttata tgtggaactt ctcaaggagc   4620
ctcctgggga ctggaaagta agtcatcagc caggcaaatg actcatgctg aagagagtcc   4680
ccatttcagt cccctgagat ctagctgatg cttagatcct ttgaaataaa aattatgtct   4740
ttataactct gatcttttac ataaagcaga agaggaatca actagttaat tgcaaggttt   4800
ctactctgtt tcctctgtaa agatcagatg gtaatctttc aaataagaaa aaaataaaga   4860
cgtatgtttg accaagtagt ttcacaagaa tatttgggaa cttgtttctt ttaattttat   4920
ttgtccctga gtgaagtcta gaaagaaagg taaagagtct agagtttatt cctctttcca   4980
aaacattctc attcctctcc tccctacact tagtatttcc cccacagagt gcctagaatc   5040
ttaataatga ataaaataaa aagcagcaat atgtcattaa caaatccaga cctgaaaggg   5100
taaagggttt ataactgcac taataaagag aggctctttt tttttcttcc agtttgttgg   5160
tttttaatgg taccgtgttg taaagatacc cactaatgga caatcaaatt gcagaaaagg   5220
ctcaatatcc aagagacagg gactaatgca ctgtacaatc tgcttatcct tgcccttctc   5280
tcttgccaaa gtgtgcttca gaaatatata ctgctttaaa aaagaataaa agaatatcct   5340
tttacaagtg gctttacatt tcctaaaatg ccataagaaa atgcaatatc tgggtactgt   5400
atggggaaaa aaatgtccaa gtttgtgtaa aaccagtgca tttcagcttg caagttactg   5460
aacacaataa tgctgtttta attttgtttt atatcagtta aaattcacaa taatgtagat   5520
agaacaaatt acagacaagg aaagaaaaaa cttgaatgaa atggatttta cagaaagctt   5580
tatgataatt tttgaatgca ttatttattt tttgtgccat gcattttttt tctcaccaaa   5640
tgaccttacc tgtaatacag tcttgtttgt ctgtttacaa ccatgtattt attgcaatgt   5700
```

```
acatactgta atgttaattg taaattatct gttcttatta aaacatcatc ccatgatggg   5760
atggtgttga tatatttgga aactcttggt gagagaatga atggtgtgta tacatactct   5820
gtacattttt cttttctcct gtaatatagt cttgtcacct tagagcttgt ttatggaaga   5880
ttcaagaaaa ctataaaata cttaaagata tataaattta aaaaaacata gctgcaggtc   5940
tttggtccca gggctgtgcc ttaactttaa ccaatatttt cttctgtttt gctgcatttg   6000
aaaggtaaca gtggagctag ggctgggcat tttacatcca ggcttttaat tgattagaat   6060
tctgccaata ggtggatttt acaaaaccac agacaacctc tgaaagattc tgagacccctt   6120
ttgagacaga agctcttaag tacttcttgc cagggagcag cactgcatgt gtgatggttg   6180
tttgccatct gttgatcagg aactacttca gctacttgca tttgattatt tccttttttt   6240
ttttttttaa ctcggaaaca caactgggga aatatattct ttcccagtga ttataaacaa   6300
tctttttctt ttttttaagt ccttttggct tctagagctc ataggaaaat ggacttgatt   6360
tgaaattgga gccagagttt actcgtgttg gttatctatt catcagcttc ctgacatgtt   6420
aagagaatac attaaagaga aaatactgtt ttttaatcct aaaatttttc ttccactaag   6480
ataaaccaaa tgtccttaca tatatgtaaa cccatctatt taaacgcaaa ggtgggttga   6540
tgtcagttta catagcagaa agcattcact atcctctaag atttgtttct gcaaaacttt   6600
cattgcttta gaattttaaa atttcacctt gtacaatggc cagcccctaa agcaggaaac   6660
atttataatg gattatatgg aaacatcctc ccagtacttg cccagccctt gaatcatgtg   6720
gcttttcagt gaaaggaaag attctttttc taggaaaaat gagcctattt tattttattt   6780
tattttattt tttgacacaa actgtagatt ttagcagccc tggcccaaag gaatttgatt   6840
acttttgttt taaacagtac aaaggggaca ctataattac aaaaacatcc ttaactgatt   6900
tgagttgttt ttatttcttt ggatatattt tcagagtggt aaattgtgtg tgagaattac   6960
aaatgattat tcttttagtg gtttcttagc ctctcttaca gcccacgggg atagtactgt   7020
acatcaatac cttcatatga aatttttata tgcaatgaaa ataaaagcat gggttgattc   7080
tgcctattta tgactcaatc ttttacaaat aaaagattat tcattttaaa ttatagttca   7140
atcagcatgt ctcttaggat actgaacgtg gttgaaatga aaggatagtg acatcataag   7200
ttagtactga tattcataac caaataaagc caacttgagt aattttgcta cattaaaaat   7260
taccaaaatt acttagatgg cctataagat taagcatggt gttttctaag caagctttga   7320
aaggggcctt ccatacttac ttaattgaat attctgggat attgaaaatt attcagatac   7380
ttgacaatta tttttggtta cctactccgc aaactacaaa gttttaagga ctcaacaata   7440
agttaatgag acacagtgtt tgctttcatg gagcttacag tctggagggg acaaaggctt   7500
aaacaatact catataatta tatatgtgat cagtacaatg aaggagctca gtggggtaaa   7560
taagcaggaa cctgaacttg atctgttccg gagggccaca gaaggcttcc ttgaggcctt   7620
gagaaagtga tttgcatctg agttctgaag gattgtaaga ggtaactagg gaaaaagttg   7680
acaggaagag gaaggggatc cagacaagaa acatttgcaa agatcttgag gcataaatga   7740
gcttgagaca tctggagaaa ctgaggaaaa gtgagagagt aggcagggcc tggagccgca   7800
gagccattgc taaccatcct gtgtgagata tcccccattc tgtagcttta ttctcataac   7860
cctgctcaat tttctttata acacttctca cagatttata tacgtgtttg tttttgttat   7920
ctgtctctcc caccagacca cagctccatg agagcaaggt ctttgcttac caatatatca   7980
ctagcactta aaactatgcc tggtacacag taggttctta atatgtgttg aatatagcca   8040
tcaaattgat attggatata attcaatctg ataagatatt ttgagatatt aaagagtttt   8100
```

```
taactttgata ccataaaaaa aaaaaaaaaa                                    8130

<210> SEQ ID NO 28
<211> LENGTH: 687
<212> TYPE: PRT
<213> ORGANISM: Homo sapiens

<400> SEQUENCE: 28

Met Ala Phe Val Trp Asp Pro Leu Gly Ala Thr Val Pro Gly Pro Ser
1               5                   10                  15

Thr Arg Ala Lys Ser Arg Leu Arg Phe Ser Lys Ser Tyr Ser Phe Asp
            20                  25                  30

Val Asp Asn Gly Thr Ser Ala Gly Arg Ser Pro Leu Asp Pro Met Thr
        35                  40                  45

Ser Pro Gly Ser Gly Leu Ile Leu Gln Ala Asn Phe Val His Ser Gln
    50                  55                  60

Arg Arg Glu Ser Phe Leu Tyr Arg Ser Asp Ser Asp Tyr Asp Leu Ser
65                  70                  75                  80

Pro Lys Ser Met Ser Arg Asn Ser Ser Ile Ala Ser Asp Ile His Gly
                85                  90                  95

Asp Asp Leu Ile Val Thr Pro Phe Ala Gln Val Leu Ala Ser Leu Arg
            100                 105                 110

Thr Val Arg Asn Asn Phe Ala Ala Leu Thr Asn Leu Gln Asp Arg Ala
        115                 120                 125

Pro Ser Lys Arg Ser Pro Met Cys Asn Gln Pro Ser Ile Asn Lys Ala
    130                 135                 140

Thr Ile Thr Glu Glu Ala Tyr Gln Lys Leu Ala Ser Glu Thr Leu Glu
145                 150                 155                 160

Glu Leu Asp Trp Cys Leu Asp Gln Leu Glu Thr Leu Gln Thr Arg His
                165                 170                 175

Ser Val Ser Glu Met Ala Ser Asn Lys Phe Lys Arg Met Leu Asn Arg
            180                 185                 190

Glu Leu Thr His Leu Ser Glu Met Ser Arg Ser Gly Asn Gln Val Ser
        195                 200                 205

Glu Phe Ile Ser Asn Thr Phe Leu Asp Lys Gln His Glu Val Glu Ile
    210                 215                 220

Pro Ser Pro Thr Gln Lys Glu Lys Glu Lys Lys Lys Arg Pro Met Ser
225                 230                 235                 240

Gln Ile Ser Gly Val Lys Lys Leu Met His Ser Ser Ser Leu Thr Asn
                245                 250                 255

Ser Ser Ile Pro Arg Phe Gly Val Lys Thr Glu Gln Glu Asp Val Leu
            260                 265                 270

Ala Lys Glu Leu Glu Asp Val Asn Lys Trp Gly Leu His Val Phe Arg
        275                 280                 285

Ile Ala Glu Leu Ser Gly Asn Arg Pro Leu Thr Val Ile Met His Thr
    290                 295                 300

Ile Phe Gln Glu Arg Asp Leu Leu Lys Thr Phe Lys Ile Pro Val Asp
305                 310                 315                 320

Thr Leu Ile Thr Tyr Leu Met Thr Leu Glu Asp His Tyr His Ala Asp
                325                 330                 335

Val Ala Tyr His Asn Asn Ile His Ala Ala Asp Val Val Gln Ser Thr
            340                 345                 350

His Val Leu Leu Ser Thr Pro Ala Leu Glu Ala Val Phe Thr Asp Leu
        355                 360                 365
```

```
Glu Ile Leu Ala Ala Ile Phe Ala Ser Ala Ile His Asp Val Asp His
    370                 375                 380

Pro Gly Val Ser Asn Gln Phe Leu Ile Asn Thr Asn Ser Glu Leu Ala
385                 390                 395                 400

Leu Met Tyr Asn Asp Ser Ser Val Leu Glu Asn His His Leu Ala Val
                405                 410                 415

Gly Phe Lys Leu Leu Gln Glu Glu Asn Cys Asp Ile Phe Gln Asn Leu
            420                 425                 430

Thr Lys Lys Gln Arg Gln Ser Leu Arg Lys Met Val Ile Asp Ile Val
        435                 440                 445

Leu Ala Thr Asp Met Ser Lys His Met Asn Leu Leu Ala Asp Leu Lys
    450                 455                 460

Thr Met Val Glu Thr Lys Lys Val Thr Ser Ser Gly Val Leu Leu Leu
465                 470                 475                 480

Asp Asn Tyr Ser Asp Arg Ile Gln Val Leu Gln Asn Met Val His Cys
                485                 490                 495

Ala Asp Leu Ser Asn Pro Thr Lys Pro Leu Gln Leu Tyr Arg Gln Trp
            500                 505                 510

Thr Asp Arg Ile Met Glu Glu Phe Phe Arg Gln Gly Asp Arg Glu Arg
        515                 520                 525

Glu Arg Gly Met Glu Ile Ser Pro Met Cys Asp Lys His Asn Ala Ser
    530                 535                 540

Val Glu Lys Ser Gln Val Gly Phe Ile Asp Tyr Ile Val His Pro Leu
545                 550                 555                 560

Trp Glu Thr Trp Ala Asp Leu Val His Pro Asp Ala Gln Asp Ile Leu
                565                 570                 575

Asp Thr Leu Glu Asp Asn Arg Glu Trp Tyr Gln Ser Thr Ile Pro Gln
            580                 585                 590

Ser Pro Ser Pro Ala Pro Asp Asp Pro Glu Glu Gly Arg Gln Gly Gln
        595                 600                 605

Thr Glu Lys Phe Gln Phe Glu Leu Thr Leu Glu Glu Asp Gly Glu Ser
    610                 615                 620

Asp Thr Glu Lys Asp Ser Gly Ser Gln Val Glu Glu Asp Thr Ser Cys
625                 630                 635                 640

Ser Asp Ser Lys Thr Leu Cys Thr Gln Asp Ser Glu Ser Thr Glu Ile
                645                 650                 655

Pro Leu Asp Glu Gln Val Glu Glu Glu Ala Val Gly Glu Glu Glu Glu
            660                 665                 670

Ser Gln Pro Glu Ala Cys Val Ile Asp Asp Arg Ser Pro Asp Thr
        675                 680                 685
```

<210> SEQ ID NO 29
<211> LENGTH: 8395
<212> TYPE: DNA
<213> ORGANISM: Homo sapiens

<400> SEQUENCE: 29

```
ttctcactgc cctgcggtgt tttgaactgc cttcttacag acgtcataca gcccttgagg      60

aatagtttct gcctggtgag attgaatgat agttctcatt cacaaaaccc tggattctaa     120

gcagggacac acagaaatta ctttcgcagg taaatcagcc cacccagcca aagtgtggag     180

agatttgttc cttggctgac ttctttgctc cacggagagg agtgttttcc tgtgcttgcc     240

ctgaaatgga acttccttga cagctctccc gtgttacagt acctcccggt cattttcttt     300
```

```
ttctctctct ctacctgcgc tcttcgagtg tcagaaacct ttaaagctgt tactatggaa    360
ttgcaaaaaa gagatcaagt gactctttca ctatgctggt ttcccttgtg acccagatga    420
agaatcaatt cagaattcag ttcctccctt ggcattgcaa gacacagaag aaactgtcac    480
ttcctaacag cctagtactg gagtaaattc agtatgaagg aagaaagcgc tcctgcgtgt    540
tagaaccttg cccatgagct ggaccgagga caggagatgg actccaggaa aattggattt    600
cttcaagcag cctcccttgg aaatggaata tctttaaaat cttctttgca gaaagacagt    660
tagaatgtat taatcagaat agttgaagac ttattttcct ttttattttt tttcaaaatg    720
agcattatta tgaagccaag atcccgatct acaagttccc taaggactgc agaggcagtt    780
tgttttgatg tggacaatgg cacatctgcg ggacggagtc ccttggatcc catgaccagc    840
ccaggatccg ggctaattct ccaagcaaat tttgtccaca gtcaacgacg ggagtccttc    900
ctgtatcgat ccgacagcga ttatgacctc tctccaaagt ctatgtcccg gaactcctcc    960
attgccagtg atatacacgg agatgacttg attgtgactc catttgctca ggtcttggcc   1020
agtctgcgaa ctgtacgaaa caactttgct gcattaacta atttgcaaga tcgagcacct   1080
agcaaaagat cacccatgtg caaccaacca tccatcaaca aagccaccat aacagaggag   1140
gcctaccaga aactggccag cgagaccctg gaggagctgg actggtgtct ggaccagcta   1200
gagaccctac agaccaggca ctccgtcagt gagatggcct ccaacaagtt taaaaggatg   1260
cttaatcggg agctcaccca tctctctgaa atgagtcggt ctggaaatca agtgtcagag   1320
tttatatcaa acacattctt agataagcaa catgaagtgg aaattccttc tccaactcag   1380
aaggaaaagg agaaaaagaa aagaccaatg tctcagatca gtggagtcaa gaaattgatg   1440
cacagctcta gtctgactaa ttcaagtatc ccaaggtttg gagttaaaac tgaacaagaa   1500
gatgtccttg ccaaggaact agaagatgtg aacaaatggg gtcttcatgt tttcagaata   1560
gcagagttgt ctggtaaccg gcccttgact gttatcatgc acaccatttt tcaggaacgg   1620
gatttattaa aaacatttaa aattccagta gatactttaa ttacatatct tatgactctc   1680
gaagaccatt accatgctga tgtggcctat cacaacaata tccatgctgc agatgttgtc   1740
cagtctactc atgtgctatt atctacacct gctttggagg ctgtgtttac agatttggag   1800
attcttgcag caatttttgc cagtgcaata catgatgtag atcatcctgg tgtgtccaat   1860
caatttctga tcaatacaaa ctctgaactt gccttgatgt acaatgattc ctcagtctta   1920
gagaaccatc atttggctgt gggctttaaa ttgcttcagg aagaaaactg tgacattttc   1980
cagaatttga ccaaaaaaca aagacaatct ttaaggaaaa tggtcattga catcgtactt   2040
gcaacagata tgtcaaaaca catgaatcta ctggctgatt tgaagactat ggttgaaact   2100
aagaaagtga caagctctgg agttcttctt cttgataatt attccgatag gattcaggtt   2160
cttcagaata tggtgcactg tgcagatctg agcaacccaa caaagcctct ccagctgtac   2220
cgccagtgga cggaccggat aatggaggag ttcttccgcc aaggagaccg agagagggaa   2280
cgtggcatgg agataagccc catgtgtgac aagcacaatg cttccgtgga aaaatcacag   2340
gtgggcttca tagactatat tgttcatccc ctctgggaga catgggcaga cctcgtccac   2400
cctgacgccc aggatatttt ggacactttg gaggacaatc gtgaatggta ccagagcaca   2460
atccctcaga gcccctctcc tgcacctgat gacccagagg agggccggca gggtcaaact   2520
gagaaattcc agtttgaact aactttagag gaagatggtg agtcagacac ggaaaaggac   2580
agtggcagtc aagtggaaga agacactagc tgcagtgact ccaagactct ttgtactcaa   2640
gactcagagt ctactgaaat tccccttgat gaacaggttg aagaggaggc agtaggggaa   2700
```

```
gaagaggaaa gccagcctga agcctgtgtc atagatgatc gttctcctga cacgtaacag   2760
tgcaaaaact ttcatgcctt tttttttttt aagtagaaaa attgtttcca aagtgcatgt   2820
cacatgccac aaccacggtc acacctcact gtcatctgcc aggacgtttg ttgaacaaaa   2880
ctgaccttga ctactcagtc cagcgctcag gaatatcgta accagttttt tcacctccat   2940
gtcatccgag caaggtggac atcttcacga acagcgtttt taacaagatt tcagcttggt   3000
agagctgaca aagcagataa aatctactcc aaattatttt caagagagtg tgactcatca   3060
ggcagcccaa aagtttattg gacttggggt ttctattcct ttttatttgt ttgcaatatt   3120
ttcagaagaa aggcattgca cagagtgaac ttaatggacg aagcaacaaa tatgtcaaga   3180
acaggacata gcacgaatct gttaccagta ggaggaggat gagccacaga aattgcataa   3240
ttttctaatt tcaagtcttc ctgatacatg actgaatagt gtggttcagt gagctgcact   3300
gacctctaca ttttgtatga tatgtaaaac agattttttg tagagcttac ttttattatt   3360
aaatgtattg aggtattata tttaaaaaaa actatgttca gaacttcatc tgccactggt   3420
tatttttttc taaggagtaa cttgcaagtt ttcagtacaa atctgtgcta cactggataa   3480
aaatctaatt tatgaatttt acttgcacct tatagttcat agcaattaac tgatttgtag   3540
tgattcattg tttgttttat ataccaatga cttccatatt ttaaaagaga aaaacaactt   3600
tatgttgcag gaaacccttt ttgtaagtct ttattattta ctttgcattt tgtttcactc   3660
tttccagata agcagagttg ctcttcacca gtgtttttct tcatgtgcaa agtgactatt   3720
tgttctataa tacttttatg tgtgttatat caaatgtgtc ttaagcttca tgcaaactca   3780
gtcatcagtt cgtgttgtct gaagcaagtg ggagatatat aaatacccag tagctaaaat   3840
ggtcagtctt ttttagatgt tttcctactt agtatctcct aataacgttt tgctgtgtca   3900
ctagatgttc atttcacaag tgcatgtctt tctaataatc cacacatttc atgctctaat   3960
aatccacaca tttcatgctc atttttattg tttttacagc cagttatagt aagaaaaagg   4020
tttttcccct tgtgctgctt tataatttag cgtgtgtctg aaccttatcc atgtttgcta   4080
gatgaggtct tgtcaaatat atcactacca ttgtcaccgg tgaaaagaaa caggtagtta   4140
agttagggtt aacattcatt tcaaccacga ggttgtatat catgactagc ttttactctt   4200
ggtttacaga gaaaagttaa acagccaact aggcagtttt taagaatatt aacaatatat   4260
taacaaacac caatacaact aatcctattt ggttttaatg atttcaccat gggattaaga   4320
actatatcag gaacatccct gagaaacggt tttaagtgta gcaactactc ttccttaatg   4380
gacagccaca taacgtgtag gaagtccttt atcacttatc ctcgatccat aagcatatct   4440
tgcagagggg aactacttct ttaaacacat ggagggaaag aagatgatgc cactggcacc   4500
agagggttag tactgtgatg catcctaaaa tatttattat attggtaaaa attctggtta   4560
aataaaaaat tagagatcac tcttggctga tttcagcacc aggaactgta ttacagtttt   4620
agagattaat tcctagtgtt tacctgatta tagcagttgg catcatgggg catttaattc   4680
tgactttatc cccacgtcag ccttaataaa gtcttcttta ccttctctat gaagacttta   4740
aagcccaaat aatcattttt cacattgata ttcaagaatt gagatagata gaagccaaag   4800
tgggtatctg acaagtggaa aatcaaacgt ttaagaagaa ttacaactct gaaaagcatt   4860
tatatgtgga acttctcaag gagcctcctg gggactggaa agtaagtcat cagccaggca   4920
aatgactcat gctgaagaga gtccccattt cagtcccctg agatctagct gatgcttaga   4980
tcctttgaaa taaaaattat gtctttataa ctctgatctt ttacataaag cagaagagga   5040
```

```
atcaactagt taattgcaag gtttctactc tgtttcctct gtaaagatca gatggtaatc   5100
tttcaaataa gaaaaaaata aagacgtatg tttgaccaag tagtttcaca agaatatttg   5160
ggaacttgtt tcttttaatt ttatttgtcc ctgagtgaag tctagaaaga aaggtaaaga   5220
gtctagagtt tattcctctt tccaaaacat tctcattcct ctcctcccta cacttagtat   5280
ttcccccaca gagtgcctag aatcttaata atgaataaaa taaaaagcag caatatgtca   5340
ttaacaaatc cagacctgaa agggtaaagg gtttataact gcactaataa agagaggctc   5400
tttttttttc ttccagtttg ttggttttta atggtaccgt gttgtaaaga tacccactaa   5460
tggacaatca aattgcagaa aaggctcaat atccaagaga cagggactaa tgcactgtac   5520
aatctgctta tccttgccct tctctcttgc caaagtgtgc ttcagaaata tatactgctt   5580
taaaaaagaa taaaagaata tccttttaca agtggcttta catttcctaa aatgccataa   5640
gaaaatgcaa tatctgggta ctgtatgggg aaaaaaatgt ccaagtttgt gtaaaaccag   5700
tgcatttcag cttgcaagtt actgaacaca ataatgctgt tttaattttg ttttatatca   5760
gttaaaattc acaataatgt agatagaaca aattacagac aaggaaagaa aaaacttgaa   5820
tgaaatggat tttacagaaa gctttatgat aatttttgaa tgcattattt attttttgtg   5880
ccatgcattt tttttctcac caaatgacct tacctgtaat acagtcttgt ttgtctgttt   5940
acaaccatgt atttattgca atgtacatac tgtaatgtta attgtaaatt atctgttctt   6000
attaaaacat catcccatga tgggatggtg ttgatatatt tggaaactct tggtgagaga   6060
atgaatggtg tgtatacata ctctgtacat ttttcttttc tcctgtaata tagtcttgtc   6120
accttagagc ttgtttatgg aagattcaag aaaactataa aatacttaaa gatatataaa   6180
tttaaaaaaa catagctgca ggtctttggt cccagggctg tgccttaact ttaaccaata   6240
ttttcttctg ttttgctgca tttgaaaggt aacagtggag ctagggctgg gcattttaca   6300
tccaggcttt taattgatta gaattctgcc aataggtgga ttttacaaaa ccacagacaa   6360
cctctgaaag attctgagac ccttttgaga cagaagctct taagtacttc ttgccaggga   6420
gcagcactgc atgtgtgatg gttgtttgcc atctgttgat caggaactac ttcagctact   6480
tgcatttgat tatttccttt tttttttttt ttaactcgga aacacaactg gggaaatata   6540
ttctttccca gtgattataa acaatctttt tctttttttt aagtcctttt ggcttctaga   6600
gctcatagga aaatggactt gatttgaaat tggagccaga gtttactcgt gttggttatc   6660
tattcatcag cttcctgaca tgttaagaga atacattaaa gagaaaatac tgttttttaa   6720
tcctaaaatt tttcttccac taagataaac caaatgtcct tacatatatg taaacccatc   6780
tatttaaacg caaaggtggg ttgatgtcag tttacatagc agaaagcatt cactatcctc   6840
taagatttgt ttctgcaaaa ctttcattgc tttagaattt taaaatttca ccttgtacaa   6900
tggccagccc ctaaagcagg aaacatttat aatggattat atggaaacat cctcccagta   6960
cttgcccagc ccttgaatca tgtggctttt cagtgaaagg aaagattctt tttctaggaa   7020
aaatgagcct attttatttt attttatttt atttttgac acaaactgta gattttagca   7080
gccctggccc aaaggaattt gattactttt gttttaaaca gtacaaaggg gacactataa   7140
ttacaaaaac atccttaact gatttgagtt gtttttattt ctttggatat attttcagag   7200
tggtaaattg tgtgtgagaa ttacaaatga ttattctttt agtggtttct tagcctctct   7260
tacagcccac ggggatagta ctgtacatca ataccttcat atgaaatttt tatatgcaat   7320
gaaaataaaa gcatgggttg attctgccta tttatgactc aatcttttac aaataaaaga   7380
ttattcattt taaattatag ttcaatcagc atgtctctta ggatactgaa cgtggttgaa   7440
```

```
atgaaaggat agtgacatca taagttagta ctgatattca taaccaaata aagccaactt   7500

gagtaatttt gctacattaa aaattaccaa aattacttag atggcctata agattaagca   7560

tggtgttttc taagcaagct ttgaaagggg ccttccatac ttacttaatt gaatattctg   7620

ggatattgaa aattattcag atacttgaca attatttttg gttacctact ccgcaaacta   7680

caaagtttta aggactcaac aataagttaa tgagacacag tgtttgcttt catggagctt   7740

acagtctgga ggggacaaag gcttaaacaa tactcatata attatatatg tgatcagtac   7800

aatgaaggag ctcagtgggg taaataagca ggaacctgaa cttgatctgt tccggagggc   7860

cacagaaggc ttccttgagg ccttgagaaa gtgatttgca tctgagttct gaaggattgt   7920

aagaggtaac tagggaaaaa gttgacagga agaggaaggg gatccagaca agaaacattt   7980

gcaaagatct tgaggcataa atgagcttga gacatctgga gaaactgagg aaaagtgaga   8040

gagtaggcag ggcctggagc cgcagagcca ttgctaacca tcctgtgtga gatatccccc   8100

attctgtagc tttattctca taaccctgct caattttctt tataacactt ctcacagatt   8160

tatatacgtg tttgtttttg ttatctgtct ctcccaccag accacagctc catgagagca   8220

aggtctttgc ttaccaatat atcactagca cttaaaacta tgcctggtac acagtaggtt   8280

cttaatatgt gttgaatata gccatcaaat tgatattgga tataattcaa tctgataaga   8340

tattttgaga tattaaagag tttttaactt gataccataa aaaaaaaaaa aaaaa        8395
```

```
<210> SEQ ID NO 30
<211> LENGTH: 679
<212> TYPE: PRT
<213> ORGANISM: Homo sapiens

<400> SEQUENCE: 30

Met Ser Ile Ile Met Lys Pro Arg Ser Arg Ser Thr Ser Ser Leu Arg
1               5                   10                  15

Thr Ala Glu Ala Val Cys Phe Asp Val Asp Asn Gly Thr Ser Ala Gly
            20                  25                  30

Arg Ser Pro Leu Asp Pro Met Thr Ser Pro Gly Ser Gly Leu Ile Leu
        35                  40                  45

Gln Ala Asn Phe Val His Ser Gln Arg Arg Glu Ser Phe Leu Tyr Arg
    50                  55                  60

Ser Asp Ser Asp Tyr Asp Leu Ser Pro Lys Ser Met Ser Arg Asn Ser
65                  70                  75                  80

Ser Ile Ala Ser Asp Ile His Gly Asp Asp Leu Ile Val Thr Pro Phe
                85                  90                  95

Ala Gln Val Leu Ala Ser Leu Arg Thr Val Arg Asn Asn Phe Ala Ala
            100                 105                 110

Leu Thr Asn Leu Gln Asp Arg Ala Pro Ser Lys Arg Ser Pro Met Cys
        115                 120                 125

Asn Gln Pro Ser Ile Asn Lys Ala Thr Ile Thr Glu Glu Ala Tyr Gln
    130                 135                 140

Lys Leu Ala Ser Glu Thr Leu Glu Glu Leu Asp Trp Cys Leu Asp Gln
145                 150                 155                 160

Leu Glu Thr Leu Gln Thr Arg His Ser Val Ser Glu Met Ala Ser Asn
                165                 170                 175

Lys Phe Lys Arg Met Leu Asn Arg Glu Leu Thr His Leu Ser Glu Met
            180                 185                 190

Ser Arg Ser Gly Asn Gln Val Ser Glu Phe Ile Ser Asn Thr Phe Leu
        195                 200                 205
```

```
Asp Lys Gln His Glu Val Glu Ile Pro Ser Pro Thr Gln Lys Glu Lys
    210                 215                 220

Glu Lys Lys Lys Arg Pro Met Ser Gln Ile Ser Gly Val Lys Lys Leu
225                 230                 235                 240

Met His Ser Ser Ser Leu Thr Asn Ser Ser Ile Pro Arg Phe Gly Val
                245                 250                 255

Lys Thr Glu Gln Glu Asp Val Leu Ala Lys Glu Leu Glu Asp Val Asn
            260                 265                 270

Lys Trp Gly Leu His Val Phe Arg Ile Ala Glu Leu Ser Gly Asn Arg
        275                 280                 285

Pro Leu Thr Val Ile Met His Thr Ile Phe Gln Glu Arg Asp Leu Leu
    290                 295                 300

Lys Thr Phe Lys Ile Pro Val Asp Thr Leu Ile Thr Tyr Leu Met Thr
305                 310                 315                 320

Leu Glu Asp His Tyr His Ala Asp Val Ala Tyr His Asn Asn Ile His
                325                 330                 335

Ala Ala Asp Val Val Gln Ser Thr His Val Leu Leu Ser Thr Pro Ala
            340                 345                 350

Leu Glu Ala Val Phe Thr Asp Leu Glu Ile Leu Ala Ala Ile Phe Ala
        355                 360                 365

Ser Ala Ile His Asp Val Asp His Pro Gly Val Ser Asn Gln Phe Leu
    370                 375                 380

Ile Asn Thr Asn Ser Glu Leu Ala Leu Met Tyr Asn Asp Ser Ser Val
385                 390                 395                 400

Leu Glu Asn His His Leu Ala Val Gly Phe Lys Leu Leu Gln Glu Glu
                405                 410                 415

Asn Cys Asp Ile Phe Gln Asn Leu Thr Lys Lys Gln Arg Gln Ser Leu
            420                 425                 430

Arg Lys Met Val Ile Asp Ile Val Leu Ala Thr Asp Met Ser Lys His
        435                 440                 445

Met Asn Leu Leu Ala Asp Leu Lys Thr Met Val Glu Thr Lys Lys Val
    450                 455                 460

Thr Ser Ser Gly Val Leu Leu Leu Asp Asn Tyr Ser Asp Arg Ile Gln
465                 470                 475                 480

Val Leu Gln Asn Met Val His Cys Ala Asp Leu Ser Asn Pro Thr Lys
                485                 490                 495

Pro Leu Gln Leu Tyr Arg Gln Trp Thr Asp Arg Ile Met Glu Glu Phe
            500                 505                 510

Phe Arg Gln Gly Asp Arg Glu Arg Glu Arg Gly Met Glu Ile Ser Pro
        515                 520                 525

Met Cys Asp Lys His Asn Ala Ser Val Glu Lys Ser Gln Val Gly Phe
    530                 535                 540

Ile Asp Tyr Ile Val His Pro Leu Trp Glu Thr Trp Ala Asp Leu Val
545                 550                 555                 560

His Pro Asp Ala Gln Asp Ile Leu Asp Thr Leu Glu Asp Asn Arg Glu
                565                 570                 575

Trp Tyr Gln Ser Thr Ile Pro Gln Ser Pro Ser Pro Ala Pro Asp Asp
            580                 585                 590

Pro Glu Glu Gly Arg Gln Gly Gln Thr Glu Lys Phe Gln Phe Glu Leu
        595                 600                 605

Thr Leu Glu Glu Asp Gly Glu Ser Asp Thr Glu Lys Asp Ser Gly Ser
    610                 615                 620
```

```
Gln Val Glu Glu Asp Thr Ser Cys Ser Asp Ser Lys Thr Leu Cys Thr
625                 630                 635                 640

Gln Asp Ser Glu Ser Thr Glu Ile Pro Leu Asp Glu Gln Val Glu Glu
                645                 650                 655

Glu Ala Val Gly Glu Glu Glu Glu Ser Gln Pro Glu Ala Cys Val Ile
            660                 665                 670

Asp Asp Arg Ser Pro Asp Thr
        675


<210> SEQ ID NO 31
<211> LENGTH: 26
<212> TYPE: DNA
<213> ORGANISM: Artificial Sequence
<220> FEATURE:
<223> OTHER INFORMATION: PDE4D9_forward primer

<400> SEQUENCE: 31

atgagcatta ttatgaagcc aagatc                                          26


<210> SEQ ID NO 32
<211> LENGTH: 22
<212> TYPE: DNA
<213> ORGANISM: Artificial Sequence
<220> FEATURE:
<223> OTHER INFORMATION: PDE4D9_reverse primer

<400> SEQUENCE: 32

gtgccattgt ccacatcaaa ac                                              22


<210> SEQ ID NO 33
<211> LENGTH: 27
<212> TYPE: DNA
<213> ORGANISM: Artificial Sequence
<220> FEATURE:
<223> OTHER INFORMATION: PDE4D9 probe

<400> SEQUENCE: 33

ctacaagttc cctaaggact gcagagg                                         27


<210> SEQ ID NO 34
<211> LENGTH: 1435
<212> TYPE: DNA
<213> ORGANISM: Homo sapiens

<400> SEQUENCE: 34

ggcggggcct gcttctcctc agcttcaggc ggctgcgacg agccctcagg cgaacctctc     60

ggctttcccg cgcggcgccg cctcttgctg cgcctccgcc tcctcctctg ctccgccacc    120

ggcttcctcc tcctgagcag tcagcccgcg cgccggccgg ctccgttatg gcgacccgca    180

gccctggcgt cgtgattagt gatgatgaac caggttatga ccttgattta ttttgcatac    240

ctaatcatta tgctgaggat ttggaaaggg tgtttattcc tcatggacta attatggaca    300

ggactgaacg tcttgctcga gatgtgatga aggagatggg aggccatcac attgtagccc    360

tctgtgtgct caaggggggc tataaattct ttgctgacct gctggattac atcaaagcac    420

tgaatagaaa tagtgataga tccattccta tgactgtaga ttttatcaga ctgaagagct    480

attgtaatga ccagtcaaca ggggacataa aagtaattgg tggagatgat ctctcaactt    540

taactggaaa gaatgtcttg attgtggaag atataattga cactggcaaa acaatgcaga    600

ctttgctttc cttggtcagg cagtataatc caaagatggt caaggtcgca agcttgctgg    660

tgaaaaggac cccacgaagt gttggatata agccagactt tgttggattt gaaattccag    720
```

```
acaagtttgt tgtaggatat gcccttgact ataatgaata cttcagggat ttgaatcatg    780

tttgtgtcat tagtgaaact ggaaaagcaa aatacaaagc ctaagatgag agttcaagtt    840

gagtttggaa acatctggag tcctattgac atcgccagta aaattatcaa tgttctagtt    900

ctgtggccat ctgcttagta gagctttttg catgtatctt ctaagaattt tatctgtttt    960

gtactttaga aatgtcagtt gctgcattcc taaactgttt atttgcacta tgagcctata   1020

gactatcagt tccctttggg cggattgttg tttaacttgt aaatgaaaaa attctcttaa   1080

accacagcac tattgagtga aacattgaac tcatatctgt aagaaataaa gagaagatat   1140

attagttttt taattggtat tttaattttt atatatgcag gaaagaatag aagtgattga   1200

atattgttaa ttataccacc gtgtgttaga aaagtaagaa gcagtcaatt ttcacatcaa   1260

agacagcatc taagaagttt tgttctgtcc tggaattatt ttagtagtgt ttcagtaatg   1320

ttgactgtat tttccaactt gttcaaatta ttaccagtga atctttgtca gcagttccct   1380

tttaaatgca aatcaataaa ttcccaaaaa tttaaaaaaa aaaaaaaaaa aaaaa        1435
```

```
<210> SEQ ID NO 35
<211> LENGTH: 218
<212> TYPE: PRT
<213> ORGANISM: Homo sapiens

<400> SEQUENCE: 35

Met Ala Thr Arg Ser Pro Gly Val Val Ile Ser Asp Asp Glu Pro Gly
1               5                   10                  15

Tyr Asp Leu Asp Leu Phe Cys Ile Pro Asn His Tyr Ala Glu Asp Leu
            20                  25                  30

Glu Arg Val Phe Ile Pro His Gly Leu Ile Met Asp Arg Thr Glu Arg
        35                  40                  45

Leu Ala Arg Asp Val Met Lys Glu Met Gly Gly His His Ile Val Ala
    50                  55                  60

Leu Cys Val Leu Lys Gly Gly Tyr Lys Phe Phe Ala Asp Leu Leu Asp
65                  70                  75                  80

Tyr Ile Lys Ala Leu Asn Arg Asn Ser Asp Arg Ser Ile Pro Met Thr
                85                  90                  95

Val Asp Phe Ile Arg Leu Lys Ser Tyr Cys Asn Asp Gln Ser Thr Gly
            100                 105                 110

Asp Ile Lys Val Ile Gly Gly Asp Asp Leu Ser Thr Leu Thr Gly Lys
        115                 120                 125

Asn Val Leu Ile Val Glu Asp Ile Ile Asp Thr Gly Lys Thr Met Gln
    130                 135                 140

Thr Leu Leu Ser Leu Val Arg Gln Tyr Asn Pro Lys Met Val Lys Val
145                 150                 155                 160

Ala Ser Leu Leu Val Lys Arg Thr Pro Arg Ser Val Gly Tyr Lys Pro
                165                 170                 175

Asp Phe Val Gly Phe Glu Ile Pro Asp Lys Phe Val Val Gly Tyr Ala
            180                 185                 190

Leu Asp Tyr Asn Glu Tyr Phe Arg Asp Leu Asn His Val Cys Val Ile
        195                 200                 205

Ser Glu Thr Gly Lys Ala Lys Tyr Lys Ala
    210                 215


<210> SEQ ID NO 36
<211> LENGTH: 24
<212> TYPE: DNA
```

<213> ORGANISM: Artificial Sequence
<220> FEATURE:
<223> OTHER INFORMATION: HPRT1_forward primer

<400> SEQUENCE: 36
gaggatttgg aaagggtgtt tatt 24

<210> SEQ ID NO 37
<211> LENGTH: 21
<212> TYPE: DNA
<213> ORGANISM: Artificial Sequence
<220> FEATURE:
<223> OTHER INFORMATION: HPRT1_reverse primer

<400> SEQUENCE: 37
acagagggct acaatgtgat g 21

<210> SEQ ID NO 38
<211> LENGTH: 26
<212> TYPE: DNA
<213> ORGANISM: Artificial Sequence
<220> FEATURE:
<223> OTHER INFORMATION: HPRT1 probe

<400> SEQUENCE: 38
acgtcttgct cgagatgtga tgaagg 26

<210> SEQ ID NO 39
<211> LENGTH: 1771
<212> TYPE: DNA
<213> ORGANISM: Homo sapiens

<400> SEQUENCE: 39
ggcggccagg ccgggcgcgg agtgggcgcg cggggccgga ggaggggcca gcgaccgcgg 60
caccgcctgt gcccgcccgc ccctccgcag ccgctactta agaggctcca gcgccggccc 120
cgccctagtg cgttacttac ctcgactctt agcttgtcgg ggacggtaac cgggacccgg 180
tgtctgctcc tgtcgccttc gcctcctaat ccctagccac tatgcgtgag tgcatctcca 240
tccacgttgg ccaggctggt gtccagattg gcaatgcctg ctgggagctc tactgcctgg 300
aacacggcat ccagcccgat ggccagatgc caagtgacaa gaccattggg ggaggagatg 360
actccttcaa caccttcttc agtgagacgg gcgctggcaa gcacgtgccc cgggctgtgt 420
ttgtagactt ggaacccaca gtcattgatg aagttcgcac tggcacctac cgccagctct 480
tccaccctga gcagctcatc acaggcaagg aagatgctgc caataactat gcccgagggc 540
actacaccat tggcaaggag atcattgacc ttgtgttgga ccgaattcgc aagctggctg 600
accagtgcac cggtcttcag ggcttcttgg ttttccacag ctttggtggg ggaactggtt 660
ctgggttcac ctccctgctc atggaacgtc tctcagttga ttatggcaag aagtccaagc 720
tggagttctc catttaccca gcaccccagg tttccacagc tgtagttgag ccctacaact 780
ccatcctcac cacccacacc accctggagc actctgattg tgccttcatg gtagacaatg 840
aggccatcta tgacatctgt cgtagaaacc tcgatatcga gcgcccaacc tacactaacc 900
ttaaccgcct tattagccag attgtgtcct ccatcactgc ttccctgaga tttgatggag 960
ccctgaatgt tgacctgaca gaattccaga ccaacctggt gccctacccc cgcatccact 1020
tccctctggc cacatatgcc cctgtcatct ctgctgagaa agcctaccat gaacagcttt 1080
ctgtagcaga gatcaccaat gcttgctttg agccagccaa ccagatggtg aaatgtgacc 1140
ctcgccatgg taaatacatg gcttgctgcc tgttgtaccg tggtgacgtg gttcccaaag 1200

```
atgtcaatgc tgccattgcc accatcaaaa ccaagcgcag catccagttt gtggattggt   1260

gccccactgg cttcaaggtt ggcatcaact accagcctcc cactgtggtg cctggtggag   1320

acctggccaa ggtacagaga gctgtgtgca tgctgagcaa caccacagcc attgctgagg   1380

cctgggctcg cctggaccac aagtttgacc tgatgtatgc caagcgtgcc tttgttcact   1440

ggtacgtggg tgaggggatg gaggaaggcg agttttcaga ggcccgtgaa gatatggctg   1500

cccttgagaa ggattatgag gaggttggtg tggattctgt tgaaggagag ggtgaggaag   1560

aaggagagga atactaatta tccattcctt ttggccctgc agcatgtcat gctcccagaa   1620

tttcagcttc agcttaactg acagacgtta aagctttctg gttagattgt tttcacttgg   1680

tgatcatgtc ttttccatgt gtacctgtaa tatttttcca tcatatctca aagtaaagtc   1740

attaacatca aaaaaaaaaa aaaaaaaaaa a                                  1771
```

<210> SEQ ID NO 40
<211> LENGTH: 451
<212> TYPE: PRT
<213> ORGANISM: Homo sapiens

<400> SEQUENCE: 40

```
Met Arg Glu Cys Ile Ser Ile His Val Gly Gln Ala Gly Val Gln Ile
1               5                   10                  15

Gly Asn Ala Cys Trp Glu Leu Tyr Cys Leu Glu His Gly Ile Gln Pro
            20                  25                  30

Asp Gly Gln Met Pro Ser Asp Lys Thr Ile Gly Gly Gly Asp Asp Ser
        35                  40                  45

Phe Asn Thr Phe Phe Ser Glu Thr Gly Ala Gly Lys His Val Pro Arg
    50                  55                  60

Ala Val Phe Val Asp Leu Glu Pro Thr Val Ile Asp Glu Val Arg Thr
65                  70                  75                  80

Gly Thr Tyr Arg Gln Leu Phe His Pro Glu Gln Leu Ile Thr Gly Lys
                85                  90                  95

Glu Asp Ala Ala Asn Asn Tyr Ala Arg Gly His Tyr Thr Ile Gly Lys
            100                 105                 110

Glu Ile Ile Asp Leu Val Leu Asp Arg Ile Arg Lys Leu Ala Asp Gln
        115                 120                 125

Cys Thr Gly Leu Gln Gly Phe Leu Val Phe His Ser Phe Gly Gly Gly
    130                 135                 140

Thr Gly Ser Gly Phe Thr Ser Leu Leu Met Glu Arg Leu Ser Val Asp
145                 150                 155                 160

Tyr Gly Lys Lys Ser Lys Leu Glu Phe Ser Ile Tyr Pro Ala Pro Gln
                165                 170                 175

Val Ser Thr Ala Val Val Glu Pro Tyr Asn Ser Ile Leu Thr Thr His
            180                 185                 190

Thr Thr Leu Glu His Ser Asp Cys Ala Phe Met Val Asp Asn Glu Ala
        195                 200                 205

Ile Tyr Asp Ile Cys Arg Arg Asn Leu Asp Ile Glu Arg Pro Thr Tyr
    210                 215                 220

Thr Asn Leu Asn Arg Leu Ile Ser Gln Ile Val Ser Ser Ile Thr Ala
225                 230                 235                 240

Ser Leu Arg Phe Asp Gly Ala Leu Asn Val Asp Leu Thr Glu Phe Gln
                245                 250                 255

Thr Asn Leu Val Pro Tyr Pro Arg Ile His Phe Pro Leu Ala Thr Tyr
            260                 265                 270
```

```
Ala Pro Val Ile Ser Ala Glu Lys Ala Tyr His Glu Gln Leu Ser Val
        275                 280                 285

Ala Glu Ile Thr Asn Ala Cys Phe Glu Pro Ala Asn Gln Met Val Lys
    290                 295                 300

Cys Asp Pro Arg His Gly Lys Tyr Met Ala Cys Cys Leu Leu Tyr Arg
305                 310                 315                 320

Gly Asp Val Val Pro Lys Asp Val Asn Ala Ala Ile Ala Thr Ile Lys
                325                 330                 335

Thr Lys Arg Ser Ile Gln Phe Val Asp Trp Cys Pro Thr Gly Phe Lys
            340                 345                 350

Val Gly Ile Asn Tyr Gln Pro Pro Thr Val Val Pro Gly Gly Asp Leu
        355                 360                 365

Ala Lys Val Gln Arg Ala Val Cys Met Leu Ser Asn Thr Thr Ala Ile
    370                 375                 380

Ala Glu Ala Trp Ala Arg Leu Asp His Lys Phe Asp Leu Met Tyr Ala
385                 390                 395                 400

Lys Arg Ala Phe Val His Trp Tyr Val Gly Glu Gly Met Glu Glu Gly
                405                 410                 415

Glu Phe Ser Glu Ala Arg Glu Asp Met Ala Ala Leu Glu Lys Asp Tyr
            420                 425                 430

Glu Glu Val Gly Val Asp Ser Val Glu Gly Glu Gly Glu Glu Glu Gly
        435                 440                 445

Glu Glu Tyr
    450
```

<210> SEQ ID NO 41
<211> LENGTH: 22
<212> TYPE: DNA
<213> ORGANISM: Artificial Sequence
<220> FEATURE:
<223> OTHER INFORMATION: TUBA1B_forward primer

<400> SEQUENCE: 41
tgactccttc aacaccttct tc 22

<210> SEQ ID NO 42
<211> LENGTH: 18
<212> TYPE: DNA
<213> ORGANISM: Artificial Sequence
<220> FEATURE:
<223> OTHER INFORMATION: TUBA1B_reverse primer

<400> SEQUENCE: 42
tgccagtgcg aacttcat 18

<210> SEQ ID NO 43
<211> LENGTH: 24
<212> TYPE: DNA
<213> ORGANISM: Artificial Sequence
<220> FEATURE:
<223> OTHER INFORMATION: TUBA1B probe

<400> SEQUENCE: 43
ccgggctgtg tttgtagact tgga 24

<210> SEQ ID NO 44
<211> LENGTH: 5416
<212> TYPE: DNA
<213> ORGANISM: Homo sapiens

<400> SEQUENCE: 44

```
agtgggccgc catgttgtcg gagtgaaagg taagggggag cgagagcgcc agagagagaa     60
gatcgggggg ctgaaatcca tcttcatcct accgctccgc ccgtgttggt ggaatgagcg    120
ttgcatgtgt cttgaagaga aaagcagtgc tttggcagga ctctttcagc cccacctga     180
aacatcaccc tcaagaacca gctaatccca acatgcctgt tgttttgaca tctggaacag    240
ggtcgcaagc gcagccacaa ccagctgcaa atcaggctct tgcagctggg actcactcca    300
gccctgtccc aggatctata ggagttgcag gccgttccca ggacgacgct atggtggact    360
acttctttca gaggcagcat ggtgagcagc ttgggggagg aggaagtgga ggaggcggct    420
ataataatag caaacatcga tggcctactg ggataacat tcatgcagaa catcaggtgc     480
gttccatgga tgaactgaat catgattttc aagcacttgc tctggaggga agagcgatgg    540
gagagcagct cttgccaggt aaaaagtttt gggaaacaga tgaatccagc aaagatggac    600
caaaaggaat attcctgggt gatcaatggc gagacagtgc ctggggaaca tcagatcatt    660
cagtttccca gccaatcatg gtgcagagaa gacctggtca gagtttccat gtgaacagtg    720
aggtcaattc tgtactgtcc ccacgatcgg agagtggggg actaggcgtt agcatggtgg    780
agtatgtgtt gagctcatcc ccgggcgatt cctgtctaag aaaaggagga tttggcccaa    840
gggatgcaga cagtgatgaa aacgacaaag gtgaaaagaa gaacaagggt acgtttgatg    900
gagataagct aggagatttg aaggaggagg gtgatgtgat ggacaagacc aatggtttac    960
cagtgcagaa tgggattgat gcagacgtca aagattttag ccgtacccct ggtaattgcc   1020
agaactctgc taatgaagtg gatcttctgg gtccaaacca gaatggttct gagggcttag   1080
cccagctgac cagcaccaat ggtgccaagc ctgtggagga tttctccaac atggagtccc   1140
agagtgtccc cttggacccc atggaacatg tgggcatgga gcctcttcag tttgattatt   1200
caggcacgca ggtacctgtg gactcagcag cagcaactgt gggacttttt gactacaatt   1260
ctcaacaaca gctgttccaa agacctaatg cgcttgctgt ccagcagttg acagctgctc   1320
agcagcagca gtatgcactg gcagctgctc atcagccgca catcggttta gctcccgctg   1380
cgtttgtccc caatccatac atcatcagcg ctgctccccc agggacggac ccctacacag   1440
ctggattggc tgcagcagcg acactaggcc cagctgtggt ccctcaccag tattatggag   1500
ttactccctg gggagtctac cctgccagtc ttttccagca gcaagctgcc gctgccgctg   1560
cagcaactaa ttcagctaat caacagacca ccccacaggc tcagcaagga cagcagcagg   1620
ttctccgtgg aggagccagc caacgtcctt tgaccccaaa ccagaaccag cagggacagc   1680
aaacggatcc ccttgtggca gctgcagcag tgaattctgc ccttgcattt ggacaaggtc   1740
tggcagcagg catgccaggt tatccggtgt tggctcctgc tgcttactat gaccaaactg   1800
gtgcccttgt agtgaatgca ggcgcgagaa atggtcttgg agctcctgtt cgacttgtag   1860
ctcctgcccc agtcatcatt agttcctcag ctgcacaagc agctgttgca gcagccgcag   1920
cttcagcaaa tggagcagct ggtggtcttg ctggaacaac aaatggacca tttcgccctt   1980
taggaacaca gcagcctcag ccccagcccc agcagcagcc caataacaac ctggcatcca   2040
gttctttcta cggcaacaac tctctgaaca gcaattcaca gagcagctcc ctcttctccc   2100
agggctctgc ccagcctgcc aacacatcct tgggattcgg aagtagcagt tctctcggcg   2160
ccaccctggg atccgccctt ggagggtttg gaacagcagt tgcaaactcc aacactggca   2220
gtggctcccg ccgtgactcc ctgactggca gcagtgacct ttataagagg acatcgagca   2280
gcttgacccc cattggacac agtttttata acggccttag cttttcctcc tctcctggac   2340
```

```
ccgtgggcat gcctctccct agtcagggac caggacattc acagacacca cctccttccc   2400
tctcttcaca tggatcctct tcaagcttaa acctgggagg actcacgaat ggcagtggaa   2460
gatacatctc tgctgctcca ggcgctgaag ccaagtaccg cagtgcaagc agcgcctcca   2520
gcctcttcag cccgagcagc actcttttct cttcctctcg tttgcgatat ggaatgtctg   2580
atgtcatgcc ttctggcagg agcaggcttt tggaagattt tcgaaacaac cggtacccca   2640
atttacaact gcgggagatt gctggacata taatggaatt ttcccaagac cagcatgggt   2700
ccagattcat tcagctgaaa ctggagcgtg ccacaccagc tgagcgccag cttgtcttca   2760
atgaaatcct ccaggctgcc taccaactca tggtggatgt gtttggtaat tacgtcattc   2820
agaagttctt tgaatttggc agtcttgaac agaagctggc tttggcagaa cggattcgag   2880
gccacgtcct gtcattggca ctacagatgt atggctgccg tgttatccag aaagctcttg   2940
agtttattcc ttcagaccag caggtaatta atgagatggt tcgggaacta gatggccatg   3000
tcttgaagtg tgtgaaagat cagaatggca atcacgtggt tcagaaatgc attgaatgtg   3060
tacagcccca gtctttgcaa tttatcatcg atgcgtttaa gggacaggta tttgccttat   3120
ccacacatcc ttatggctgc cgagtgattc agagaatcct ggagcactgt ctccctgacc   3180
agacactccc tattttagag gagcttcacc agcacacaga gcagcttgta caggatcaat   3240
atggaaatta tgtaatccaa catgtactgg agcacggtcg tcctgaggat aaaagcaaaa   3300
ttgtagcaga aatccgaggc aatgtacttg tattgagtca gcacaaattt gcaagcaatg   3360
ttgtggagaa gtgtgttact cacgcctcac gtacggagcg cgctgtgctc atcgatgagg   3420
tgtgcaccat gaacgacggt ccccacagtg ccttatacac catgatgaag gaccagtatg   3480
ccaactacgt ggtccagaag atgattgacg tggcggagcc aggccagcgg aagatcgtca   3540
tgcataagat ccggccccac atcgcaactc ttcgtaagta cacctatggc aagcacattc   3600
tggccaagct ggagaagtac tacatgaaga acggtgttga cttagggccc atctgtggcc   3660
cccctaatgg tatcatctga ggcagtgtca cccgctgttc cctcattccc gctgacctca   3720
ctggcccact ggcaaatcca accagcaacc agaaatgttc tagtgtagag tctgagacgg   3780
gcaagtggtt gctccaggat tactccctcc tccaaaaaag gaatcaaatc cacgagtgga   3840
aaagcctttg taaatttaat tttattacac ataacatgta ctattttttt taattgacta   3900
attgccctgc tgttttactg gtgtatagga tacttgtaca taggtaacca atgtacatgg   3960
gaggccacat attttgttca ctgttgtatc tatatttcac atgtggaaac tttcagggtg   4020
gttggtttaa caaaaaaaaa aagctttaaa aaaaaaagaa aaaaaggaaa aggtttttag   4080
ctcatttgcc tggccggcaa gttttgcaaa tagctcttcc ccacctcctc attttagtaa   4140
aaaacaaaca aaaacaaaaa aacctgagaa gtttgaattg tagttaaatg accccaaact   4200
ggcatttaac actgtttata aaaaatatat atatatatat atatatatat aatgaaaaag   4260
gtttcagagt tgctaaagct tcagtttgtg acattaagtt tatgaaattc taaaaaatgc   4320
ctttttgga gactatatta tgctgaagaa ggctgttcgt gaggaggaga tgcgagcacc   4380
cagaacgtct tttgaggctg ggcgggtgtg attgtttact gcctactgga tttttttcta   4440
ttaacattga aaggtaaaat ctgattattt agcatgagaa aaaaaaatcc aactctgctt   4500
ttggtcttgc ttctataaat atatagtgta tacttggtgt agactttgca tatatacaaa   4560
tttgtagtat tttcttgttt tgatgtctaa tctgtatcta taatgtaccc tagtagtcga   4620
acatactttt gattgtacaa ttgtacattt gtatacctgt aatgtaaatg tggagaagtt   4680
```

```
tgaatcaaca taaacacgtt ttttggtaag aaaagagaat tagccagccc tgtgcattca   4740

gtgtatattc tcacctttta tggtcgtagc atatagtgtt gtatattgta aattgtaatt   4800

tcaaccagaa gtaaattttt ttcttttgaa ggaataaatg ttctttatac agcctagtta   4860

atgtttaaaa agaaaaaaat agcttggttt tatttgtcat ctagtctcaa gtatagcgag   4920

attctttcta aatgttattc aagattgagt tctcactagt gtttttttaa tcctaaaaaa   4980

gtaatgtttt gattttgtga cagtcaaaag gacgtgcaaa agtctagcct tgcccgagct   5040

ttccttacaa tcagagcccc tctcaccttg taaagtgtga atcgcccttc ccttttgtac   5100

agaagatgaa ctgtattttg cattttgtct acttgtaagt gaatgtaaca tactgtcaat   5160

tttccttgtt tgaatataga attgtaacac tacacggtgt acatttccag agccttgtgt   5220

atatttccaa tgaacttttt tgcaagcaca cttgtaacca tatgtgtata attaacaaac   5280

ctgtgtatgc ttatgcctgg gcaactattt tttgtaactc ttgtgtagat tgtctctaaa   5340

caatgtgtga tctttatttt gaaaaataca gaactttgga atctgaaaaa aaaaaaaaaa   5400

aaaaaaaaaa aaaaaa                                                   5416


<210> SEQ ID NO 45
<211> LENGTH: 5410
<212> TYPE: DNA
<213> ORGANISM: Homo sapiens

<400> SEQUENCE: 45

agtgggccgc catgttgtcg gagtgaaagg taagggggag cgagagcgcc agagagagaa     60

gatcgggggg ctgaaatcca tcttcatcct accgctccgc ccgtgttggt ggaatgagcg    120

ttgcatgtgt cttgaagaga aaagcagtgc tttggcagga ctctttcagc ccccacctga    180

aacatcaccc tcaagaacca gctaatccca acatgcctgt tgttttgaca tctggaacag    240

ggtcgcaagc gcagccacaa ccagctgcaa atcaggctct tgcagctggg actcactcca    300

gccctgtccc aggatctata ggagttgcag gccgttccca ggacgacgct atggtggact    360

acttctttca gaggcagcat ggtgagcagc ttgggggagg aggaagtgga ggaggcggct    420

ataataatag caaacatcga tggcctactg ggataacat tcatgcagaa catcaggtgc     480

gttccatgga tgaactgaat catgattttc aagcacttgc tctggaggga agagcgatgg    540

gagagcagct cttgccaggt aaaaagtttt gggaaacaga tgaatccagc aaagatggac    600

caaaaggaat attcctgggt gatcaatggc gagacagtgc ctggggaaca tcagatcatt    660

cagtttccca gccaatcatg gtgcagagaa gacctggtca gagtttccat gtgaacagtg    720

aggtcaattc tgtactgtcc ccacgatcgg agagtggggg actaggcgtt agcatggtgg    780

agtatgtgtt gagctcatcc ccgggcgatt cctgtctaag aaaaggagga tttggcccaa    840

gggatgcaga cagtgatgaa aacgacaaag gtgaaaagaa gaacaagggt acgtttgatg    900

gagataagct aggagatttg aaggaggagg gtgatgtgat ggacaagacc aatggtttac    960

cagtgcagaa tgggattgat gcagacgtca aagattttag ccgtacccct ggtaattgcc   1020

agaactctgc taatgaagtg gatcttctgg gtccaaacca gaatggttct gagggcttag   1080

cccagctgac cagcaccaat ggtgccaagc ctgtggagga tttctccaac atggagtccc   1140

agagtgtccc cttggacccc atggaacatg tgggcatgga gcctcttcag tttgattatt   1200

caggcacgca ggtacctgtg gactcagcag cagcaactgt gggacttttt gactacaatt   1260

ctcaacaaca gctgttccaa agacctaatg cgcttgctgt ccagcagttg acagctgctc   1320

agcagcagca gtatgcactg gcagctgctc atcagccgca catcggttta gctcccgctg   1380
```

```
cgtttgtccc caatccatac atcatcagcg ctgctccccc agggacggac ccctacacag   1440
ctggattggc tgcagcagcg acactaggcc cagctgtggt ccctcaccag tattatggag   1500
ttactccctg ggagtctac cctgccagtc ttttccagca gcaagctgcc gctgccgctg   1560
cagcaactaa ttcagctaat caacagacca ccccacaggc tcagcaagga cagcagcagg   1620
ttctccgtgg aggagccagc caacgtcctt tgaccccaaa ccagaaccag cagggacagc   1680
aaacggatcc ccttgtggca gctgcagcag tgaattctgc ccttgcattt ggacaaggtc   1740
tggcagcagg catgccaggt tatccggtgt tggctcctgc tgcttactat gaccaaactg   1800
gtgcccttgt agtgaatgca ggcgcgagaa atggtcttgg agctcctgtt cgacttgtag   1860
ctcctgcccc agtcatcatt agttcctcag ctgcacaagc agctgttgca gcagccgcag   1920
cttcagcaaa tggagcagct ggtggtcttg ctggaacaac aaatggacca tttcgccctt   1980
taggaacaca gcagcctcag ccccagcccc agcagcagcc caataacaac ctggcatcca   2040
gttctttcta cggcaacaac tctctgaaca gcaattcaca gagcagctcc ctcttctccc   2100
agggctctgc ccagcctgcc aacacatcct tgggattcgg aagtagcagt tctctcggcg   2160
ccaccctggg atccgccctt ggagggtttg gaacagcagt tgcaaactcc aacactggca   2220
gtggctcccg ccgtgactcc ctgactggca gcagtgacct ttataagagg acatcgagca   2280
gcttgacccc cattggacac agtttttata acggccttag cttttcctcc tctcctggac   2340
ccgtgggcat gcctctccct agtcagggac caggacattc acagacacca cctccttccc   2400
tctcttcaca tggatcctct tcaagcttaa acctgggagg actcacgaat ggcagtggaa   2460
gatacatctc tgctgctcca ggcgctgaag ccaagtaccg cagtgcaagc agcgcctcca   2520
gcctcttcag cccgagcagc actcttttct cttcctctcg tttgcgatat ggaatgtctg   2580
atgtcatgcc ttctggcagg agcaggcttt tggaagattt tcgaaacaac cggtacccca   2640
atttacaact gcgggagatt gctggacata taatggaatt ttcccaagac cagcatgggt   2700
ccagattcat tcagctgaaa ctggagcgtg ccacaccagc tgagcgccag cttgtcttca   2760
atgaaatcct ccaggctgcc taccaactca tggtggatgt gtttggtaat tacgtcattc   2820
agaagttctt tgaatttggc agtcttgaac agaagctggc tttggcagaa cggattcgag   2880
gccacgtcct gtcattggca ctacagatgt atggctgccg tgttatccag aaagctcttg   2940
agtttattcc ttcagaccag cagaatgaga tggttcggga actagatggc catgtcttga   3000
agtgtgtgaa agatcagaat ggcaatcacg tggttcagaa atgcattgaa tgtgtacagc   3060
cccagtcttt gcaatttatc atcgatgcgt ttaagggaca ggtatttgcc ttatccacac   3120
atccttatgg ctgccgagtg attcagagaa tcctggagca ctgtctccct gaccagacac   3180
tccctatttt agaggagctt caccagcaca cagagcagct tgtacaggat caatatggaa   3240
attatgtaat ccaacatgta ctggagcacg gtcgtcctga ggataaaagc aaaattgtag   3300
cagaaatccg aggcaatgta cttgtattga gtcagcacaa atttgcaagc aatgttgtgg   3360
agaagtgtgt tactcacgcc tcacgtacgg agcgcgctgt gctcatcgat gaggtgtgca   3420
ccatgaacga cggtccccac agtgccttat acaccatgat gaaggaccag tatgccaact   3480
acgtggtcca gaagatgatt gacgtggcgg agccaggcca gcggaagatc gtcatgcata   3540
agatccggcc ccacatcgca actcttcgta agtacaccta tggcaagcac attctggcca   3600
agctggagaa gtactacatg aagaacggtg ttgacttagg gcccatctgt ggcccccccta   3660
atggtatcat ctgaggcagt gtcacccgct gttccctcat tcccgctgac ctcactggcc   3720
```

```
cactggcaaa tccaaccagc aaccagaaat gttctagtgt agagtctgag acgggcaagt   3780

ggttgctcca ggattactcc ctcctccaaa aaaggaatca aatccacgag tggaaaagcc   3840

tttgtaaatt taattttatt acacataaca tgtactattt tttttaattg actaattgcc   3900

ctgctgtttt actggtgtat aggatacttg tacataggta accaatgtac atgggaggcc   3960

acatattttg ttcactgttg tatctatatt tcacatgtgg aaactttcag ggtggttggt   4020

ttaacaaaaa aaaaaagctt taaaaaaaaa agaaaaaaag gaaaaggttt ttagctcatt   4080

tgcctggccg gcaagttttg caaatagctc ttccccacct cctcatttta gtaaaaaaca   4140

aacaaaaaca aaaaaacctg agaagtttga attgtagtta aatgacccca aactggcatt   4200

taacactgtt tataaaaaat atatatatat atatatatat atataatgaa aaaggtttca   4260

gagttgctaa agcttcagtt tgtgacatta agtttatgaa attctaaaaa atgccttttt   4320

tggagactat attatgctga agaaggctgt tcgtgaggag gagatgcgag cacccagaac   4380

gtcttttgag gctgggcggg tgtgattgtt tactgcctac tggatttttt tctattaaca   4440

ttgaaaggta aaatctgatt atttagcatg agaaaaaaaa atccaactct gcttttggtc   4500

ttgcttctat aaatatatag tgtatacttg gtgtagactt tgcatatata caaatttgta   4560

gtattttctt gttttgatgt ctaatctgta tctataatgt accctagtag tcgaacatac   4620

ttttgattgt acaattgtac atttgtatac ctgtaatgta aatgtggaga agtttgaatc   4680

aacataaaca cgtttttttgg taagaaaaga gaattagcca gccctgtgca ttcagtgtat   4740

attctcacct tttatggtcg tagcatatag tgttgtatat tgtaaattgt aatttcaacc   4800

agaagtaaat ttttttcttt tgaaggaata aatgttcttt atacagccta gttaatgttt   4860

aaaaagaaaa aaatagcttg gttttatttg tcatctagtc tcaagtatag cgagattctt   4920

tctaaatgtt attcaagatt gagttctcac tagtgttttt ttaatcctaa aaaagtaatg   4980

ttttgatttt gtgacagtca aaaggacgtg caaaagtcta gccttgcccg agctttcctt   5040

acaatcagag cccctctcac cttgtaaagt gtgaatcgcc cttccctttt gtacagaaga   5100

tgaactgtat tttgcatttt gtctacttgt aagtgaatgt aacatactgt caattttcct   5160

tgtttgaata tagaattgta acactacacg gtgtacattt ccagagcctt gtgtatattt   5220

ccaatgaact tttttgcaag cacacttgta accatatgtg tataattaac aaacctgtgt   5280

atgcttatgc ctgggcaact attttttgta actcttgtgt agattgtctc taaacaatgt   5340

gtgatcttta ttttgaaaaa tacagaactt tggaatctga aaaaaaaaaa aaaaaaaaaa   5400

aaaaaaaaaa                                                          5410
```

<210> SEQ ID NO 46
<211> LENGTH: 1188
<212> TYPE: PRT
<213> ORGANISM: Homo sapiens

<400> SEQUENCE: 46

```
Met Ser Val Ala Cys Val Leu Lys Arg Lys Ala Val Leu Trp Gln Asp
1               5                   10                  15

Ser Phe Ser Pro His Leu Lys His His Pro Gln Glu Pro Ala Asn Pro
            20                  25                  30

Asn Met Pro Val Val Leu Thr Ser Gly Thr Gly Ser Gln Ala Gln Pro
        35                  40                  45

Gln Pro Ala Ala Asn Gln Ala Leu Ala Ala Gly Thr His Ser Ser Pro
    50                  55                  60

Val Pro Gly Ser Ile Gly Val Ala Gly Arg Ser Gln Asp Asp Ala Met
```

```
65                  70                  75                  80

Val Asp Tyr Phe Phe Gln Arg Gln His Gly Glu Gln Leu Gly Gly Gly
                85                  90                  95

Gly Ser Gly Gly Gly Gly Tyr Asn Asn Ser Lys His Arg Trp Pro Thr
            100                 105                 110

Gly Asp Asn Ile His Ala Glu His Gln Val Arg Ser Met Asp Glu Leu
        115                 120                 125

Asn His Asp Phe Gln Ala Leu Ala Leu Glu Gly Arg Ala Met Gly Glu
    130                 135                 140

Gln Leu Leu Pro Gly Lys Lys Phe Trp Glu Thr Asp Glu Ser Ser Lys
145                 150                 155                 160

Asp Gly Pro Lys Gly Ile Phe Leu Gly Asp Gln Trp Arg Asp Ser Ala
                165                 170                 175

Trp Gly Thr Ser Asp His Ser Val Ser Gln Pro Ile Met Val Gln Arg
            180                 185                 190

Arg Pro Gly Gln Ser Phe His Val Asn Ser Glu Val Asn Ser Val Leu
        195                 200                 205

Ser Pro Arg Ser Glu Ser Gly Gly Leu Gly Val Ser Met Val Glu Tyr
    210                 215                 220

Val Leu Ser Ser Ser Pro Gly Asp Ser Cys Leu Arg Lys Gly Gly Phe
225                 230                 235                 240

Gly Pro Arg Asp Ala Asp Ser Asp Glu Asn Asp Lys Gly Glu Lys Lys
                245                 250                 255

Asn Lys Gly Thr Phe Asp Gly Asp Lys Leu Gly Asp Leu Lys Glu Glu
            260                 265                 270

Gly Asp Val Met Asp Lys Thr Asn Gly Leu Pro Val Gln Asn Gly Ile
        275                 280                 285

Asp Ala Asp Val Lys Asp Phe Ser Arg Thr Pro Gly Asn Cys Gln Asn
    290                 295                 300

Ser Ala Asn Glu Val Asp Leu Leu Gly Pro Asn Gln Asn Gly Ser Glu
305                 310                 315                 320

Gly Leu Ala Gln Leu Thr Ser Thr Asn Gly Ala Lys Pro Val Glu Asp
                325                 330                 335

Phe Ser Asn Met Glu Ser Gln Ser Val Pro Leu Asp Pro Met Glu His
            340                 345                 350

Val Gly Met Glu Pro Leu Gln Phe Asp Tyr Ser Gly Thr Gln Val Pro
        355                 360                 365

Val Asp Ser Ala Ala Ala Thr Val Gly Leu Phe Asp Tyr Asn Ser Gln
    370                 375                 380

Gln Gln Leu Phe Gln Arg Pro Asn Ala Leu Ala Val Gln Gln Leu Thr
385                 390                 395                 400

Ala Ala Gln Gln Gln Gln Tyr Ala Leu Ala Ala Ala His Gln Pro His
                405                 410                 415

Ile Gly Leu Ala Pro Ala Ala Phe Val Pro Asn Pro Tyr Ile Ile Ser
            420                 425                 430

Ala Ala Pro Pro Gly Thr Asp Pro Tyr Thr Ala Gly Leu Ala Ala Ala
        435                 440                 445

Ala Thr Leu Gly Pro Ala Val Val Pro His Gln Tyr Tyr Gly Val Thr
    450                 455                 460

Pro Trp Gly Val Tyr Pro Ala Ser Leu Phe Gln Gln Gln Ala Ala Ala
465                 470                 475                 480

Ala Ala Ala Ala Thr Asn Ser Ala Asn Gln Gln Thr Thr Pro Gln Ala
                485                 490                 495
```

```
Gln Gln Gly Gln Gln Gln Val Leu Arg Gly Gly Ala Ser Gln Arg Pro
            500                 505                 510

Leu Thr Pro Asn Gln Asn Gln Gln Gly Gln Gln Thr Asp Pro Leu Val
        515                 520                 525

Ala Ala Ala Ala Val Asn Ser Ala Leu Ala Phe Gly Gln Gly Leu Ala
    530                 535                 540

Ala Gly Met Pro Gly Tyr Pro Val Leu Ala Pro Ala Ala Tyr Tyr Asp
545                 550                 555                 560

Gln Thr Gly Ala Leu Val Val Asn Ala Gly Ala Arg Asn Gly Leu Gly
                565                 570                 575

Ala Pro Val Arg Leu Val Ala Pro Ala Pro Val Ile Ile Ser Ser Ser
            580                 585                 590

Ala Ala Gln Ala Ala Val Ala Ala Ala Ala Ala Ser Ala Asn Gly Ala
        595                 600                 605

Ala Gly Gly Leu Ala Gly Thr Thr Asn Gly Pro Phe Arg Pro Leu Gly
    610                 615                 620

Thr Gln Gln Pro Gln Pro Gln Pro Gln Gln Gln Pro Asn Asn Asn Leu
625                 630                 635                 640

Ala Ser Ser Ser Phe Tyr Gly Asn Asn Ser Leu Asn Ser Asn Ser Gln
                645                 650                 655

Ser Ser Ser Leu Phe Ser Gln Gly Ser Ala Gln Pro Ala Asn Thr Ser
            660                 665                 670

Leu Gly Phe Gly Ser Ser Ser Ser Leu Gly Ala Thr Leu Gly Ser Ala
        675                 680                 685

Leu Gly Gly Phe Gly Thr Ala Val Ala Asn Ser Asn Thr Gly Ser Gly
    690                 695                 700

Ser Arg Arg Asp Ser Leu Thr Gly Ser Ser Asp Leu Tyr Lys Arg Thr
705                 710                 715                 720

Ser Ser Ser Leu Thr Pro Ile Gly His Ser Phe Tyr Asn Gly Leu Ser
                725                 730                 735

Phe Ser Ser Ser Pro Gly Pro Val Gly Met Pro Leu Pro Ser Gln Gly
            740                 745                 750

Pro Gly His Ser Gln Thr Pro Pro Pro Ser Leu Ser Ser His Gly Ser
        755                 760                 765

Ser Ser Ser Leu Asn Leu Gly Gly Leu Thr Asn Gly Ser Gly Arg Tyr
    770                 775                 780

Ile Ser Ala Ala Pro Gly Ala Glu Ala Lys Tyr Arg Ser Ala Ser Ser
785                 790                 795                 800

Ala Ser Ser Leu Phe Ser Pro Ser Ser Thr Leu Phe Ser Ser Ser Arg
                805                 810                 815

Leu Arg Tyr Gly Met Ser Asp Val Met Pro Ser Gly Arg Ser Arg Leu
            820                 825                 830

Leu Glu Asp Phe Arg Asn Asn Arg Tyr Pro Asn Leu Gln Leu Arg Glu
        835                 840                 845

Ile Ala Gly His Ile Met Glu Phe Ser Gln Asp Gln His Gly Ser Arg
    850                 855                 860

Phe Ile Gln Leu Lys Leu Glu Arg Ala Thr Pro Ala Glu Arg Gln Leu
865                 870                 875                 880

Val Phe Asn Glu Ile Leu Gln Ala Ala Tyr Gln Leu Met Val Asp Val
                885                 890                 895

Phe Gly Asn Tyr Val Ile Gln Lys Phe Phe Glu Phe Gly Ser Leu Glu
            900                 905                 910
```

```
Gln Lys Leu Ala Leu Ala Glu Arg Ile Arg Gly His Val Leu Ser Leu
        915                 920                 925

Ala Leu Gln Met Tyr Gly Cys Arg Val Ile Gln Lys Ala Leu Glu Phe
    930                 935                 940

Ile Pro Ser Asp Gln Gln Val Ile Asn Glu Met Val Arg Glu Leu Asp
945                 950                 955                 960

Gly His Val Leu Lys Cys Val Lys Asp Gln Asn Gly Asn His Val Val
                965                 970                 975

Gln Lys Cys Ile Glu Cys Val Gln Pro Gln Ser Leu Gln Phe Ile Ile
            980                 985                 990

Asp Ala Phe Lys Gly Gln Val Phe  Ala Leu Ser Thr His  Pro Tyr Gly
        995                 1000                 1005

Cys Arg  Val Ile Gln Arg Ile  Leu Glu His Cys Leu  Pro Asp Gln
    1010                 1015                 1020

Thr Leu  Pro Ile Leu Glu Glu  Leu His Gln His Thr  Glu Gln Leu
    1025                 1030                 1035

Val Gln  Asp Gln Tyr Gly Asn  Tyr Val Ile Gln His  Val Leu Glu
    1040                 1045                 1050

His Gly  Arg Pro Glu Asp Lys  Ser Lys Ile Val Ala  Glu Ile Arg
    1055                 1060                 1065

Gly Asn  Val Leu Val Leu Ser  Gln His Lys Phe Ala  Ser Asn Val
    1070                 1075                 1080

Val Glu  Lys Cys Val Thr His  Ala Ser Arg Thr Glu  Arg Ala Val
    1085                 1090                 1095

Leu Ile  Asp Glu Val Cys Thr  Met Asn Asp Gly Pro  His Ser Ala
    1100                 1105                 1110

Leu Tyr  Thr Met Met Lys Asp  Gln Tyr Ala Asn Tyr  Val Val Gln
    1115                 1120                 1125

Lys Met  Ile Asp Val Ala Glu  Pro Gly Gln Arg Lys  Ile Val Met
    1130                 1135                 1140

His Lys  Ile Arg Pro His Ile  Ala Thr Leu Arg Lys  Tyr Thr Tyr
    1145                 1150                 1155

Gly Lys  His Ile Leu Ala Lys  Leu Glu Lys Tyr Tyr  Met Lys Asn
    1160                 1165                 1170

Gly Val  Asp Leu Gly Pro Ile  Cys Gly Pro Pro Asn  Gly Ile Ile
    1175                 1180                 1185


<210> SEQ ID NO 47
<211> LENGTH: 1186
<212> TYPE: PRT
<213> ORGANISM: Homo sapiens

<400> SEQUENCE: 47

Met Ser Val Ala Cys Val Leu Lys Arg Lys Ala Val Leu Trp Gln Asp
1               5                   10                  15

Ser Phe Ser Pro His Leu Lys His His Pro Gln Glu Pro Ala Asn Pro
            20                  25                  30

Asn Met Pro Val Val Leu Thr Ser Gly Thr Gly Ser Gln Ala Gln Pro
        35                  40                  45

Gln Pro Ala Ala Asn Gln Ala Leu Ala Ala Gly Thr His Ser Ser Pro
    50                  55                  60

Val Pro Gly Ser Ile Gly Val Ala Gly Arg Ser Gln Asp Asp Ala Met
65                  70                  75                  80

Val Asp Tyr Phe Phe Gln Arg Gln His Gly Glu Gln Leu Gly Gly Gly
                85                  90                  95
```

```
Gly Ser Gly Gly Gly Gly Tyr Asn Asn Ser Lys His Arg Trp Pro Thr
            100                 105                 110

Gly Asp Asn Ile His Ala Glu His Gln Val Arg Ser Met Asp Glu Leu
        115                 120                 125

Asn His Asp Phe Gln Ala Leu Ala Leu Glu Gly Arg Ala Met Gly Glu
    130                 135                 140

Gln Leu Leu Pro Gly Lys Lys Phe Trp Glu Thr Asp Glu Ser Ser Lys
145                 150                 155                 160

Asp Gly Pro Lys Gly Ile Phe Leu Gly Asp Gln Trp Arg Asp Ser Ala
                165                 170                 175

Trp Gly Thr Ser Asp His Ser Val Ser Gln Pro Ile Met Val Gln Arg
            180                 185                 190

Arg Pro Gly Gln Ser Phe His Val Asn Ser Glu Val Asn Ser Val Leu
        195                 200                 205

Ser Pro Arg Ser Glu Ser Gly Gly Leu Gly Val Ser Met Val Glu Tyr
    210                 215                 220

Val Leu Ser Ser Ser Pro Gly Asp Ser Cys Leu Arg Lys Gly Gly Phe
225                 230                 235                 240

Gly Pro Arg Asp Ala Asp Ser Asp Glu Asn Asp Lys Gly Glu Lys Lys
                245                 250                 255

Asn Lys Gly Thr Phe Asp Gly Asp Lys Leu Gly Asp Leu Lys Glu Glu
            260                 265                 270

Gly Asp Val Met Asp Lys Thr Asn Gly Leu Pro Val Gln Asn Gly Ile
        275                 280                 285

Asp Ala Asp Val Lys Asp Phe Ser Arg Thr Pro Gly Asn Cys Gln Asn
    290                 295                 300

Ser Ala Asn Glu Val Asp Leu Leu Gly Pro Asn Gln Asn Gly Ser Glu
305                 310                 315                 320

Gly Leu Ala Gln Leu Thr Ser Thr Asn Gly Ala Lys Pro Val Glu Asp
                325                 330                 335

Phe Ser Asn Met Glu Ser Gln Ser Val Pro Leu Asp Pro Met Glu His
            340                 345                 350

Val Gly Met Glu Pro Leu Gln Phe Asp Tyr Ser Gly Thr Gln Val Pro
        355                 360                 365

Val Asp Ser Ala Ala Ala Thr Val Gly Leu Phe Asp Tyr Asn Ser Gln
    370                 375                 380

Gln Gln Leu Phe Gln Arg Pro Asn Ala Leu Ala Val Gln Gln Leu Thr
385                 390                 395                 400

Ala Ala Gln Gln Gln Gln Tyr Ala Leu Ala Ala Ala His Gln Pro His
                405                 410                 415

Ile Gly Leu Ala Pro Ala Ala Phe Val Pro Asn Pro Tyr Ile Ile Ser
            420                 425                 430

Ala Ala Pro Pro Gly Thr Asp Pro Tyr Thr Ala Gly Leu Ala Ala Ala
        435                 440                 445

Ala Thr Leu Gly Pro Ala Val Val Pro His Gln Tyr Tyr Gly Val Thr
    450                 455                 460

Pro Trp Gly Val Tyr Pro Ala Ser Leu Phe Gln Gln Gln Ala Ala Ala
465                 470                 475                 480

Ala Ala Ala Ala Thr Asn Ser Ala Asn Gln Gln Thr Thr Pro Gln Ala
                485                 490                 495

Gln Gln Gly Gln Gln Gln Val Leu Arg Gly Gly Ala Ser Gln Arg Pro
            500                 505                 510
```

```
Leu Thr Pro Asn Gln Asn Gln Gln Gly Gln Gln Thr Asp Pro Leu Val
        515                 520                 525

Ala Ala Ala Ala Val Asn Ser Ala Leu Ala Phe Gly Gln Gly Leu Ala
    530                 535                 540

Ala Gly Met Pro Gly Tyr Pro Val Leu Ala Pro Ala Ala Tyr Tyr Asp
545                 550                 555                 560

Gln Thr Gly Ala Leu Val Val Asn Ala Gly Ala Arg Asn Gly Leu Gly
                565                 570                 575

Ala Pro Val Arg Leu Val Ala Pro Ala Pro Val Ile Ile Ser Ser Ser
            580                 585                 590

Ala Ala Gln Ala Ala Val Ala Ala Ala Ala Ala Ser Ala Asn Gly Ala
        595                 600                 605

Ala Gly Gly Leu Ala Gly Thr Thr Asn Gly Pro Phe Arg Pro Leu Gly
    610                 615                 620

Thr Gln Gln Pro Gln Pro Gln Pro Gln Gln Gln Pro Asn Asn Asn Leu
625                 630                 635                 640

Ala Ser Ser Ser Phe Tyr Gly Asn Asn Ser Leu Asn Ser Asn Ser Gln
                645                 650                 655

Ser Ser Ser Leu Phe Ser Gln Gly Ser Ala Gln Pro Ala Asn Thr Ser
            660                 665                 670

Leu Gly Phe Gly Ser Ser Ser Ser Leu Gly Ala Thr Leu Gly Ser Ala
        675                 680                 685

Leu Gly Gly Phe Gly Thr Ala Val Ala Asn Ser Asn Thr Gly Ser Gly
    690                 695                 700

Ser Arg Arg Asp Ser Leu Thr Gly Ser Ser Asp Leu Tyr Lys Arg Thr
705                 710                 715                 720

Ser Ser Ser Leu Thr Pro Ile Gly His Ser Phe Tyr Asn Gly Leu Ser
                725                 730                 735

Phe Ser Ser Ser Pro Gly Pro Val Gly Met Pro Leu Pro Ser Gln Gly
            740                 745                 750

Pro Gly His Ser Gln Thr Pro Pro Pro Ser Leu Ser Ser His Gly Ser
        755                 760                 765

Ser Ser Ser Leu Asn Leu Gly Gly Leu Thr Asn Gly Ser Gly Arg Tyr
    770                 775                 780

Ile Ser Ala Ala Pro Gly Ala Glu Ala Lys Tyr Arg Ser Ala Ser Ser
785                 790                 795                 800

Ala Ser Ser Leu Phe Ser Pro Ser Ser Thr Leu Phe Ser Ser Ser Arg
                805                 810                 815

Leu Arg Tyr Gly Met Ser Asp Val Met Pro Ser Gly Arg Ser Arg Leu
            820                 825                 830

Leu Glu Asp Phe Arg Asn Asn Arg Tyr Pro Asn Leu Gln Leu Arg Glu
        835                 840                 845

Ile Ala Gly His Ile Met Glu Phe Ser Gln Asp Gln His Gly Ser Arg
    850                 855                 860

Phe Ile Gln Leu Lys Leu Glu Arg Ala Thr Pro Ala Glu Arg Gln Leu
865                 870                 875                 880

Val Phe Asn Glu Ile Leu Gln Ala Ala Tyr Gln Leu Met Val Asp Val
                885                 890                 895

Phe Gly Asn Tyr Val Ile Gln Lys Phe Phe Glu Phe Gly Ser Leu Glu
            900                 905                 910

Gln Lys Leu Ala Leu Ala Glu Arg Ile Arg Gly His Val Leu Ser Leu
        915                 920                 925

Ala Leu Gln Met Tyr Gly Cys Arg Val Ile Gln Lys Ala Leu Glu Phe
```

```
    930                 935                 940

Ile Pro Ser Asp Gln Gln Asn Glu Met Val Arg Glu Leu Asp Gly His
945                 950                 955                 960

Val Leu Lys Cys Val Lys Asp Gln Asn Gly Asn His Val Val Gln Lys
                965                 970                 975

Cys Ile Glu Cys Val Gln Pro Gln Ser Leu Gln Phe Ile Ile Asp Ala
            980                 985                 990

Phe Lys Gly Gln Val Phe Ala Leu  Ser Thr His Pro Tyr  Gly Cys Arg
        995                 1000                 1005

Val Ile  Gln Arg Ile Leu Glu  His Cys Leu Pro Asp  Gln Thr Leu
    1010                 1015                 1020

Pro Ile  Leu Glu Glu Leu His  Gln His Thr Glu Gln  Leu Val Gln
    1025                 1030                 1035

Asp Gln  Tyr Gly Asn Tyr Val  Ile Gln His Val Leu  Glu His Gly
    1040                 1045                 1050

Arg Pro  Glu Asp Lys Ser Lys  Ile Val Ala Glu Ile  Arg Gly Asn
    1055                 1060                 1065

Val Leu  Val Leu Ser Gln His  Lys Phe Ala Ser Asn  Val Val Glu
    1070                 1075                 1080

Lys Cys  Val Thr His Ala Ser  Arg Thr Glu Arg Ala  Val Leu Ile
    1085                 1090                 1095

Asp Glu  Val Cys Thr Met Asn  Asp Gly Pro His Ser  Ala Leu Tyr
    1100                 1105                 1110

Thr Met  Met Lys Asp Gln Tyr  Ala Asn Tyr Val Val  Gln Lys Met
    1115                 1120                 1125

Ile Asp  Val Ala Glu Pro Gly  Gln Arg Lys Ile Val  Met His Lys
    1130                 1135                 1140

Ile Arg  Pro His Ile Ala Thr  Leu Arg Lys Tyr Thr  Tyr Gly Lys
    1145                 1150                 1155

His Ile  Leu Ala Lys Leu Glu  Lys Tyr Tyr Met Lys  Asn Gly Val
    1160                 1165                 1170

Asp Leu  Gly Pro Ile Cys Gly  Pro Pro Asn Gly Ile  Ile
    1175                 1180                 1185


<210> SEQ ID NO 48
<211> LENGTH: 22
<212> TYPE: DNA
<213> ORGANISM: Artificial Sequence
<220> FEATURE:
<223> OTHER INFORMATION: PUM1_forward primer

<400> SEQUENCE: 48

gccagcttgt cttcaatgaa at                                              22


<210> SEQ ID NO 49
<211> LENGTH: 21
<212> TYPE: DNA
<213> ORGANISM: Artificial Sequence
<220> FEATURE:
<223> OTHER INFORMATION: PUM1_reverse primer

<400> SEQUENCE: 49

caaagccagc ttctgttcaa g                                               21


<210> SEQ ID NO 50
<211> LENGTH: 24
<212> TYPE: DNA
<213> ORGANISM: Artificial Sequence
```

<220> FEATURE:
<223> OTHER INFORMATION: PUM1 probe

<400> SEQUENCE: 50
atccaccatg agttggtagg cagc 24

<210> SEQ ID NO 51
<211> LENGTH: 1921
<212> TYPE: DNA
<213> ORGANISM: Homo sapiens

<400> SEQUENCE: 51
ggcggaagtg acattatcaa cgcgcgccag gggttcagtg aggtcgggca ggttcgctgt 60
ggcgggcgcc tgggccgccg gctgtttaac ttcgcttccg ctggcccata gtgatctttg 120
cagtgaccca gcatcactgt ttcttggcgt gtgaagataa cccaaggaat tgaggaagtt 180
gctgagaaga gtgtgctgga gatgctctag gaaaaaattg aatagtgaga cgagttccag 240
cgcaagggtt tctggtttgc caagaagaaa gtgaacatca tggatcagaa caacagcctg 300
ccaccttacg ctcagggctt ggcctcccct cagggtgcca tgactcccgg aatccctatc 360
tttagtccaa tgatgcctta tggcactgga ctgaccccac agcctattca gaacaccaat 420
agtctgtcta ttttggaaga gcaacaaagg cagcagcagc aacaacaaca gcagcagcag 480
cagcagcagc agcaacagca acagcagcag cagcagcagc agcagcagca gcagcagcag 540
cagcagcagc agcagcagca acaggcagtg gcagctgcag ccgttcagca gtcaacgtcc 600
cagcaggcaa cacagggaac ctcaggccag gcaccacagc tcttccactc acagactctc 660
acaactgcac ccttgccggg caccactcca ctgtatccct cccccatgac tcccatgacc 720
cccatcactc ctgccacgcc agcttcggag agttctggga ttgtaccgca gctgcaaaat 780
attgtatcca cagtgaatct tggttgtaaa cttgacctaa agaccattgc acttcgtgcc 840
cgaaacgccg aatataatcc caagcggttt gctgcggtaa tcatgaggat aagagagcca 900
cgaaccacgg cactgatttt cagttctggg aaaatggtgt gcacaggagc caagagtgaa 960
gaacagtcca gactggcagc aagaaaatat gctagagttg tacagaagtt gggttttcca 1020
gctaagttct tggacttcaa gattcagaat atggtgggga gctgtgatgt gaagtttcct 1080
ataaggttag aaggccttgt gctcacccac caacaattta gtagttatga gccagagtta 1140
tttcctggtt taatctacag aatgatcaaa cccagaattg ttctccttat ttttgtttct 1200
ggaaaagttg tattaacagg tgctaaagtc agagcagaaa tttatgaagc atttgaaaac 1260
atctacccta ttctaaaggg attcaggaag acgacgtaat ggctctcatg taccettgcc 1320 tcccccaccc ccttcttttt tttttttaa acaaatcagt ttgttttggt acctttaaat 1380
ggtggtgttg tgagaagatg gatgttgagt tgcagggtgt ggcaccaggt gatgcccttc 1440
tgtaagtgcc caccgcggga tgccgggaag ggcattatt tgtgcactga gaacaccgcg 1500
cagcgtgact gtgagttgct cataccgtgc tgctatctgg gcagcgctgc ccatttattt 1560
atatgtagat tttaaacact gctgttgaca agttggtttg agggagaaaa ctttaagtgt 1620
taaagccacc tctataattg attggacttt ttaattttaa tgtttttccc catgaaccac 1680
agtttttata tttctaccag aaaagtaaaa atcttttta aaagtgttgt ttttctaatt 1740
tataactcct aggggttatt tctgtgccag acacattcca cctctccagt attgcaggac 1800
agaatatatg tgttaatgaa aatgaatggc tgtacatatt tttttcttc ttcagagtac 1860 tctgtacaat aaatgcagtt tataaaagtg ttagattgtt gttaaaaaaa aaaaaaaaaa 1920
a 1921

<210> SEQ ID NO 52
<211> LENGTH: 339
<212> TYPE: PRT
<213> ORGANISM: Homo sapiens

<400> SEQUENCE: 52

```
Met Asp Gln Asn Asn Ser Leu Pro Pro Tyr Ala Gln Gly Leu Ala Ser
1               5                   10                  15

Pro Gln Gly Ala Met Thr Pro Gly Ile Pro Ile Phe Ser Pro Met Met
            20                  25                  30

Pro Tyr Gly Thr Gly Leu Thr Pro Gln Pro Ile Gln Asn Thr Asn Ser
        35                  40                  45

Leu Ser Ile Leu Glu Glu Gln Gln Arg Gln Gln Gln Gln Gln Gln Gln
    50                  55                  60

Gln Gln Gln Gln Gln Gln Gln Gln Gln Gln Gln Gln Gln Gln Gln Gln
65                  70                  75                  80

Gln Gln Gln Gln Gln Gln Gln Gln Gln Gln Gln Gln Gln Gln Gln Ala
                85                  90                  95

Val Ala Ala Ala Ala Val Gln Gln Ser Thr Ser Gln Gln Ala Thr Gln
            100                 105                 110

Gly Thr Ser Gly Gln Ala Pro Gln Leu Phe His Ser Gln Thr Leu Thr
        115                 120                 125

Thr Ala Pro Leu Pro Gly Thr Thr Pro Leu Tyr Pro Ser Pro Met Thr
    130                 135                 140

Pro Met Thr Pro Ile Thr Pro Ala Thr Pro Ala Ser Glu Ser Ser Gly
145                 150                 155                 160

Ile Val Pro Gln Leu Gln Asn Ile Val Ser Thr Val Asn Leu Gly Cys
                165                 170                 175

Lys Leu Asp Leu Lys Thr Ile Ala Leu Arg Ala Arg Asn Ala Glu Tyr
            180                 185                 190

Asn Pro Lys Arg Phe Ala Ala Val Ile Met Arg Ile Arg Glu Pro Arg
        195                 200                 205

Thr Thr Ala Leu Ile Phe Ser Ser Gly Lys Met Val Cys Thr Gly Ala
    210                 215                 220

Lys Ser Glu Glu Gln Ser Arg Leu Ala Ala Arg Lys Tyr Ala Arg Val
225                 230                 235                 240

Val Gln Lys Leu Gly Phe Pro Ala Lys Phe Leu Asp Phe Lys Ile Gln
                245                 250                 255

Asn Met Val Gly Ser Cys Asp Val Lys Phe Pro Ile Arg Leu Glu Gly
            260                 265                 270

Leu Val Leu Thr His Gln Gln Phe Ser Ser Tyr Glu Pro Glu Leu Phe
        275                 280                 285

Pro Gly Leu Ile Tyr Arg Met Ile Lys Pro Arg Ile Val Leu Leu Ile
    290                 295                 300

Phe Val Ser Gly Lys Val Val Leu Thr Gly Ala Lys Val Arg Ala Glu
305                 310                 315                 320

Ile Tyr Glu Ala Phe Glu Asn Ile Tyr Pro Ile Leu Lys Gly Phe Arg
                325                 330                 335

Lys Thr Thr
```

<210> SEQ ID NO 53
<211> LENGTH: 23
<212> TYPE: DNA

<213> ORGANISM: Artificial Sequence
<220> FEATURE:
<223> OTHER INFORMATION: TBP_forward primer

<400> SEQUENCE: 53
gccaagaaga aagtgaacat cat 23

<210> SEQ ID NO 54
<211> LENGTH: 20
<212> TYPE: DNA
<213> ORGANISM: Artificial Sequence
<220> FEATURE:
<223> OTHER INFORMATION: TBP_reverse primer

<400> SEQUENCE: 54
atagggattc cgggagtcat 20

<210> SEQ ID NO 55
<211> LENGTH: 24
<212> TYPE: DNA
<213> ORGANISM: Artificial Sequence
<220> FEATURE:
<223> OTHER INFORMATION: TBP probe

<400> SEQUENCE: 55
tcagaacaac agcctgccac ctta 24

<210> SEQ ID NO 56
<211> LENGTH: 1852
<212> TYPE: DNA
<213> ORGANISM: Homo sapiens

<400> SEQUENCE: 56
accgccgaga ccgcgtccgc cccgcgagca cagagcctcg cctttgccga tccgccgccc 60
gtccacaccc gccgccagct caccatggat gatgatatcg ccgcgctcgt cgtcgacaac 120
ggctccggca tgtgcaaggc cggcttcgcg ggcgacgatg ccccccgggc cgtcttcccc 180
tccatcgtgg ggcgccccag gcaccagggc gtgatggtgg gcatgggtca gaaggattcc 240
tatgtgggcg acgaggccca gagcaagaga ggcatcctca ccctgaagta ccccatcgag 300
cacggcatcg tcaccaactg ggacgacatg gagaaaatct ggcaccacac cttctacaat 360
gagctgcgtg tggctcccga ggagcacccc gtgctgctga ccgaggcccc cctgaacccc 420
aaggccaacc gcgagaagat gacccagatc atgtttgaga ccttcaacac cccagccatg 480
tacgttgcta tccaggctgt gctatccctg tacgcctctg gccgtaccac tggcatcgtg 540
atggactccg gtgacggggt cacccacact gtgcccatct acgaggggta tgccctcccc 600
catgccatcc tgcgtctgga cctggctggc cgggacctga ctgactacct catgaagatc 660
ctcaccgagc gcggctacag cttcaccacc acggccgagc gggaaatcgt gcgtgacatt 720
aaggagaagc tgtgctacgt cgccctggac ttcgagcaag agatggccac ggctgcttcc 780
agctcctccc tggagaagag ctacgagctg cctgacggcc aggtcatcac cattggcaat 840
gagcggttcc gctgccctga ggcactcttc cagccttcct tcctgggcat ggagtcctgt 900
ggcatccacg aaactacctt caactccatc atgaagtgtg acgtggacat ccgcaaagac 960
ctgtacgcca acacagtgct gtctggcggc accaccatgt accctggcat tgccgacagg 1020
atgcagaagg agatcactgc cctggcaccc agcacaatga agatcaagat cattgctcct 1080
cctgagcgca agtactccgt gtggatcggc ggctccatcc tggcctcgct gtccaccttc 1140
cagcagatgt ggatcagcaa gcaggagtat gacgagtccg gccccctccat cgtccaccgc 1200

```
aaatgcttct aggcggacta tgacttagtt gcgttacacc ctttcttgac aaaacctaac   1260

ttgcgcagaa aacaagatga gattggcatg gctttatttg tttttttgt tttgttttgg   1320

ttttttttt tttttggct tgactcagga tttaaaaact ggaacggtga aggtgacagc   1380

agtcggttgg agcgagcatc ccccaaagtt cacaatgtgg ccgaggactt tgattgcaca   1440

ttgttgtttt tttaatagtc attccaaata tgagatgcgt tgttacagga agtcccttgc   1500

catcctaaaa gccaccccac ttctctctaa ggagaatggc ccagtcctct cccaagtcca   1560

cacaggggag gtgatagcat tgctttcgtg taaattatgt aatgcaaaat tttttaatc   1620

ttcgccttaa tactttttta ttttgtttta ttttgaatga tgagccttcg tgcccccct   1680

tcccctttt ttgtccccca acttgagatg tatgaaggct tttggtctcc ctgggagtgg   1740

gtggaggcag ccagggctta cctgtacact gacttgagac cagttgaata aaagtgcaca   1800

ccttaaaaat gaaaaaaaaa aaaaaaaaaa aaaaaaaaaa aaaaaaaaaa aa           1852
```

```
<210> SEQ ID NO 57
<211> LENGTH: 375
<212> TYPE: PRT
<213> ORGANISM: Homo sapiens

<400> SEQUENCE: 57

Met Asp Asp Asp Ile Ala Ala Leu Val Val Asp Asn Gly Ser Gly Met
1               5                   10                  15

Cys Lys Ala Gly Phe Ala Gly Asp Asp Ala Pro Arg Ala Val Phe Pro
            20                  25                  30

Ser Ile Val Gly Arg Pro Arg His Gln Gly Val Met Val Gly Met Gly
        35                  40                  45

Gln Lys Asp Ser Tyr Val Gly Asp Glu Ala Gln Ser Lys Arg Gly Ile
    50                  55                  60

Leu Thr Leu Lys Tyr Pro Ile Glu His Gly Ile Val Thr Asn Trp Asp
65                  70                  75                  80

Asp Met Glu Lys Ile Trp His His Thr Phe Tyr Asn Glu Leu Arg Val
                85                  90                  95

Ala Pro Glu Glu His Pro Val Leu Leu Thr Glu Ala Pro Leu Asn Pro
            100                 105                 110

Lys Ala Asn Arg Glu Lys Met Thr Gln Ile Met Phe Glu Thr Phe Asn
        115                 120                 125

Thr Pro Ala Met Tyr Val Ala Ile Gln Ala Val Leu Ser Leu Tyr Ala
    130                 135                 140

Ser Gly Arg Thr Thr Gly Ile Val Met Asp Ser Gly Asp Gly Val Thr
145                 150                 155                 160

His Thr Val Pro Ile Tyr Glu Gly Tyr Ala Leu Pro His Ala Ile Leu
                165                 170                 175

Arg Leu Asp Leu Ala Gly Arg Asp Leu Thr Asp Tyr Leu Met Lys Ile
            180                 185                 190

Leu Thr Glu Arg Gly Tyr Ser Phe Thr Thr Thr Ala Glu Arg Glu Ile
        195                 200                 205

Val Arg Asp Ile Lys Glu Lys Leu Cys Tyr Val Ala Leu Asp Phe Glu
    210                 215                 220

Gln Glu Met Ala Thr Ala Ala Ser Ser Ser Ser Leu Glu Lys Ser Tyr
225                 230                 235                 240

Glu Leu Pro Asp Gly Gln Val Ile Thr Ile Gly Asn Glu Arg Phe Arg
                245                 250                 255
```

```
Cys Pro Glu Ala Leu Phe Gln Pro Ser Phe Leu Gly Met Glu Ser Cys
            260                 265                 270

Gly Ile His Glu Thr Thr Phe Asn Ser Ile Met Lys Cys Asp Val Asp
        275                 280                 285

Ile Arg Lys Asp Leu Tyr Ala Asn Thr Val Leu Ser Gly Gly Thr Thr
    290                 295                 300

Met Tyr Pro Gly Ile Ala Asp Arg Met Gln Lys Glu Ile Thr Ala Leu
305                 310                 315                 320

Ala Pro Ser Thr Met Lys Ile Lys Ile Ile Ala Pro Pro Glu Arg Lys
                325                 330                 335

Tyr Ser Val Trp Ile Gly Gly Ser Ile Leu Ala Ser Leu Ser Thr Phe
            340                 345                 350

Gln Gln Met Trp Ile Ser Lys Gln Glu Tyr Asp Glu Ser Gly Pro Ser
        355                 360                 365

Ile Val His Arg Lys Cys Phe
    370                 375


<210> SEQ ID NO 58
<211> LENGTH: 18
<212> TYPE: DNA
<213> ORGANISM: Artificial Sequence
<220> FEATURE:
<223> OTHER INFORMATION: ACTB_forward primer

<400> SEQUENCE: 58

ccaaccgcga gaagatga                                                     18


<210> SEQ ID NO 59
<211> LENGTH: 20
<212> TYPE: DNA
<213> ORGANISM: Artificial Sequence
<220> FEATURE:
<223> OTHER INFORMATION: ACTB_reverse primer

<400> SEQUENCE: 59

ccagaggcgt acagggatag                                                   20


<210> SEQ ID NO 60
<211> LENGTH: 23
<212> TYPE: DNA
<213> ORGANISM: Artificial Sequence
<220> FEATURE:
<223> OTHER INFORMATION: ACTB probe

<400> SEQUENCE: 60

ccatgtacgt tgctatccag gct                                               23


<210> SEQ ID NO 61
<211> LENGTH: 1229
<212> TYPE: DNA
<213> ORGANISM: Homo sapiens

<400> SEQUENCE: 61

gtctgacggg cgatggcgca gccaatagac aggagcgcta tccgcggttt ctgattggct      60

actttgttcg cattataaaa ggcacgcgcg ggcgcgaggc ccttctctcg ccaggcgtcc     120

tcgtggaagt gacatcgtct ttaaaccctg cgtggcaatc cctgacgcac cgccgtgatg     180

cccagggaag acagggcgac ctggaagtcc aactacttcc ttaagatcat ccaactattg     240

gatgattatc cgaaatgttt cattgtggga gcagacaatg tgggctccaa gcagatgcag     300

cagatccgca tgtcccttcg cgggaaggct gtggtgctga tgggcaagaa caccatgatg     360
```

```
cgcaaggcca tccgagggca cctggaaaac aacccagctc tggagaaact gctgcctcat    420

atccggggga atgtgggctt tgtgttcacc aaggaggacc tcactgagat cagggacatg    480

ttgctggcca ataaggtgcc agctgctgcc cgtgctggtg ccattgcccc atgtgaagtc    540

actgtgccag cccagaacac tggtctcggg cccgagaaga cctccttttt ccaggcttta    600

ggtatcacca ctaaaatctc caggggcacc attgaaatcc tgagtgatgt gcagctgatc    660

aagactggag acaaagtggg agccagcgaa gccacgctgc tgaacatgct caacatctcc    720

cccttctcct ttgggctggt catccagcag gtgttcgaca atggcagcat ctacaaccct    780

gaagtgcttg atatcacaga ggaaactctg cattctcgct tcctggaggg tgtccgcaat    840

gttgccagtg tctgtctgca gattggctac ccaactgttg catcagtacc ccattctatc    900

atcaacgggt acaaacgagt cctggccttg tctgtggaga cggattacac cttcccactt    960

gctgaaaagg tcaaggcctt cttggctgat ccatctgcct ttgtggctgc tgcccctgtg   1020

gctgctgcca ccacagctgc tcctgctgct gctgcagccc cagctaaggt tgaagccaag   1080

gaagagtcgg aggagtcgga cgaggatatg ggatttggtc tctttgacta atcaccaaaa   1140

agcaaccaac ttagccagtt ttatttgcaa aacaaggaaa taaaggctta cttctttaaa   1200

aagtaaaaaa aaaaaaaaaa aaaaaaaaa                                     1229
```

```
<210> SEQ ID NO 62
<211> LENGTH: 317
<212> TYPE: PRT
<213> ORGANISM: Homo sapiens

<400> SEQUENCE: 62

Met Pro Arg Glu Asp Arg Ala Thr Trp Lys Ser Asn Tyr Phe Leu Lys
1               5                   10                  15

Ile Ile Gln Leu Leu Asp Asp Tyr Pro Lys Cys Phe Ile Val Gly Ala
            20                  25                  30

Asp Asn Val Gly Ser Lys Gln Met Gln Gln Ile Arg Met Ser Leu Arg
        35                  40                  45

Gly Lys Ala Val Val Leu Met Gly Lys Asn Thr Met Met Arg Lys Ala
    50                  55                  60

Ile Arg Gly His Leu Glu Asn Asn Pro Ala Leu Glu Lys Leu Leu Pro
65                  70                  75                  80

His Ile Arg Gly Asn Val Gly Phe Val Phe Thr Lys Glu Asp Leu Thr
                85                  90                  95

Glu Ile Arg Asp Met Leu Leu Ala Asn Lys Val Pro Ala Ala Ala Arg
            100                 105                 110

Ala Gly Ala Ile Ala Pro Cys Glu Val Thr Val Pro Ala Gln Asn Thr
        115                 120                 125

Gly Leu Gly Pro Glu Lys Thr Ser Phe Phe Gln Ala Leu Gly Ile Thr
    130                 135                 140

Thr Lys Ile Ser Arg Gly Thr Ile Glu Ile Leu Ser Asp Val Gln Leu
145                 150                 155                 160

Ile Lys Thr Gly Asp Lys Val Gly Ala Ser Glu Ala Thr Leu Leu Asn
                165                 170                 175

Met Leu Asn Ile Ser Pro Phe Ser Phe Gly Leu Val Ile Gln Gln Val
            180                 185                 190

Phe Asp Asn Gly Ser Ile Tyr Asn Pro Glu Val Leu Asp Ile Thr Glu
        195                 200                 205

Glu Thr Leu His Ser Arg Phe Leu Glu Gly Val Arg Asn Val Ala Ser
```

```
    210                 215                 220

Val Cys Leu Gln Ile Gly Tyr Pro Thr Val Ala Ser Val Pro His Ser
225                 230                 235                 240

Ile Ile Asn Gly Tyr Lys Arg Val Leu Ala Leu Ser Val Glu Thr Asp
                245                 250                 255

Tyr Thr Phe Pro Leu Ala Glu Lys Val Lys Ala Phe Leu Ala Asp Pro
            260                 265                 270

Ser Ala Phe Val Ala Ala Ala Pro Val Ala Ala Ala Thr Thr Ala Ala
        275                 280                 285

Pro Ala Ala Ala Ala Ala Pro Ala Lys Val Glu Ala Lys Glu Glu Ser
    290                 295                 300

Glu Glu Ser Asp Glu Asp Met Gly Phe Gly Leu Phe Asp
305                 310                 315


<210> SEQ ID NO 63
<211> LENGTH: 317
<212> TYPE: PRT
<213> ORGANISM: Homo sapiens

<400> SEQUENCE: 63

Met Pro Arg Glu Asp Arg Ala Thr Trp Lys Ser Asn Tyr Phe Leu Lys
1               5                   10                  15

Ile Ile Gln Leu Leu Asp Asp Tyr Pro Lys Cys Phe Ile Val Gly Ala
            20                  25                  30

Asp Asn Val Gly Ser Lys Gln Met Gln Gln Ile Arg Met Ser Leu Arg
        35                  40                  45

Gly Lys Ala Val Val Leu Met Gly Lys Asn Thr Met Met Arg Lys Ala
    50                  55                  60

Ile Arg Gly His Leu Glu Asn Asn Pro Ala Leu Glu Lys Leu Leu Pro
65                  70                  75                  80

His Ile Arg Gly Asn Val Gly Phe Val Phe Thr Lys Glu Asp Leu Thr
                85                  90                  95

Glu Ile Arg Asp Met Leu Leu Ala Asn Lys Val Pro Ala Ala Ala Arg
            100                 105                 110

Ala Gly Ala Ile Ala Pro Cys Glu Val Thr Val Pro Ala Gln Asn Thr
        115                 120                 125

Gly Leu Gly Pro Glu Lys Thr Ser Phe Phe Gln Ala Leu Gly Ile Thr
    130                 135                 140

Thr Lys Ile Ser Arg Gly Thr Ile Glu Ile Leu Ser Asp Val Gln Leu
145                 150                 155                 160

Ile Lys Thr Gly Asp Lys Val Gly Ala Ser Glu Ala Thr Leu Leu Asn
                165                 170                 175

Met Leu Asn Ile Ser Pro Phe Ser Phe Gly Leu Val Ile Gln Gln Val
            180                 185                 190

Phe Asp Asn Gly Ser Ile Tyr Asn Pro Glu Val Leu Asp Ile Thr Glu
        195                 200                 205

Glu Thr Leu His Ser Arg Phe Leu Glu Gly Val Arg Asn Val Ala Ser
    210                 215                 220

Val Cys Leu Gln Ile Gly Tyr Pro Thr Val Ala Ser Val Pro His Ser
225                 230                 235                 240

Ile Ile Asn Gly Tyr Lys Arg Val Leu Ala Leu Ser Val Glu Thr Asp
                245                 250                 255

Tyr Thr Phe Pro Leu Ala Glu Lys Val Lys Ala Phe Leu Ala Asp Pro
            260                 265                 270
```

```
Ser Ala Phe Val Ala Ala Ala Pro Val Ala Ala Ala Thr Thr Ala Ala
        275                 280                 285

Pro Ala Ala Ala Ala Ala Pro Ala Lys Val Glu Ala Lys Glu Glu Ser
    290                 295                 300

Glu Glu Ser Asp Glu Asp Met Gly Phe Gly Leu Phe Asp
305                 310                 315


<210> SEQ ID NO 64
<211> LENGTH: 18
<212> TYPE: DNA
<213> ORGANISM: Artificial Sequence
<220> FEATURE:
<223> OTHER INFORMATION: RPLP0_forward primer

<400> SEQUENCE: 64

taaaccctgc gtggcaat                                                   18


<210> SEQ ID NO 65
<211> LENGTH: 27
<212> TYPE: DNA
<213> ORGANISM: Artificial Sequence
<220> FEATURE:
<223> OTHER INFORMATION: RPLP0_reverse primer

<400> SEQUENCE: 65

acatttcgga taatcatcca atagttg                                         27


<210> SEQ ID NO 66
<211> LENGTH: 24
<212> TYPE: DNA
<213> ORGANISM: Artificial Sequence
<220> FEATURE:
<223> OTHER INFORMATION: RPLP0 probe

<400> SEQUENCE: 66

aagtagttgg acttccaggt cgcc                                            24


<210> SEQ ID NO 67
<211> LENGTH: 2458
<212> TYPE: DNA
<213> ORGANISM: Homo sapiens

<400> SEQUENCE: 67

cagaagaagg cagcgcccaa ggcgcatgcg cagcggtcac tcccgctgta tattaaggcg      60

ccggcgatcg cggcctgagg ctgctcccgg acaagggcaa cgagcgtttc gtttggactt     120

ctcgacttga gtgcccgcct ccttcgccgc cgcctctgca gtcctcagcg cagttatgcc     180

cagttcttcc cgctgtgggg acacgaccac ggaggaatcc ttgcttcagg gactcgggac     240

cctgctggac cccttcctcg ggtttagggg atgtggggac caggagaaag tcaggatccc     300

taagagtctt ccctgcctgg atggatgagt ggcttcttct ccacctagat tctttccaca     360

ggagccagca tacttcctga acatggagag tgttgttcgc cgctgcccat tcttatcccg     420

agtcccccag gcctttctgc agaaagcagg caaatctctg ttgttctatg cccaaaactg     480

ccccaagatg atggaagttg gggccaagcc agcccctcgg gcattgtcca ctgcagcagt     540

acactaccaa cagatcaaag aaacccctcc ggccagtgag aaagacaaaa ctgctaaggc     600

caaggtccaa cagactcctg atggatccca gcagagtcca gatggcacac agcttccgtc     660

tggacacccc ttgcctgcca caagccaggg cactgcaagc aaatgccctt tcctggcagc     720

acagatgaat cagagaggca gcagtgtctt ctgcaaagcc agtcttgagc ttcaggagga     780
```

```
tgtgcaggaa atgaatgccg tgaggaaaga ggttgctgaa acctcagcag gccccagtgt    840

ggttagtgtg aaaaccgatg gaggggatcc cagtggactg ctgaagaact tccaggacat    900

catgcaaaag caaagaccag aaagagtgtc tcatcttctt caagataact tgccaaaatc    960

tgtttccact tttcagtatg atcgtttctt tgagaaaaaa attgatgaga aaaagaatga   1020

ccacacctat cgagttttta aaactgtgaa ccggcgagca cacatcttcc ccatggcaga   1080

tgactattca gactccctca tcaccaaaaa gcaagtgtca gtctggtgca gtaatgacta   1140

cctaggaatg agtcgccacc cacgggtgtg tggggcagtt atggacactt tgaaacaaca   1200

tggtgctggg gcaggtggta ctagaaatat ttctggaact agtaaattcc atgtggactt   1260

agagcgggag ctggcagacc tccatgggaa agatgccgca ctcttgtttt cctcgtgctt   1320

tgtggccaat gactcaaccc tcttcaccct ggctaagatg atgccaggct gtgagattta   1380

ctctgattct gggaaccatg cctccatgat ccaagggatt cgaaacagcc gagtgccaaa   1440

gtacatcttc cgccacaatg atgtcagcca cctcagagaa ctgctgcaaa gatctgaccc   1500

ctcagtcccc aagattgtgg catttgaaac tgtccattca atggatgggg cggtgtgccc   1560

actggaagag ctgtgtgatg tggcccatga gtttggagca atcaccttcg tggatgaggt   1620

ccacgcagtg gggctttatg gggctcgagg cggagggatt ggggatcggg atggagtcat   1680

gccaaaaatg gacatcattt ctggaacact tggcaaagcc tttggttgtg ttggagggta   1740

catcgccagc acgagttctc tgattgacac cgtacggtcc tatgctgctg gcttcatctt   1800

caccacctct ctgccaccca tgctgctggc tggagccctg gagtctgtgc ggatcctgaa   1860

gagcgctgag ggacgggtgc ttcgccgcca gcaccagcgc aacgtcaaac tcatgagaca   1920

gatgctaatg gatgccggcc tccctgttgt ccactgcccc agccacatca tccctgtgcg   1980

ggttgcagat gctgctaaaa acacagaagt ctgtgatgaa ctaatgagca gacataacat   2040

ctacgtgcaa gcaatcaatt accctacggt gccccgggga gaagagctcc tacggattgc   2100

ccccaccccct caccacacac cccagatgat gaactacttc cttgagaatc tgctagtcac   2160

atggaagcaa gtggggctgg aactgaagcc tcattcctca gctgagtgca acttctgcag   2220

gaggccactg cattttgaag tgatgagtga aagagagaag tcctatttct caggcttgag   2280

caagttggta tctgctcagg cctgagcatg acctcaatta tttcacttaa ccccaggcca   2340

ttatcatatc cagatggtct tcagagttgt ctttatatgt gaattaagtt atattaaatt   2400

ttaatctata gtaaaaacat agtcctggaa ataaattctt gcttaaatgg tgaaaaaa     2458
```

<210> SEQ ID NO 68
<211> LENGTH: 2281
<212> TYPE: DNA
<213> ORGANISM: Homo sapiens

<400> SEQUENCE: 68

```
cagaagaagg cagcgcccaa ggcgcatgcg cagcggtcac tcccgctgta tattaaggcg     60

ccggcgatcg cggcctgagg ctgctcccgg acaagggcaa cgagcgtttc gtttggactt    120

ctcgacttga gtgcccgcct ccttcgccgc cgcctctgca gtcctcagcg cagtctttcc    180

acaggagcca gcatacttcc tgaacatgga gagtgttgtt cgccgctgcc cattcttatc    240

ccgagtcccc caggcctttc tgcagaaagc aggcaaatct ctgttgttct atgcccaaaa    300

ctgccccaag atgatggaag ttggggccaa gccagcccct cgggcattgt ccactgcagc    360

agtacactac caacagatca aagaaacccc tccggccagt gagaaagaca aaactgctaa    420

ggccaaggtc caacagactc ctgatggatc ccagcagagt ccagatggca cacagcttcc    480
```

```
gtctggacac cccttgcctg ccacaagcca gggcactgca agcaaatgcc ctttcctggc    540

agcacagatg aatcagagag gcagcagtgt cttctgcaaa gccagtcttg agcttcagga    600

ggatgtgcag gaaatgaatg ccgtgaggaa agaggttgct gaaacctcag caggccccag    660

tgtggttagt gtgaaaaccg atggagggga tcccagtgga ctgctgaaga acttccagga    720

catcatgcaa aagcaaagac cagaaagagt gtctcatctt cttcaagata acttgccaaa    780

atctgtttcc acttttcagt atgatcgttt ctttgagaaa aaaattgatg agaaaaagaa    840

tgaccacacc tatcgagttt ttaaaactgt gaaccggcga gcacacatct tccccatggc    900

agatgactat tcagactccc tcatcaccaa aaagcaagtg tcagtctggt gcagtaatga    960

ctacctagga atgagtcgcc acccacgggt gtgtggggca gttatggaca ctttgaaaca   1020

acatggtgct ggggcaggtg gtactagaaa tatttctgga actagtaaat tccatgtgga   1080

cttagagcgg gagctggcag acctccatgg gaaagatgcc gcactcttgt tttcctcgtg   1140

ctttgtggcc aatgactcaa ccctcttcac cctggctaag atgatgccag gctgtgagat   1200

ttactctgat tctgggaacc atgcctccat gatccaaggg attcgaaaca gccgagtgcc   1260

aaagtacatc ttccgccaca atgatgtcag ccacctcaga gaactgctgc aaagatctga   1320

cccctcagtc cccaagattg tggcatttga aactgtccat tcaatggatg gggcggtgtg   1380

cccactggaa gagctgtgtg atgtggccca tgagtttgga gcaatcacct tcgtggatga   1440

ggtccacgca gtggggcttt atggggctcg aggcggaggg attggggatc gggatggagt   1500

catgccaaaa atggacatca tttctggaac acttggcaaa gcctttggtt gtgttggagg   1560

gtacatcgcc agcacgagtt ctctgattga caccgtacgg tcctatgctg ctggcttcat   1620

cttcaccacc tctctgccac ccatgctgct ggctggagcc ctggagtctg tgcggatcct   1680

gaagagcgct gagggacggg tgcttcgccg ccagcaccag cgcaacgtca aactcatgag   1740

acagatgcta atggatgccg gcctccctgt tgtccactgc cccagccaca tcatccctgt   1800

gcgggttgca gatgctgcta aaaacacaga agtctgtgat gaactaatga gcagacataa   1860

catctacgtg caagcaatca attaccctac ggtgccccgg ggagaagagc tcctacggat   1920

tgcccccacc cctcaccaca caccccagat gatgaactac ttccttgaga atctgctagt   1980

cacatggaag caagtggggc tggaactgaa gcctcattcc tcagctgagt gcaacttctg   2040

caggaggcca ctgcattttg aagtgatgag tgaaagagag aagtcctatt tctcaggctt   2100

gagcaagttg gtatctgctc aggcctgagc atgacctcaa ttatttcact taaccccagg   2160

ccattatcat atccagatgg tcttcagagt tgtctttata tgtgaattaa gttatattaa   2220

attttaatct atagtaaaaa catagtcctg gaaataaatt cttgcttaaa tggtgaaaaa   2280

a                                                                   2281

<210> SEQ ID NO 69
<211> LENGTH: 640
<212> TYPE: PRT
<213> ORGANISM: Homo sapiens

<400> SEQUENCE: 69

Met Glu Ser Val Val Arg Arg Cys Pro Phe Leu Ser Arg Val Pro Gln
1               5                   10                  15

Ala Phe Leu Gln Lys Ala Gly Lys Ser Leu Leu Phe Tyr Ala Gln Asn
            20                  25                  30

Cys Pro Lys Met Met Glu Val Gly Ala Lys Pro Ala Pro Arg Ala Leu
        35                  40                  45
```

```
Ser Thr Ala Ala Val His Tyr Gln Gln Ile Lys Glu Thr Pro Pro Ala
    50                  55                  60

Ser Glu Lys Asp Lys Thr Ala Lys Ala Lys Val Gln Gln Thr Pro Asp
65                  70                  75                  80

Gly Ser Gln Gln Ser Pro Asp Gly Thr Gln Leu Pro Ser Gly His Pro
                85                  90                  95

Leu Pro Ala Thr Ser Gln Gly Thr Ala Ser Lys Cys Pro Phe Leu Ala
            100                 105                 110

Ala Gln Met Asn Gln Arg Gly Ser Ser Val Phe Cys Lys Ala Ser Leu
        115                 120                 125

Glu Leu Gln Glu Asp Val Gln Glu Met Asn Ala Val Arg Lys Glu Val
    130                 135                 140

Ala Glu Thr Ser Ala Gly Pro Ser Val Val Ser Val Lys Thr Asp Gly
145                 150                 155                 160

Gly Asp Pro Ser Gly Leu Leu Lys Asn Phe Gln Asp Ile Met Gln Lys
                165                 170                 175

Gln Arg Pro Glu Arg Val Ser His Leu Leu Gln Asp Asn Leu Pro Lys
            180                 185                 190

Ser Val Ser Thr Phe Gln Tyr Asp Arg Phe Phe Glu Lys Lys Ile Asp
        195                 200                 205

Glu Lys Lys Asn Asp His Thr Tyr Arg Val Phe Lys Thr Val Asn Arg
    210                 215                 220

Arg Ala His Ile Phe Pro Met Ala Asp Asp Tyr Ser Asp Ser Leu Ile
225                 230                 235                 240

Thr Lys Lys Gln Val Ser Val Trp Cys Ser Asn Asp Tyr Leu Gly Met
                245                 250                 255

Ser Arg His Pro Arg Val Cys Gly Ala Val Met Asp Thr Leu Lys Gln
            260                 265                 270

His Gly Ala Gly Ala Gly Gly Thr Arg Asn Ile Ser Gly Thr Ser Lys
        275                 280                 285

Phe His Val Asp Leu Glu Arg Glu Leu Ala Asp Leu His Gly Lys Asp
    290                 295                 300

Ala Ala Leu Leu Phe Ser Ser Cys Phe Val Ala Asn Asp Ser Thr Leu
305                 310                 315                 320

Phe Thr Leu Ala Lys Met Met Pro Gly Cys Glu Ile Tyr Ser Asp Ser
                325                 330                 335

Gly Asn His Ala Ser Met Ile Gln Gly Ile Arg Asn Ser Arg Val Pro
            340                 345                 350

Lys Tyr Ile Phe Arg His Asn Asp Val Ser His Leu Arg Glu Leu Leu
        355                 360                 365

Gln Arg Ser Asp Pro Ser Val Pro Lys Ile Val Ala Phe Glu Thr Val
    370                 375                 380

His Ser Met Asp Gly Ala Val Cys Pro Leu Glu Glu Leu Cys Asp Val
385                 390                 395                 400

Ala His Glu Phe Gly Ala Ile Thr Phe Val Asp Glu Val His Ala Val
                405                 410                 415

Gly Leu Tyr Gly Ala Arg Gly Gly Gly Ile Gly Asp Arg Asp Gly Val
            420                 425                 430

Met Pro Lys Met Asp Ile Ile Ser Gly Thr Leu Gly Lys Ala Phe Gly
        435                 440                 445

Cys Val Gly Gly Tyr Ile Ala Ser Thr Ser Ser Leu Ile Asp Thr Val
    450                 455                 460
```

```
Arg Ser Tyr Ala Ala Gly Phe Ile Phe Thr Thr Ser Leu Pro Pro Met
465                 470                 475                 480

Leu Leu Ala Gly Ala Leu Glu Ser Val Arg Ile Leu Lys Ser Ala Glu
                485                 490                 495

Gly Arg Val Leu Arg Arg Gln His Gln Arg Asn Val Lys Leu Met Arg
            500                 505                 510

Gln Met Leu Met Asp Ala Gly Leu Pro Val Val His Cys Pro Ser His
        515                 520                 525

Ile Ile Pro Val Arg Val Ala Asp Ala Ala Lys Asn Thr Glu Val Cys
    530                 535                 540

Asp Glu Leu Met Ser Arg His Asn Ile Tyr Val Gln Ala Ile Asn Tyr
545                 550                 555                 560

Pro Thr Val Pro Arg Gly Glu Glu Leu Leu Arg Ile Ala Pro Thr Pro
                565                 570                 575

His His Thr Pro Gln Met Met Asn Tyr Phe Leu Glu Asn Leu Leu Val
            580                 585                 590

Thr Trp Lys Gln Val Gly Leu Glu Leu Lys Pro His Ser Ser Ala Glu
        595                 600                 605

Cys Asn Phe Cys Arg Arg Pro Leu His Phe Glu Val Met Ser Glu Arg
    610                 615                 620

Glu Lys Ser Tyr Phe Ser Gly Leu Ser Lys Leu Val Ser Ala Gln Ala
625                 630                 635                 640


<210> SEQ ID NO 70
<211> LENGTH: 640
<212> TYPE: PRT
<213> ORGANISM: Homo sapiens

<400> SEQUENCE: 70

Met Glu Ser Val Val Arg Arg Cys Pro Phe Leu Ser Arg Val Pro Gln
1               5                   10                  15

Ala Phe Leu Gln Lys Ala Gly Lys Ser Leu Leu Phe Tyr Ala Gln Asn
            20                  25                  30

Cys Pro Lys Met Met Glu Val Gly Ala Lys Pro Ala Pro Arg Ala Leu
        35                  40                  45

Ser Thr Ala Ala Val His Tyr Gln Gln Ile Lys Glu Thr Pro Pro Ala
    50                  55                  60

Ser Glu Lys Asp Lys Thr Ala Lys Ala Lys Val Gln Gln Thr Pro Asp
65                  70                  75                  80

Gly Ser Gln Gln Ser Pro Asp Gly Thr Gln Leu Pro Ser Gly His Pro
                85                  90                  95

Leu Pro Ala Thr Ser Gln Gly Thr Ala Ser Lys Cys Pro Phe Leu Ala
            100                 105                 110

Ala Gln Met Asn Gln Arg Gly Ser Ser Val Phe Cys Lys Ala Ser Leu
        115                 120                 125

Glu Leu Gln Glu Asp Val Gln Glu Met Asn Ala Val Arg Lys Glu Val
    130                 135                 140

Ala Glu Thr Ser Ala Gly Pro Ser Val Val Ser Val Lys Thr Asp Gly
145                 150                 155                 160

Gly Asp Pro Ser Gly Leu Leu Lys Asn Phe Gln Asp Ile Met Gln Lys
                165                 170                 175

Gln Arg Pro Glu Arg Val Ser His Leu Leu Gln Asp Asn Leu Pro Lys
            180                 185                 190

Ser Val Ser Thr Phe Gln Tyr Asp Arg Phe Phe Glu Lys Lys Ile Asp
        195                 200                 205
```

```
Glu Lys Lys Asn Asp His Thr Tyr Arg Val Phe Lys Thr Val Asn Arg
    210                 215                 220

Arg Ala His Ile Phe Pro Met Ala Asp Asp Tyr Ser Asp Ser Leu Ile
225                 230                 235                 240

Thr Lys Lys Gln Val Ser Val Trp Cys Ser Asn Asp Tyr Leu Gly Met
                245                 250                 255

Ser Arg His Pro Arg Val Cys Gly Ala Val Met Asp Thr Leu Lys Gln
            260                 265                 270

His Gly Ala Gly Ala Gly Gly Thr Arg Asn Ile Ser Gly Thr Ser Lys
        275                 280                 285

Phe His Val Asp Leu Glu Arg Glu Leu Ala Asp Leu His Gly Lys Asp
    290                 295                 300

Ala Ala Leu Leu Phe Ser Ser Cys Phe Val Ala Asn Asp Ser Thr Leu
305                 310                 315                 320

Phe Thr Leu Ala Lys Met Met Pro Gly Cys Glu Ile Tyr Ser Asp Ser
                325                 330                 335

Gly Asn His Ala Ser Met Ile Gln Gly Ile Arg Asn Ser Arg Val Pro
            340                 345                 350

Lys Tyr Ile Phe Arg His Asn Asp Val Ser His Leu Arg Glu Leu Leu
        355                 360                 365

Gln Arg Ser Asp Pro Ser Val Pro Lys Ile Val Ala Phe Glu Thr Val
    370                 375                 380

His Ser Met Asp Gly Ala Val Cys Pro Leu Glu Glu Leu Cys Asp Val
385                 390                 395                 400

Ala His Glu Phe Gly Ala Ile Thr Phe Val Asp Glu Val His Ala Val
                405                 410                 415

Gly Leu Tyr Gly Ala Arg Gly Gly Gly Ile Gly Asp Arg Asp Gly Val
            420                 425                 430

Met Pro Lys Met Asp Ile Ile Ser Gly Thr Leu Gly Lys Ala Phe Gly
        435                 440                 445

Cys Val Gly Gly Tyr Ile Ala Ser Thr Ser Ser Leu Ile Asp Thr Val
    450                 455                 460

Arg Ser Tyr Ala Ala Gly Phe Ile Phe Thr Thr Ser Leu Pro Pro Met
465                 470                 475                 480

Leu Leu Ala Gly Ala Leu Glu Ser Val Arg Ile Leu Lys Ser Ala Glu
                485                 490                 495

Gly Arg Val Leu Arg Arg Gln His Gln Arg Asn Val Lys Leu Met Arg
            500                 505                 510

Gln Met Leu Met Asp Ala Gly Leu Pro Val Val His Cys Pro Ser His
        515                 520                 525

Ile Ile Pro Val Arg Val Ala Asp Ala Ala Lys Asn Thr Glu Val Cys
    530                 535                 540

Asp Glu Leu Met Ser Arg His Asn Ile Tyr Val Gln Ala Ile Asn Tyr
545                 550                 555                 560

Pro Thr Val Pro Arg Gly Glu Glu Leu Leu Arg Ile Ala Pro Thr Pro
                565                 570                 575

His His Thr Pro Gln Met Met Asn Tyr Phe Leu Glu Asn Leu Leu Val
            580                 585                 590

Thr Trp Lys Gln Val Gly Leu Glu Leu Lys Pro His Ser Ser Ala Glu
        595                 600                 605

Cys Asn Phe Cys Arg Arg Pro Leu His Phe Glu Val Met Ser Glu Arg
    610                 615                 620
```

```
Glu Lys Ser Tyr Phe Ser Gly Leu Ser Lys Leu Val Ser Ala Gln Ala
625                 630                 635                 640


<210> SEQ ID NO 71
<211> LENGTH: 17
<212> TYPE: DNA
<213> ORGANISM: Artificial Sequence
<220> FEATURE:
<223> OTHER INFORMATION: ALAS-1_forward primer

<400> SEQUENCE: 71

agccacatca tccctgt                                                   17


<210> SEQ ID NO 72
<211> LENGTH: 22
<212> TYPE: DNA
<213> ORGANISM: Artificial Sequence
<220> FEATURE:
<223> OTHER INFORMATION: ALAS-1_reverse primer

<400> SEQUENCE: 72

cgtagatgtt atgtctgctc at                                             22


<210> SEQ ID NO 73
<211> LENGTH: 22
<212> TYPE: DNA
<213> ORGANISM: Artificial Sequence
<220> FEATURE:
<223> OTHER INFORMATION: ALAS-1 probe

<400> SEQUENCE: 73

tttagcagca tctgcaaccc gc                                             22


<210> SEQ ID NO 74
<211> LENGTH: 4543
<212> TYPE: DNA
<213> ORGANISM: Homo sapiens

<400> SEQUENCE: 74

atgcgtacgc tcgctggccc cgccccctag cgccgcggtc ggagccattt cgccgattcc      60

tccatgcgag ttgctgtgcg tttctctgtt gtctcggtag aaggccagag tcacacacgg     120

tcctaagagc tgggcaccag gaagcgaagg ctgatctgaa gaagacactt gaatcatggg     180

tgacgttaaa aattttctgt atgcctggtg tggcaaaagg aagatgaccc catcctatga     240

aattagagca gtggggaaca aaaacaggca gaaattcatg tgtgaggttc aggtggaagg     300

ttataattac actggcatgg gaaattccac caataaaaaa gatgcacaaa gcaatgctgc     360

cagagacttt gttaactatt tggttcgaat aaatgaaata aagagtgaag aagttccagc     420

ttttggggta gcatctccgc ccccacttac tgatactcct gacactacag caaatgctga     480

aggagattta ccaacaacca tgggaggacc tcttcctcca catctggctc tcaaagcaga     540

aaataattct gaggtagggg cctctggcta tggtgttcct gggcccacct gggaccgagg     600

agccaacttg aaggattact actcaagaaa ggaagaacaa gaagtgcaag cgactctaga     660

atcagaagaa gtggatttaa atgctgggct tcatggaaac tggaccttgg aaaatgctaa     720

agctcgtcta aaccaatatt ttcagaaaga aaagatccaa ggagaatata agtacaccca     780

agtgggtcct gatcacaaca ggagctttat tgcagaaatg accatttata tcaagcagct     840

gggcagaagg atttttgcac gagaacatgg atcaaataag aaattggcag cacagtcctg     900

tgccctgtca cttgtcagac aactgtacca tcttggagtg gttgaagctt actccggact     960
```

```
tacaaagaag aaggaaggag agacagtgga gccttacaaa gtaaacctct ctcaagattt   1020
agagcatcag ctgcaaaaca tcattcaaga gctaaatctt gagattttgc cccgcctga   1080
agatccttct gtgccagttg cactcaacat tggcaaattg gctcagttcg aaccatctca   1140
gcgacaaaac caagtgggtg tggttccttg gtcacctcca caatccaact ggaatccttg   1200
gactagtagc aacattgatg aggggcctct ggcttttgct actccagagc aaataagcat   1260
ggacctcaag aatgaattga tgtaccagtt ggaacaggat catgatttgc aagcaatctt   1320
gcaggagaga gagttactgc ctgtgaagaa atttgaaagt gagattctgg aagcaatcag   1380
ccaaaattca gttgtcatta ttagaggggc tactggatgt gggaaaacca cacaggttcc   1440
ccagttcatt ctagatgact ttatccagaa tgaccgagca gcagagtgta acatcgtagt   1500
aactcagccc agaagaatca gtgcggtttc tgtggcagag cgagttgcat ttgaaagagg   1560
agaagagcct ggaaaaagct gtggctacag cgttcgattt gagtctatac ttcctcgtcc   1620
tcatgccagt ataatgtttt gtactgtagg tgtgctcctg agaaaattag aagcaggcat   1680
tcgaggaatc agtcatgtaa ttgtagatga aatacatgaa agagatatta atactgactt   1740
ccttttggta gtactgcgtg atgttgttca ggcttatcct gaagttcgca ttgttcttat   1800
gtctgctact attgatacca gcatgttttg tgaatatttc ttcaattgcc ccatcattga   1860
agtttatggg aggacttacc cagttcaaga atattttctg gaagactgca ttcagatgac   1920
ccactttgtt cctccaccaa aagacaaaaa gaagaaggat aaggatgatg atggtggtga   1980
ggatgatgat gcaaattgca acttgatctg tggtgatgaa tatggtccag aaacaaggtt   2040
gagcatgtct caattgaacg aaaaggaaac tccttttgaa ctcatcgagg ctctacttaa   2100
gtacattgaa acccttaatg ttcctggagc tgtgttggtt tttttgcctg gctggaatct   2160
gatttatact atgcagaagc atttggaaat gaatccacat tttggaagcc atcggtatca   2220
gattctaccc ctgcattctc agattcctcg agaggaacag cgcaaagtgt ttgatccagt   2280
accagttgga gtaaccaagg ttattttgtc cacaaatatt gctgaaacaa gcattaccat   2340
aaacgatgtt gtttatgtca ttgactcctg caagcagaaa gtgaaactct tcactgctca   2400
caacaatatg accaactatg ctaccgtatg ggcatcaaaa acaaaccttg agcaacggaa   2460
agggcgagct ggccgagtac ggcctggatt ctgctttcac ctgtgcagcc gagctcgttt   2520
tgagagactt gaaacccaca tgacaccaga gatgttccga acaccattgc atgaaattgc   2580
tcttagcata aaacttctgc gtctaggagg aattggccaa tttctggcca aagcaattga   2640
acctccccct ttggatgctg tgattgaagc agaacacact cttagagagc ttgatgcatt   2700
agatgccaat gatgagttga ctcctttggg acgaatcctg gctaaactcc ccattgagcc   2760
tcgttttggc aaaatgatga taatggggtg tattttctac gtgggagatg ctatctgtac   2820
cattgctgct gctacctgct ttccagagcc tttcatcaat gaaggaaagc ggctgggcta   2880
tatccatcga aattttgctg gaaacagatt ttctgatcac gtagcccttt tatcagtatt   2940
ccaagcctgg gatgatgcta gaatgggtgg agaagaagca gagatacgtt tttgtgagca   3000
caaaagactt aatatggcta cactaagaat gacctgggaa gccaaagttc agctcaaaga   3060
gattttgatt aattctgggt ttccagaaga ttgtttgttg acacaagtgt ttactaacac   3120
tggaccagat aataatttgg atgttgttat ctccctcctg gcctttggtg tgtaccccaa   3180
tgtatgctat cataaggaaa agaggaagat tctcaccact gaagggcgta atgcacttat   3240
ccacaaatca tctgttaatt gtccttttag tagccaagac atgaagtacc catctccctt   3300
ctttgtattt ggtgaaaaga ttcgaactcg agccatctct gctaaaggca tgactttagt   3360
```

```
caccccctg cagttgcttc tctttgcctc caagaaagtc caatctgatg ggcagattgt   3420

gcttgtagat gactggatta aactgcaaat atctcatgaa gctgctgcct gtatcactgg   3480

tctccgggca gccatggagg ctttggttgt tgaagtaacc aaacaacctg ctatcatcag   3540

ccagttggac cccgtaaatg aacgtatgct gaacatgatc cgtcagatct ctagaccctc   3600

agctgctggt atcaacctta tgattggcag tacacggtat ggagatggtc cacgtcctcc   3660

caagatggcc cgatacgaca atggaagcgg atatagaagg ggaggttcta gttacagtgg   3720

tggaggctat ggcggtggct atagcagtgg aggctatggt agcggaggct atggtggcag   3780

cgccaactcc tttcgggcag gatatggtgc aggtgttggt ggaggctata gaggagtttc   3840

ccgaggtggc tttagaggca actctggagg agactacaga gggcctagtg gaggctacag   3900

aggatctggg ggattccagc gaggaggtgg tagggggggcc tatggaactg gctactttgg   3960

acagggaaga ggaggtggcg gctattaaaa cttggttatg tcagttcctg tgtgtagaca   4020

gtaaggaaaa aaaggcatgc tatgtgttac gtgtttttttc cagtatgttt atttgccacc   4080

aaaaagtaaa tgcattttca cccattctgt ggttcattgt agtttaagga aaccaagcat   4140

atagatgcat tagtgatttt gtttatatta tgtaaaatat aacgatctct taaaaatacc   4200

acagtttgta tttttcttt aaggagtaaa gatttgcctt taaataactt ggtattttcc   4260

tggctttcgt ttaatacaat agaaaataaa gtattacacc gaatacttgc cgtgtagttt   4320

gtttgttgac ctcgtatgtt agaaaatttt acaatgccag ctacatctgt tgattttaaa   4380

tgtcagagaa gttgtaccct gtttcaaaag tatactaagt gatactactt gtaatagaat   4440

aaatcatctt ggaattgaat tgttaccttt tgaagtaaat actggcaagt gcacaagcca   4500

cataaacctg aataaaactt ttgacctagg gttgaaaaaa aaa                   4543
```

<210> SEQ ID NO 75
<211> LENGTH: 1270
<212> TYPE: PRT
<213> ORGANISM: Homo sapiens

<400> SEQUENCE: 75

```
Met Gly Asp Val Lys Asn Phe Leu Tyr Ala Trp Cys Gly Lys Arg Lys
1               5                   10                  15

Met Thr Pro Ser Tyr Glu Ile Arg Ala Val Gly Asn Lys Asn Arg Gln
            20                  25                  30

Lys Phe Met Cys Glu Val Gln Val Glu Gly Tyr Asn Tyr Thr Gly Met
        35                  40                  45

Gly Asn Ser Thr Asn Lys Lys Asp Ala Gln Ser Asn Ala Ala Arg Asp
    50                  55                  60

Phe Val Asn Tyr Leu Val Arg Ile Asn Glu Ile Lys Ser Glu Glu Val
65                  70                  75                  80

Pro Ala Phe Gly Val Ala Ser Pro Pro Pro Leu Thr Asp Thr Pro Asp
                85                  90                  95

Thr Thr Ala Asn Ala Glu Gly Asp Leu Pro Thr Thr Met Gly Gly Pro
            100                 105                 110

Leu Pro Pro His Leu Ala Leu Lys Ala Glu Asn Asn Ser Glu Val Gly
        115                 120                 125

Ala Ser Gly Tyr Gly Val Pro Gly Pro Thr Trp Asp Arg Gly Ala Asn
    130                 135                 140

Leu Lys Asp Tyr Tyr Ser Arg Lys Glu Glu Gln Glu Val Gln Ala Thr
145                 150                 155                 160
```

```
Leu Glu Ser Glu Glu Val Asp Leu Asn Ala Gly Leu His Gly Asn Trp
                165                 170                 175

Thr Leu Glu Asn Ala Lys Ala Arg Leu Asn Gln Tyr Phe Gln Lys Glu
            180                 185                 190

Lys Ile Gln Gly Glu Tyr Lys Tyr Thr Gln Val Gly Pro Asp His Asn
        195                 200                 205

Arg Ser Phe Ile Ala Glu Met Thr Ile Tyr Ile Lys Gln Leu Gly Arg
    210                 215                 220

Arg Ile Phe Ala Arg Glu His Gly Ser Asn Lys Lys Leu Ala Ala Gln
225                 230                 235                 240

Ser Cys Ala Leu Ser Leu Val Arg Gln Leu Tyr His Leu Gly Val Val
                245                 250                 255

Glu Ala Tyr Ser Gly Leu Thr Lys Lys Lys Glu Gly Glu Thr Val Glu
            260                 265                 270

Pro Tyr Lys Val Asn Leu Ser Gln Asp Leu Glu His Gln Leu Gln Asn
        275                 280                 285

Ile Ile Gln Glu Leu Asn Leu Glu Ile Leu Pro Pro Pro Glu Asp Pro
    290                 295                 300

Ser Val Pro Val Ala Leu Asn Ile Gly Lys Leu Ala Gln Phe Glu Pro
305                 310                 315                 320

Ser Gln Arg Gln Asn Gln Val Gly Val Val Pro Trp Ser Pro Pro Gln
                325                 330                 335

Ser Asn Trp Asn Pro Trp Thr Ser Ser Asn Ile Asp Glu Gly Pro Leu
            340                 345                 350

Ala Phe Ala Thr Pro Glu Gln Ile Ser Met Asp Leu Lys Asn Glu Leu
        355                 360                 365

Met Tyr Gln Leu Glu Gln Asp His Asp Leu Gln Ala Ile Leu Gln Glu
    370                 375                 380

Arg Glu Leu Leu Pro Val Lys Lys Phe Glu Ser Glu Ile Leu Glu Ala
385                 390                 395                 400

Ile Ser Gln Asn Ser Val Val Ile Ile Arg Gly Ala Thr Gly Cys Gly
                405                 410                 415

Lys Thr Thr Gln Val Pro Gln Phe Ile Leu Asp Asp Phe Ile Gln Asn
            420                 425                 430

Asp Arg Ala Ala Glu Cys Asn Ile Val Val Thr Gln Pro Arg Arg Ile
        435                 440                 445

Ser Ala Val Ser Val Ala Glu Arg Val Ala Phe Glu Arg Gly Glu Glu
    450                 455                 460

Pro Gly Lys Ser Cys Gly Tyr Ser Val Arg Phe Glu Ser Ile Leu Pro
465                 470                 475                 480

Arg Pro His Ala Ser Ile Met Phe Cys Thr Val Gly Val Leu Leu Arg
                485                 490                 495

Lys Leu Glu Ala Gly Ile Arg Gly Ile Ser His Val Ile Val Asp Glu
            500                 505                 510

Ile His Glu Arg Asp Ile Asn Thr Asp Phe Leu Leu Val Val Leu Arg
        515                 520                 525

Asp Val Val Gln Ala Tyr Pro Glu Val Arg Ile Val Leu Met Ser Ala
    530                 535                 540

Thr Ile Asp Thr Ser Met Phe Cys Glu Tyr Phe Phe Asn Cys Pro Ile
545                 550                 555                 560

Ile Glu Val Tyr Gly Arg Thr Tyr Pro Val Gln Glu Tyr Phe Leu Glu
                565                 570                 575

Asp Cys Ile Gln Met Thr His Phe Val Pro Pro Pro Lys Asp Lys Lys
```

```
            580                 585                 590

Lys Lys Asp Lys Asp Asp Asp Gly Gly Glu Asp Asp Asp Ala Asn Cys
        595                 600                 605

Asn Leu Ile Cys Gly Asp Glu Tyr Gly Pro Glu Thr Arg Leu Ser Met
    610                 615                 620

Ser Gln Leu Asn Glu Lys Glu Thr Pro Phe Glu Leu Ile Glu Ala Leu
625                 630                 635                 640

Leu Lys Tyr Ile Glu Thr Leu Asn Val Pro Gly Ala Val Leu Val Phe
                645                 650                 655

Leu Pro Gly Trp Asn Leu Ile Tyr Thr Met Gln Lys His Leu Glu Met
            660                 665                 670

Asn Pro His Phe Gly Ser His Arg Tyr Gln Ile Leu Pro Leu His Ser
        675                 680                 685

Gln Ile Pro Arg Glu Glu Gln Arg Lys Val Phe Asp Pro Val Pro Val
    690                 695                 700

Gly Val Thr Lys Val Ile Leu Ser Thr Asn Ile Ala Glu Thr Ser Ile
705                 710                 715                 720

Thr Ile Asn Asp Val Val Tyr Val Ile Asp Ser Cys Lys Gln Lys Val
                725                 730                 735

Lys Leu Phe Thr Ala His Asn Asn Met Thr Asn Tyr Ala Thr Val Trp
            740                 745                 750

Ala Ser Lys Thr Asn Leu Glu Gln Arg Lys Gly Arg Ala Gly Arg Val
        755                 760                 765

Arg Pro Gly Phe Cys Phe His Leu Cys Ser Arg Ala Arg Phe Glu Arg
    770                 775                 780

Leu Glu Thr His Met Thr Pro Glu Met Phe Arg Thr Pro Leu His Glu
785                 790                 795                 800

Ile Ala Leu Ser Ile Lys Leu Leu Arg Leu Gly Gly Ile Gly Gln Phe
                805                 810                 815

Leu Ala Lys Ala Ile Glu Pro Pro Pro Leu Asp Ala Val Ile Glu Ala
            820                 825                 830

Glu His Thr Leu Arg Glu Leu Asp Ala Leu Asp Ala Asn Asp Glu Leu
        835                 840                 845

Thr Pro Leu Gly Arg Ile Leu Ala Lys Leu Pro Ile Glu Pro Arg Phe
    850                 855                 860

Gly Lys Met Met Ile Met Gly Cys Ile Phe Tyr Val Gly Asp Ala Ile
865                 870                 875                 880

Cys Thr Ile Ala Ala Ala Thr Cys Phe Pro Glu Pro Phe Ile Asn Glu
                885                 890                 895

Gly Lys Arg Leu Gly Tyr Ile His Arg Asn Phe Ala Gly Asn Arg Phe
            900                 905                 910

Ser Asp His Val Ala Leu Leu Ser Val Phe Gln Ala Trp Asp Asp Ala
        915                 920                 925

Arg Met Gly Gly Glu Glu Ala Glu Ile Arg Phe Cys Glu His Lys Arg
    930                 935                 940

Leu Asn Met Ala Thr Leu Arg Met Thr Trp Glu Ala Lys Val Gln Leu
945                 950                 955                 960

Lys Glu Ile Leu Ile Asn Ser Gly Phe Pro Glu Asp Cys Leu Leu Thr
                965                 970                 975

Gln Val Phe Thr Asn Thr Gly Pro Asp Asn Asn Leu Asp Val Val Ile
            980                 985                 990

Ser Leu Leu Ala Phe Gly Val Tyr  Pro Asn Val Cys Tyr  His Lys Glu
        995                 1000                1005
```

```
Lys Arg  Lys Ile Leu Thr Thr  Glu Gly Arg Asn Ala  Leu Ile His
    1010                 1015                 1020

Lys Ser  Ser Val Asn Cys Pro  Phe Ser Ser Gln Asp  Met Lys Tyr
    1025                 1030                 1035

Pro Ser  Pro Phe Phe Val Phe  Gly Glu Lys Ile Arg  Thr Arg Ala
    1040                 1045                 1050

Ile Ser  Ala Lys Gly Met Thr  Leu Val Thr Pro Leu  Gln Leu Leu
    1055                 1060                 1065

Leu Phe  Ala Ser Lys Lys Val  Gln Ser Asp Gly Gln  Ile Val Leu
    1070                 1075                 1080

Val Asp  Asp Trp Ile Lys Leu  Gln Ile Ser His Glu  Ala Ala Ala
    1085                 1090                 1095

Cys Ile  Thr Gly Leu Arg Ala  Ala Met Glu Ala Leu  Val Val Glu
    1100                 1105                 1110

Val Thr  Lys Gln Pro Ala Ile  Ile Ser Gln Leu Asp  Pro Val Asn
    1115                 1120                 1125

Glu Arg  Met Leu Asn Met Ile  Arg Gln Ile Ser Arg  Pro Ser Ala
    1130                 1135                 1140

Ala Gly  Ile Asn Leu Met Ile  Gly Ser Thr Arg Tyr  Gly Asp Gly
    1145                 1150                 1155

Pro Arg  Pro Pro Lys Met Ala  Arg Tyr Asp Asn Gly  Ser Gly Tyr
    1160                 1165                 1170

Arg Arg  Gly Gly Ser Ser Tyr  Ser Gly Gly Gly Tyr  Gly Gly Gly
    1175                 1180                 1185

Tyr Ser  Ser Gly Gly Tyr Gly  Ser Gly Gly Tyr Gly  Gly Ser Ala
    1190                 1195                 1200

Asn Ser  Phe Arg Ala Gly Tyr  Gly Ala Gly Val Gly  Gly Gly Tyr
    1205                 1210                 1215

Arg Gly  Val Ser Arg Gly Gly  Phe Arg Gly Asn Ser  Gly Gly Asp
    1220                 1225                 1230

Tyr Arg  Gly Pro Ser Gly Gly  Tyr Arg Gly Ser Gly  Gly Phe Gln
    1235                 1240                 1245

Arg Gly  Gly Gly Arg Gly Ala  Tyr Gly Thr Gly Tyr  Phe Gly Gln
    1250                 1255                 1260

Gly Arg  Gly Gly Gly Gly Tyr
    1265                 1270
```